United States Patent [19]

Hendricks et al.

[11] Patent Number: 5,734,853
[45] Date of Patent: Mar. 31, 1998

[54] SET TOP TERMINAL FOR CABLE TELEVISION DELIVERY SYSTEMS

[75] Inventors: John S. Hendricks, Potomac; Alfred E. Bonner, Bethesda, both of Md.; Eric C. Berkobin, Woodstock, Ga.

[73] Assignee: Discovery Communications, Inc., Bethesda, Md.

[21] Appl. No.: 160,193

[22] Filed: Dec. 2, 1993

Related U.S. Application Data

[63] Continuation-in-part of Ser. No. 991,074, Dec. 9, 1992.
[51] Int. Cl.$^6$ .............................. G06F 15/00; H04N 7/10; H04N 7/167
[52] U.S. Cl. .............................. 395/352; 395/353; 348/1; 348/3; 348/6; 348/7; 380/20
[58] Field of Search .............................. 395/156, 352, 395/353, 354; 348/1, 3, 6, 7, 8, 9, 10, 13, 478, 460, 706, 734; 455/2, 4.1, 4.2; 380/9, 14, 16, 20

[56] References Cited

U.S. PATENT DOCUMENTS

| D. 301,037 | 5/1989 | Matsuda | D14/218 |
|---|---|---|---|
| D. 314,383 | 2/1991 | Hafner | D14/218 |
| D. 325,581 | 4/1992 | Schwartz | D14/218 |

(List continued on next page.)

FOREIGN PATENT DOCUMENTS

| 2044574 | 12/1992 | Canada . |
| 103438 | 3/1984 | European Pat. Off. . |
| 145063 | 6/1985 | European Pat. Off. . |
| 149536 | 7/1985 | European Pat. Off. . |
| 158548 | 10/1985 | European Pat. Off. . |
| 167237 | 1/1986 | European Pat. Off. . |
| 243312 | 10/1987 | European Pat. Off. . |
| 355697 | 2/1990 | European Pat. Off. . |
| 402809 | 12/1990 | European Pat. Off. . |
| 420123 | 4/1991 | European Pat. Off. . |
| 506435 | 9/1992 | European Pat. Off. . |
| 3423846 | 1/1986 | Germany . |
| 61-06015 | 3/1986 | Japan . |
| 1130683 | 5/1989 | Japan . |
| 1142918 | 5/1989 | Japan . |

(List continued on next page.)

OTHER PUBLICATIONS

Advertisement, Hong Kong Enterprises, "Two Innovative New Consumer Products From SVI," Nov. 1988, p. 379.
Advertisement, Great Presentations, "Remote, Remote," 1987, p. 32.
Advertisement, Consumer Digest, "Expand Your TV's Channel Capability," Fall/Winter, 1992.
van den Boom, "An Interactive Videotex System for Two-Way CATV Networks," AEO.Band 40, No. 6, Nov.–Dec., 1986.
Maloney, D.M., "Digital Compression In Todays Addressable Environment," 1993 NCTA Technical Papers, Jun. 6, 1993, pp. 308–316.
Bestler, C., "Flexible Data Structures and Interface Rituals for Rapid Development of OSD Applications," NCTA Tech. Jun. 6, 1993, pp. 223–236.
Gelman, et al., "A Store-And-Forward Architecture For Video-On-Demand Service," Jun. 1991 IEEE, pp. 842–846.
Sharpless, G.T., "Subscription Teletext For Value Added Services," IEE Transactions on Cons.Elec., Aug. No. 3, 1985, pp. 283–289.

*Primary Examiner*—Mark R. Powell
*Assistant Examiner*—Ba Huynh
*Attorney, Agent, or Firm*—Dorsey & Whitney LLP

[57] ABSTRACT

A viewer interface for a television program delivery system is described. The innovation relates to methods and devices for viewer pathways to television programs. Specifically, the interface involves hardware and software used in conjunction with a television at the viewer home to create a user friendly menu based approach to television program access. The device is particularly useful in a program delivery system with hundreds of programs and a data signal carrying program information. The disclosure describes menu generation and menu selection of television programs.

48 Claims, 61 Drawing Sheets

U.S. PATENT DOCUMENTS

| | | | |
|---|---|---|---|
| 3114375 | 5/1991 | Japan. | |
| D. 329,238 | 9/1992 | Grasso et al. | D14/218 |
| D. 331,760 | 12/1992 | Renk, Jr. | D14/218 |
| 3,891,792 | 6/1975 | Kimura | 348/622 |
| 4,361,848 | 11/1982 | Poignet et al. | 348/468 |
| 4,369,225 | 1/1983 | Washizuka | 428/334 |
| 4,488,179 | 12/1984 | Kruger et al. | 348/706 |
| 4,517,598 | 5/1985 | Van Valkenburg et al. | 348/478 |
| 4,587,520 | 5/1986 | Astle | 345/180 |
| 4,605,964 | 8/1986 | Chard | 348/461 |
| 4,688,218 | 8/1987 | Blineau et al. | 370/513 |
| 4,694,490 | 9/1987 | Harvey et al. | 380/20 |
| 4,697,209 | 9/1987 | Kiewit et al. | 348/1 |
| 4,706,121 | 11/1987 | Young | 348/27 |
| 4,712,105 | 12/1987 | Kohler | 340/825.79 |
| 4,724,491 | 2/1988 | Lambert | 348/411 |
| 4,792,972 | 12/1988 | Cook, Jr. | 380/20 |
| 4,829,558 | 5/1989 | Welsch | 348/1 |
| 4,829,569 | 5/1989 | Seth-Smith et al. | 348/3 |
| 4,860,379 | 8/1989 | Schoeneberger et al. | 455/4.1 |
| 4,876,736 | 10/1989 | Kiewit | 455/2 |
| 4,928,168 | 5/1990 | Iwashita | 348/3 |
| 4,947,429 | 8/1990 | Bestler et al. | 380/20 |
| 4,949,187 | 8/1990 | Cohen | 348/3 |
| 4,959,810 | 9/1990 | Darbee et al. | 340/825.57 |
| 4,961,109 | 10/1990 | Tanaka | 348/3 |
| 4,965,825 | 10/1990 | Harvey et al. | 380/9 |
| 4,975,951 | 12/1990 | Bennett | 380/20 |
| 4,977,455 | 12/1990 | Young | 348/460 |
| 5,001,554 | 3/1991 | Johnson et al. | 348/10 |
| 5,014,125 | 5/1991 | Pocock et al. | 348/7 |
| 5,015,829 | 5/1991 | Eilert et al. | 235/1 D |
| 5,020,129 | 5/1991 | Martin et al. | 455/4.2 |
| 5,027,400 | 6/1991 | Baji et al. | 380/20 |
| 5,036,394 | 7/1991 | Morii et al. | 348/468 |
| 5,036,537 | 7/1991 | Jeffers et al. | 348/1 |
| 5,046,093 | 9/1991 | Wachob | 380/20 |
| 5,047,867 | 9/1991 | Stubbe et al. | 348/564 |
| 5,077,607 | 12/1991 | Johnson et al. | 348/13 |
| 5,078,019 | 1/1992 | Aoki | 345/167 |
| 5,093,718 | 3/1992 | Hoarty et al. | 348/7 |
| 5,105,268 | 4/1992 | Yamanouchi et al. | 348/10 |
| 5,132,789 | 7/1992 | Ammon et al. | 348/6 |
| 5,132,992 | 7/1992 | Yurt et al. | 375/240 |
| 5,133,079 | 7/1992 | Ballantyne et al. | 455/4.1 |
| 5,144,663 | 9/1992 | Kudelski et al. | 380/16 |
| 5,150,118 | 9/1992 | Finkle et al. | 341/23 |
| 5,151,782 | 9/1992 | Ferraro | 348/7 |
| 5,151,789 | 9/1992 | Young | 348/734 |
| 5,155,591 | 10/1992 | Wachob | 348/9 |
| 5,166,886 | 11/1992 | Molnar et al. | 364/479.04 |
| 5,172,413 | 12/1992 | Bradley et al. | 380/20 |
| 5,182,639 | 1/1993 | Jutamulia et al. | 348/32 |
| 5,202,817 | 4/1993 | Koenck et al. | 361/680 |
| 5,206,954 | 4/1993 | Inoue et al. | 348/6 |
| 5,216,515 | 6/1993 | Steele et al. | 348/6 |
| 5,223,924 | 6/1993 | Strubbe | 348/7 |
| 5,237,311 | 8/1993 | Mailey et al. | 345/167 |
| 5,253,066 | 10/1993 | Vogel | 348/460 |
| 5,253,275 | 10/1993 | Yurt et al. | 375/240 |
| 5,260,778 | 11/1993 | Kauffman et al. | 348/6 |
| 5,283,639 | 2/1994 | Esch et al. | 348/6 |
| 5,285,272 | 2/1994 | Bradley et al. | 348/6 |
| 5,289,271 | 2/1994 | Watson | 348/1 |
| 5,293,540 | 3/1994 | Trani et al. | 348/584 |
| 5,319,455 | 6/1994 | Hoarty et al. | 348/7 |
| 5,319,707 | 6/1994 | Wasilewski et al. | 380/14 |
| 5,323,249 | 6/1994 | Amano et al. | 348/659 |
| 5,327,554 | 7/1994 | Palazzi, III et al. | 348/13 |
| 5,339,315 | 8/1994 | Maeda et al. | 348/7 |
| 5,341,474 | 8/1994 | Gelman et al. | 395/200.09 |
| 5,343,239 | 8/1994 | Lappington et al. | 348/12 |
| 5,345,594 | 9/1994 | Tsuda | 348/6 |
| 5,351,075 | 9/1994 | Herz et al. | 348/1 |
| 5,353,121 | 10/1994 | Young et al. | 348/563 |
| 5,355,162 | 10/1994 | Yazolino et al. | 348/11 |
| 5,357,276 | 10/1994 | Banker et al. | 348/7 |
| 5,367,571 | 11/1994 | Bowen et al. | 348/10 |
| 5,375,068 | 12/1994 | Palmer et al. | 364/514 C |
| 5,400,401 | 3/1995 | Wasilewski et al. | 380/9 |
| 5,404,393 | 4/1995 | Remillard | 379/96 |
| 5,410,326 | 4/1995 | Goldstein | 348/374 |
| 5,410,344 | 4/1995 | Graves et al. | 348/1 |
| 5,412,416 | 5/1995 | Nemirofsky | 348/10 |
| 5,414,426 | 5/1995 | O'Donnell et al. | 341/176 |
| 5,416,508 | 5/1995 | Sakuma et al. | 348/3 |
| 5,432,542 | 7/1995 | Thibadeau et al. | 348/6 |
| 5,442,626 | 8/1995 | Wei | 348/348 |
| 5,446,919 | 8/1995 | Wilkins | 348/10 |
| 5,469,206 | 11/1995 | Strubbe et al. | 348/7 |
| 5,473,362 | 12/1995 | Fitzgerald et al. | 348/7 |
| 5,477,263 | 12/1995 | O'Callaghan et al. | 348/7 |
| 5,479,268 | 12/1995 | Young et al. | 386/83 |
| 5,481,294 | 1/1996 | Thomas et al. | 348/1 |
| 5,481,296 | 1/1996 | Cragun et al. | 348/13 |
| 5,481,542 | 1/1996 | Logston et al. | 348/7 |
| 5,483,278 | 1/1996 | Strubbe et al. | 348/7 |
| 5,515,098 | 5/1996 | Carles | 348/8 |

FOREIGN PATENT DOCUMENTS

| | | |
|---|---|---|
| 5250106 | 9/1993 | Japan. |
| 1204190 | 9/1970 | United Kingdom. |
| 2168227 | 6/1986 | United Kingdom. |
| 8601962 | 3/1986 | WIPO. |
| 8909528 | 10/1989 | WIPO. |
| 9100670 | 1/1991 | WIPO. |
| 9103112 | 3/1991 | WIPO. |
| 9211713 | 7/1992 | WIPO. |
| 9212599 | 7/1992 | WIPO. |
| 9217027 | 10/1992 | WIPO. |
| 9221206 | 11/1992 | WIPO. |
| 9322877 | 11/1993 | WIPO. |

SET TOP TERMINAL FOR CABLE TELEVISION DELIVERY SYSTEMS

RELATED APPLICATIONS

This application is a continuation-in-part of application Ser. No. 07/991,074 filed Dec. 9, 1992 entitled TELEVISION PROGRAM PACKAGING AND DELIVERY SYSTEM WITH MENU DRIVEN SUBSCRIBER ACCESS. The following other continuation-in-part applications, also based on the above-referenced patent application, are incorporated herein by reference:

Ser. No. 08/160,281, entitled REPROGRAMMABLE TERMINAL FOR SUGGESTING PROGRAMS OFFERED ON A TELEVISION PROGRAM DELIVERY SYSTEM, filed on Dec. 2, 1993

Ser. No. 08/160,280, entitled NETWORK CONTROLLER FOR CABLE TELEVISION DELIVERY SYSTEMS, filed on Dec. 2, 1993

Ser. No. 08/160,282, entitled AN OPERATIONS CENTER FOR A TELEVISION PROGRAM PACKAGING AND DELIVERY SYSTEM, filed on Dec. 2, 1993

Ser No. 08/160,094, entitled ADVANCED SET TOP TERMINAL FOR CABLE TELEVISION DELIVERY SYSTEMS, filed on Dec. 2, 1993

Ser. No. 08/160,283, entitled DIGITAL CABLE HEADEND FOR CABLE TELEVISION DELIVERY SYSTEM, filed on Dec. 2, 1993.

TECHNICAL FIELD

The invention relates to television entertainment systems for providing television programming to consumer homes. More particularly, the invention relates to a set top terminal for use with a program delivery system with menu selection of programs.

BACKGROUND OF THE INVENTION

Advances in television entertainment have been primarily driven by breakthroughs in technology. In 1939, advances on Vladmir Zworykin's picture tube provided the stimulus for NBC to begin its first regular broadcasts. In 1975, advances in satellite technology provided consumers with increased programming to homes.

Many of these technology breakthroughs have produced inconvenient systems for consumers. One example is the ubiquitous three remote control home, having a separate and unique remote control for the TV, cable box and VCR. More recently, technology has provided cable users in certain parts of the country with 100 channels of programming. This increased program capacity is beyond the ability of many consumers to use effectively. No method of managing the program choices has been provided to consumers.

Consumers are demanding that future advances in television entertainment, particularly programs and program choices, be presented to the consumer in a user friendly manner. Consumer preferences, instead of technological breakthroughs, will drive the television entertainment market for at least the next 20 years. As computer vendors have experienced a switch from marketing new technology in computer hardware to marketing better useability, interfaces and service, the television entertainment industry will also experience a switch from new technology driving the market to consumer useability driving the market.

Consumers want products incorporating new technology that are useful, and will no longer purchase new technology for the sake of novelty or status. Technological advances in sophisticated hardware are beginning to surpass the capability of the average consumer to use the new technology. Careful engineering must be done to make entertainment products incorporating new technology useful and desired by consumers.

In order for new television entertainment products to be successful, the products must satisfy consumer demands. TV consumers wish to go from limited viewing choices to a variety of choices, from no control of programming to complete control. Consumers wish to advance from cumbersome and inconvenient television to easy and convenient television and keep costs down. Consumers do not wish to pay for one hundred channels when due to lack of programming information, they seldom, if ever, watch programming on many of these channels.

The concepts of interactive television, high definition television and 300 channel cable systems in consumer homes will not sell if they are not packaged, delivered and presented in a useable fashion to consumers. The problem is that TV programming is not being delivered and presented to consumers in a user friendly manner.

Consumers are already being bombarded with programming options, numerous "free" cable channels, subscription cable channels and pay-per-view choices. Any further increase in TV entertainment choices, without a user friendly presentation and approach, will likely bewilder viewers with a mind-numbing array of choices.

The TV industry has traditionally marketed and sold its programs to consumers in bulk, such as continuous feed broadcast and long-term subscriptions to movie channels. The TV industry has been unable to sell its programming in large quantities on a per unit basis, such as the ordering of one program. Consumers prefer a unit sales approach because it keeps costs down and allows the consumer to be more selective in their viewing.

In addition, viewership fragmentation, which has already begun, will increase. Programming not presented in a user friendly manner will suffer with a decrease in viewership and revenue.

What is needed is a system which can deliver and present television programming through a user friendly interface which allows the consumer to easily select from among the many program choices.

What is needed is a set top converter that provides a user friendly interface for subscribers to access television programs.

What is needed is a set top converter that allows users to easily navigate through hundreds of programming choices using on-screen menus.

What is needed is a set top converter that allow subscribers to select a program from among hundreds of choices without a television viewing guide.

What is needed is a method that allows efficient access to hundreds of television programming options.

What is needed is hardware that provides an upgrade capability allowing the use of existing set top converter technology in advanced program delivery systems.

What is needed is technology that upgrades the functionality of existing set top converters.

What is needed is a set top converter that provides an upstream communications capability between the set top converter and cable headend.

What is needed is a set top converter that provides a capability of generating menus for display.

What is needed is a set top converter that provides a simple way to select a program from a menu.

What is needed is a set top converter that provides pay-per-view type program access in the same system as specialty channel and broadcast television access.

What is needed is a set top converter that allows users to subscribe on-screen to specialty channels.

What is needed is a set top converter that monitors subscriber viewing choices for statistical purposes.

What is needed is a set top converter that provides on-screen billing information to subscribers.

What is needed is a set top converter that provides sophisticated on-screen television menus which can incorporate still video or moving video.

What is needed is a set top converter that provides a capability of scaling and redirecting video for menus.

What is needed is a set top converter that provides a capability of using a program signal with a split screen video for menus. The present invention is addressed to fulfill these needs.

SUMMARY OF INVENTION

The present invention is a set top converter box or terminal for a television program delivery system. More specifically, the present invention is an advanced set top converter box that acts as a terminal in the viewer home. The set top terminal is a key component of a digital cable television delivery system. The set top terminal provides for menu generation and menu selection of television programming.

The set top terminal is the portion of the program delivery system that resides in the home of a subscriber. The set top terminal has input and output ports that enable it to communicate with other local and remote devices. In the preferred embodiment, the set top terminal has an input port that is capable of receiving information from a cable headend. In addition, the unit has at least two output ports which provide communications from the set top terminal to a television, VCR or other electronic component in the viewer home. Also, the set top terminal contains a phone jack which can be used for maintenance, trouble shooting, reprogramming and additional customer features. The set top terminal may contain stereo/audio output terminals and a satellite dish input port.

Functionally, the set top terminal is the last component in the delivery system chain. In the preferred embodiment, the set top terminal receives compressed program and control signals from the cable headend (or, in some cases, directly from the operations center). After the set top terminal receives the individually compressed program and control signals, the signals are demultiplexed, decompressed, converted to analog signals (if necessary) and either placed in local storage (from which the menu template may be created), executed immediately, or sent directly to the television screen.

After processing certain signals received from the cable headend, the set top terminal is able to store an array of menu templates for creating menus that are displayed on a subscriber's television. Menu templates are created and sent to the set top terminal for storage. A microprocessor uses the control signals received from the operations center or cable headend to generate the menu templates for storage. Each menu template is stored in volatile memory in the set top terminal. When the set top terminal receives template information it may demultiplex the program control signals received from the cable headend into three primary parts: video, graphics and text. Each menu template represents a different portion of a whole menu, such as a menu background, television logo, cursor highlight overlay, or other miscellaneous components needed to build a menu. The menu templates may be deleted or altered using control signals received from the operations center or cable headend.

Once the menu templates have been stored in memory, the set top terminal can generate the appropriate menus. In the preferred embodiment, the basic menu format information is stored in memory located within the set top terminal so that the microprocessor may locally access the information from the set top terminal instead of from an incoming signal. The microprocessor next generates the appropriate menus from the menu templates and the other menu information stored in memory. The set top terminal then displays specific menus on the subscriber's television screen that correspond to the inputs the subscriber selects. If the subscriber selects a specific program from a menu, the set top terminal determines on which channel the program is being shown, demultiplexes and extracts the single channel transmitted from the cable headend.

In addition to menu information, the set top terminal may also store text transmitted from the cable headend or the operations center. The text may inform the subscriber about upcoming events, billing and account status, new subscriptions, or other relevant information. The text will be stored in an appropriate memory location depending on the frequency and the duration of the use of the textual message. The set top terminal can also support on-line data base services, interactive multi-media services, access to digital radio channels, and other services.

In the simplest embodiment, available converter boxes such as those manufactured by General Instruments or Scientific Atlanta, may be modified and upgraded to perform the functions of a set top terminal. The preferred upgrade is a circuit card with a microprocessor which is electronically connected to the converter box.

It is an object of the invention to provide a user friendly interface for subscribers to access television programs.

It is an object of the invention to allow users to easily navigate through hundreds of programming choices using on-screen menus.

It is an object of this invention to allow subscribers to select a program from among hundreds of choices without a television viewing guide.

It is an object of this invention to efficiently access hundreds of television programming options.

It is an object of this invention to provide an upgrade capability allowing the use of existing set top converter technology in an advanced program delivery system.

It is an object of this invention to upgrade the functionality of existing set top converters.

It is an object of this invention to provide an upstream communications capability between the set top converter and cable headend.

It is an object of this invention to provide a set top terminal capable of generating menus for display.

It is an object of this invention to provide a way to select a program from a menu with the push of one button.

It is an object of this invention to provide pay-per-view type program access in the same system as specialty channel and broadcast television access.

It is an object of this invention to allow users to subscribe on-screen to specialty channels.

It is an object of this invention to monitor subscriber viewing choices for statistical purposes.

It is an object of this invention to provide on-screen billing information to subscribers.

It is an object of this invention to provide sophisticated on-screen television menus which can incorporate still video or moving video.

It is an object of this invention to provide a set top terminal capable of scaling and redirecting video for menus.

It is an object of this invention to provide a set top terminal capable of using a program signal with a split screen video for menus.

These and other objects and advantages of the invention will become obvious to those skilled in the art upon review of the following description, the attached drawings and appended claims.

DETAILED DESCRIPTION OF THE PREFERRED EMBODIMENT

A. Television Program Delivery System Description

1. Introduction

Figure 1:
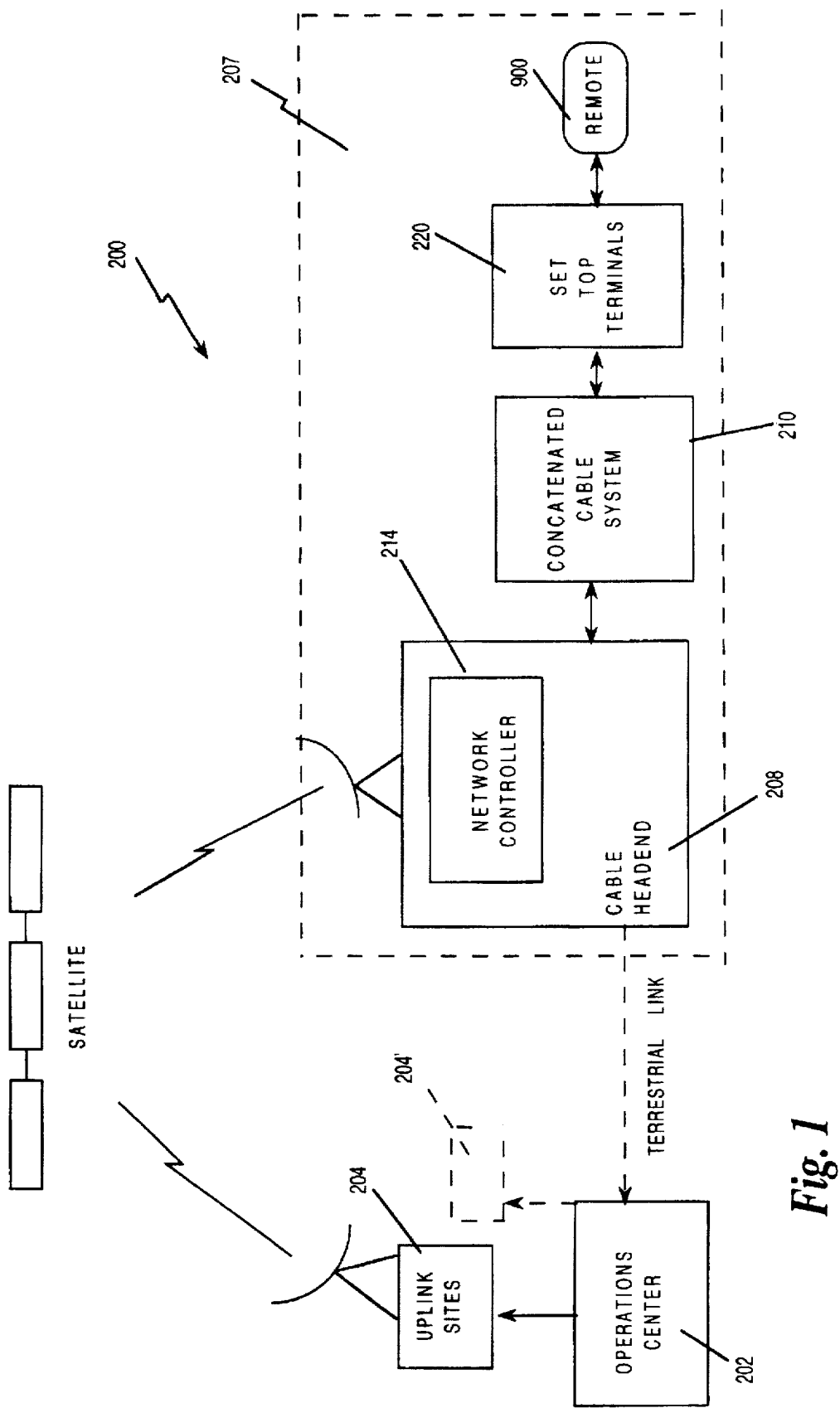
FIG. 1 is a diagram of the primary components of the television delivery system.

FIG. 1 shows the present invention as part of an expanded cable television program delivery system 200 that dramatically increases programming capacity using compressed transmission of television program signals. Developments in digital bandwidth compression technology now allow much greater throughput of television program signals over existing or slightly modified transmission media. The program delivery system 200 shown provides subscribers with a user friendly interface to operate and exploit a six-fold or more increase in current program delivery capability.

Subscribers are able to access an expanded television program package and view selected programs through a menu-driven access scheme that allows each subscriber to select individual programs by sequencing a series of menus. The menus are sequenced by the subscriber using simple alpha-numeric and iconic character access or moving a cursor or highlight bar on the TV screen to access desired programs by simply pressing a single button, rather than recalling from memory and pressing the actual two or more digit numeric number assigned to a selection. Thus, with the press of a single button, the subscriber can advance from one menu to the next. In this fashion, the subscriber can sequence the menus and select a program from any given menu. The programs are grouped by category so that similar program offerings are found on the same menu.

2. Major System Components

In its most basic form, the system uses a program delivery system 200 in conjunction with a conventional concatenated cable television system 210. The program delivery system 200 generally includes (i) at least one operations center 202, where program packaging and control information are created and then assembled in the form of digital data, (ii) a digital compression system, where the digital data is compressed, combined/multiplexed, encoded, and mapped into digital signals for satellite transmission to the cable headend 208, and (iii) a set of in-home decompressors. The program delivery system 200 transports the digital signals to the cable headend 208 where the signals are transmitted through a concatenated cable television system 210. Within the cable headend 208, the received signals may be decoded, demultiplexed, managed by a local central distribution and switching mechanism, combined and then transmitted to the set top terminal 220 located in each subscriber's home over the cable system 210. Although concatenated cable systems 210 are the most prevalent transmission media to the home, telephone lines, cellular networks, fiberoptics, Personal Communication Networks and similar technology for transmitting to the home can be used interchangeably with this program delivery system 200.

Figure 2:
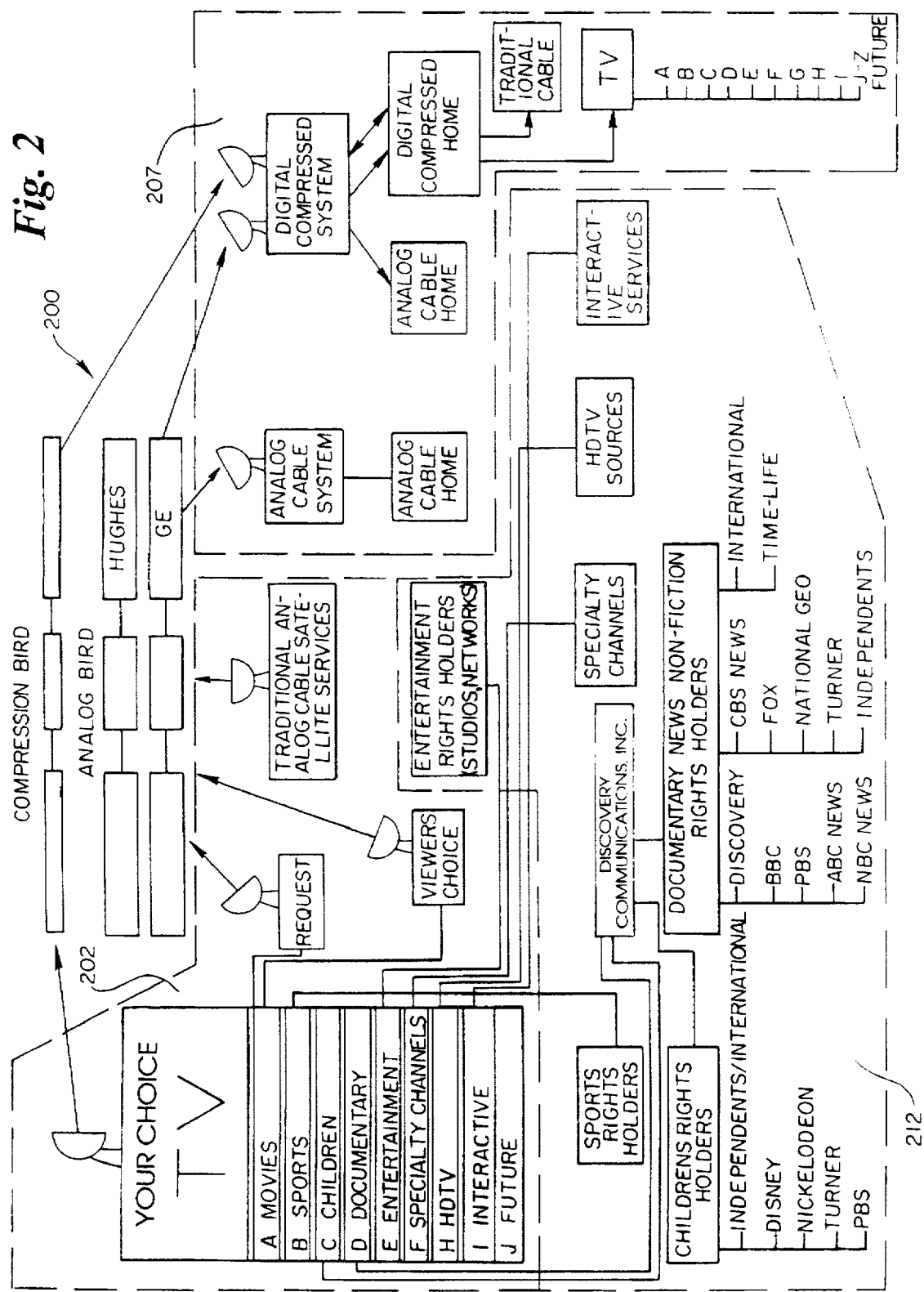
FIG. 2 is an overview of the television delivery system operations.

As shown in FIGS. 1 and 2, the delivery system 200 has a reception region 207 with an in-home decompression capability. This capability is performed by a decompressor housed within a set top terminal 220 in each subscriber's home. The decompressor remains transparent from the subscriber's point of view and allows any of the compressed signals to be demultiplexed and individually extracted from the composite data stream and then individually decompressed upon selection by the subscriber. The decompressed video signals are converted into analog signals for television display. Such analog signals include NTSC formatted signals for use by a standard television. Control signals are likewise extracted and decompressed and then either executed immediately or placed in local storage such as a RAM. Multiple sets of decompression hardware may be used to decompress video and control signals. The set top terminal 220 may then overlay or combine different signals to form the desired display on the subscriber's television. Graphics on video or picture-on-picture are examples of such a display.

Although a single digital compression standard (e.g., MPEG) may be used for both the program delivery system 200 and the concatenated cable system 210, the compression technique used may differ between the two systems. When the compression standards differ between the two media, the signals received by the cable headend 208 must be decompressed before transmission from the headend 208 to the set top terminals 220. Subsequently, the cable headend 208 must recompress and transmit the signals to the set top terminal 220, which would then decompress the signals using a specific decompression algorithm.

The video signals and program control signals received by the set top terminal 220 correspond to specific television programs and menu selections that each subscriber may access through a subscriber interface. As shown in FIG. 1 and 2, the subscriber interface is a device with buttons located on the set top terminal 220 or on a portable remote control 900. In the preferred system embodiment, the subscriber interface is a combined alpha-character, numeric and iconic remote control device 900, which provides direct or menu-driven program access. The preferred subscriber interface also contains cursor movement and go buttons as well as alpha, numeric and iconic buttons. This subscriber interface and menu arrangement enables the subscriber to sequence through menus by choosing from among several menu options that are displayed on the television screen. In addition, a user may bypass several menu screens and immediately choose a program by selecting the appropriate alpha-character, numeric or iconic combinations on the subscriber interface. In the preferred embodiment, the set top terminal 220 generates the menus that are displayed on the television by creating arrays of particular menu templates, and the set top terminal 220 displays a specific menu or submenu option for each available video signal.

3. Operations Center and Digital Compression System

The operations center 202 performs two primary services, packaging television programs and generating the program control information signal. At the operations center 202, television programs are received from external program sources in both analog and digital form. FIG. 2 shows an embodiment of the operations center receiving signals from various external sources 212. Examples of the external program sources are sporting events, children's programs, specialty channels, news or any other program source that can provide audio or visual signals. Once the programs are received from the external program sources, the operations center 202 digitizes (and preferably compresses) any program signals received in analog form. The operations center 202 may also maintain an internal storage of programs. The internally stored programs may be in analog or digital form and stored on permanent or volatile memory sources, including magnetic tape or RAM. Subsequent to receiving programming, the operations center 202 packages the programs into the groups and categories which provide the optimal marketing of the programs to subscribers. For example, the operations center 202 may package the same programs into different categories and menus for weekday, prime-time viewing and Saturday afternoon viewing. Also, the operations center 202 packages the television programs in a manner that enables both the various menus to easily represent the programs and the subscribers to easily access the programs through the menus.

The packaging of the digital signals is typically performed at the operations center 202 by computer assisted packaging equipment (CAP). The CAP system normally includes at least one computer monitor, keyboard, mouse, and standard video editing equipment. A programmer packages the signals by entering certain information into the CAP. This information includes the date, time slot, and program category of the various programs. The programmer and the CAP utilize demographic data and ratings in performing the packaging tasks. After the programmer selects the various programs from a pool of available programs and inputs the requisite information, the programmer, with assistance from the CAP, can select the price and allocate transponder space for the various programs. After the process is complete, the CAP displays draft menus or program schedules that correspond to the entries of the programmer. The CAP may also graphically display allocation of transponder space. The programmer may edit the menus and transponder allocation several times until satisfied with the programming schedule. During the editing, the programmer may direct the exact location of any program name on a menu with simple commands to the CAP.

The packaging process also accounts for any groupings by satellite transponder which are necessary. The operations center 202 may send different groups of programs to different cable headends 208 and/or set top terminals 220 (FIG. 1). One way the operations center 202 may accomplish this task is to send different program packages to each transponder. Each transponder, or set of transponders, then relays a specific program package to specific cable headends 208 and/or set top terminals 220. The allocation of transponder space is an important task performed by the operations center 202.

The operations center 202 may also "insert" directions for filling local available program time in the packaged signal to enable local cable and television companies to fill the program time with local advertising and/or local programming. Consequently, the local cable headends 208 are not constrained to show only programs transmitted from the operations center 202. New set top converters will incorporate both digital and analog channels. Therefore, the cable headend 208 may combine analog signals with the digital signals prior to transmitting the program signals to the set top terminals 220.

After the CAP packages the programs, it creates a program control information signal to be delivered with the program package to the cable headend 208 and/or set top terminal 220. The program control information signal contains a description of the contents of the program package, commands to be sent to the cable headend 208 and/or set top terminal 220, and other information relevant to the signal transmission.

In addition to packaging the signal, the operations center 202 employs digital compression techniques to increase existing satellite transponder capacity by at least a 4:1 ratio, resulting in a four-fold increase in program delivery capability. A number of digital compression algorithms currently exist which can achieve the resultant increase in capacity and improved signal quality desired for the system. The algorithms generally use one or more of three basic digital compression techniques: (1) within-frame (intraframe) compression, (2) frame-to-frame (interframe) compression, and (3) within carrier compression. Specifically, in the preferred embodiment, the MPEG 2 compression method is used. After digital compression, the signals are combined (multiplexed) and encoded. The combined signal is subsequently transmitted to various uplink sites 204.

There may be a single uplink site 204 or multiple uplink sites (represented by 204', shown in phantom in FIG. 1) for each operation center 202. The uplink sites 204 may either be located in the same geographical place or may be located remotely from the operations center 202. Once the composite signal is transmitted to the uplink sites 204, the signal may be multiplexed with other signals, modulated, upconverted and amplified for transmission over satellite. Multiple cable headends 208 may receive such transmissions.

In addition to multiple uplinks, the delivery system 200 may also contain multiple operations centers. The preferred method for using multiple operations centers is to designate one of the operations centers as a master operations center and to designate the remaining operations centers as slave operations centers. In this configuration, the master operations center coordinates various functions among the slave operations centers such as synchronization of simultaneous transmissions and distributes the operations workload efficiently.

4. Cable Headend

After the operations center 202 has compressed and encoded the program signals and transmitted the signals to the satellite, the cable headend 208 receives and further processes the signals before they are relayed to each set top terminal 220. Each cable headend site is generally equipped with multiple satellite receiver dishes. Each dish is capable of handling multiple transponder signals from a single satellite and sometimes from multiple satellites.

As an intermediary between the set top terminals 220 and the operations center 202 (or other remote site), the cable headend 208 performs two primary functions. First, the cable headend 208 acts as a distribution center, or signal processor, by relaying the program signal to the set top terminal 220 in each subscriber's home. In addition, the cable headend 208 acts as a network controller 214 by receiving information from each set top terminal 220 and passing such information on to an information gathering site such as the operations center 202.

Figure 3:
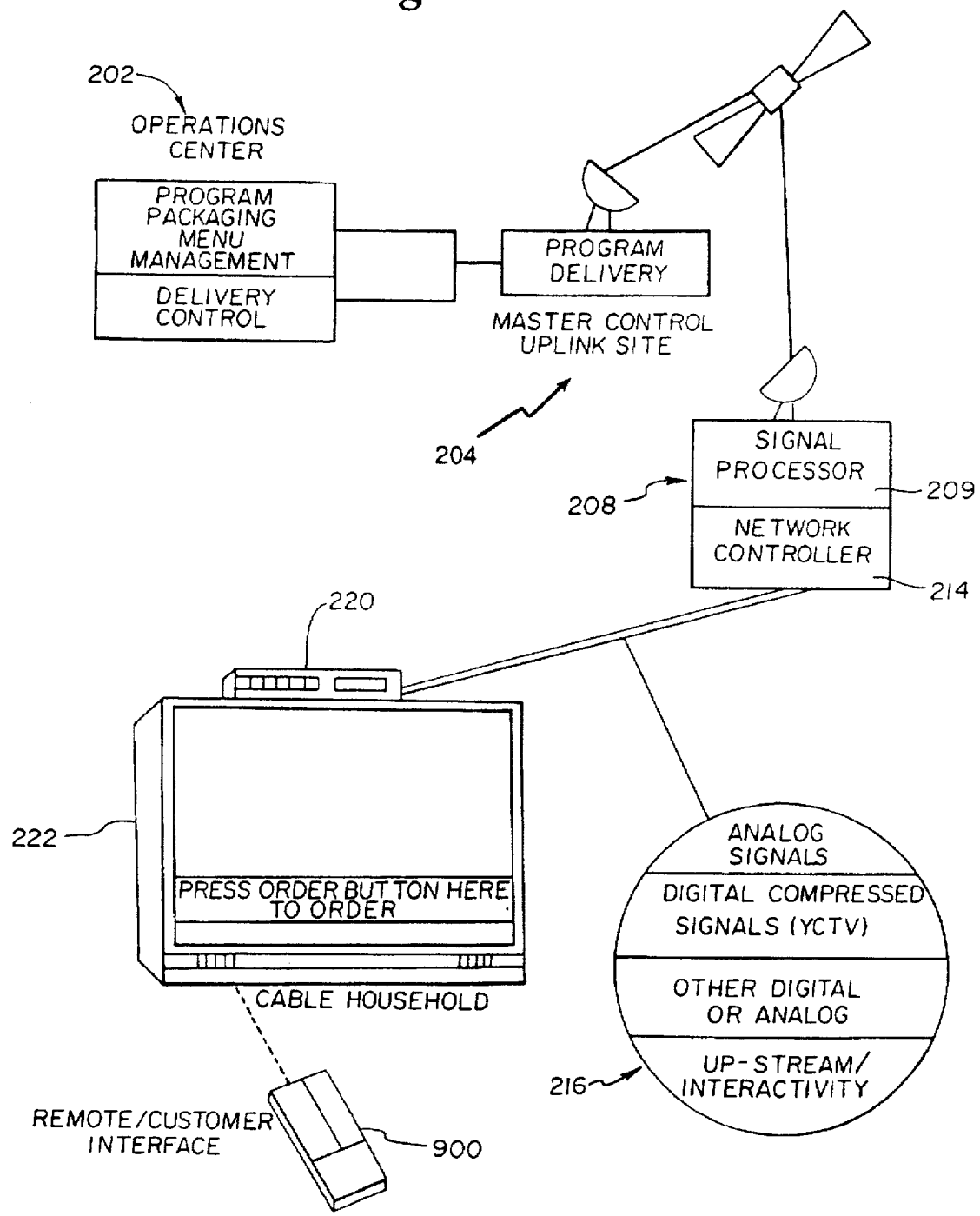
FIG. 3 is a schematic of the operation of the primary components of the system.

FIG. 3 shows an embodiment where the cable headend 208 and the subscriber's home are linked by certain communications media 216. In this particular embodiment, analog signals, digitally compressed signals, other digital signals and up-stream/interactivity signals are sent and received over the media 216. The cable headend 208 provides such signaling capabilities in its dual roles as a signal processor 209 and network controller 214.

As a signal processor 209, the cable headend 208 prepares the program signals that are received by the cable headend 208 for transmission to each set top terminal 220. In the preferred system, the signal processor 209 re-routes or demultiplexes and recombines the signals and digital information received from the operations center 202 and allocates different portions of the signal to different frequency ranges. Cable headends 208 which offer different subscribers different program offerings may allocate the program signals from the operations center 202 in various manners to accommodate different viewers. The signal processor 209 may also incorporate local programming and/or local advertisements into the program signal and forward the revised signal to the set top terminals 220. To accommodate this local programming availability, the signal processor 209 must combine the local signal in digital or analog form with the operations center program signals. If the local cable system uses a compression standard that is different than the one used by the operations center 202, the signal processor 209 must also decompress and recompress incoming signals so they may be properly formatted for transmission to the set top terminals 220. This process becomes less important as standards develop (i.e., MPEG 2). In addition, the signal processor 209 performs any necessary signal decryption and/or encryption.

As a network controller 214, the cable headend 208 performs the system control functions for the system. The primary function of the network controller 214 is to manage the configuration of the set top terminals 220 and process signals received from the set top terminals 220 (as shown in FIG. 1). In the preferred embodiment, the network controller 214 monitors, among other things, automatic poll-back responses from the set top terminals 220 remotely located at each subscriber's home. The polling and automatic report-back cycle occurs frequently enough to allow the network controller 214 to maintain accurate account and billing information as well as monitor authorized channel access. In the simplest embodiment, information to be sent to the network controller 214 will be stored in RAM within each subscriber's set top terminal 220 and will be retrieved only upon polling by the network controller 214. Retrieval may, for example, occur on a daily, weekly or monthly basis. The network controller 214 allows the system to maintain complete information on all programs watched using a particular set top terminal 220.

The network controller 214 is also able to respond to the immediate needs of a set top terminal 220 by modifying a program control information signal received from the operations center 202. Therefore, the network controller 214 enables the delivery system to adapt to the specific requirements of individual set top terminals 220 when the requirements cannot be provided to the operations center 202 in advance. In other words, the network controller 214 is able to perform "on the fly programming" changes. With this capability, the network controller 214 can handle sophisticated local programming needs such as, for example, interactive television services, split screen video, and selection of different foreign languages for the same video. In addition, the network controller 214 controls and monitors all compressors and decompressors in the system.

The delivery system 200 and digital compression of the preferred embodiment provides a one-way path from the operations center 202 to the cable headend 208. Status and billing information is sent from the set top terminal 220 to the network controller 214 at the cable headend 208 and not directly to the operations center 202. Thus, referring to FIG. 3 program monitoring and selection control will take place only at the cable headend 208 by the local cable company and its decentralized network controllers 214 (i.e., decentralized relative to the operations center 202, which is central to the program delivery system 200). The local cable company will in turn be in communication with the operations center 202 or a regional control center (not shown) which accumulates return data from the set top terminal 220 for statistical or billing purposes. In alternative system embodiments, the operations center 202 and the statistical and billing sites are collocated. Further, telephone lines with modems are used to transfer information from the set top terminal 220 to the statistical and billing sites.

5. Set Top Terminal

The set top terminal 220 is the portion of the delivery system 200 that resides in the home of a subscriber. The set top terminal 220 (shows in FIGS. 6a and 6b) is usually located above or below the subscriber's television, but it may be placed anywhere in or near the subscriber's home as long as it is within the range of the subscriber's remote control device 900 (FIG. 3). In some aspects, the set top terminal 220 may resemble converter boxes already used by many cable systems. For instance, each set top terminal 220 may include a variety of error detection, decryption, and coding techniques such as anti-taping encoding. However, it will become apparent from the discussion below that the set top terminal 220 is able to perform many functions that an ordinary converter box cannot perform.

The set top terminal 220 has a plurality of input and output ports to enable it to communicate with other local and remote devices. The set top terminal 220 has an input port that receives information from the cable headend 208. In addition, the unit has at least two output ports which provide communications from the set top terminal 220 to a television and a VCR. Certain menu selections may cause the set top terminal 220 to send control signals directly to the VCR to automatically program or operate the VCR. Also, the set top terminal 220 contains a phone jack which can be used for maintenance, trouble shooting, reprogramming and additional customer features. The set top terminal 220 may also contain stereo/audio output terminals and a satellite dish input port.

Functionally, the set top terminal 220 is the last component in the delivery system chain. The set top terminal 220 receives compressed program and control signals from the cable headend 208 (or, in some cases, directly from the operations center 202). After the set top terminal 220 receives the individually compressed program and control signals, the signals are demultiplexed, decompressed, converted to analog signals (if necessary) and either placed in local storage (from which the menu template may be created), executed immediately, or sent directly to the television screen.

Figure 27A:
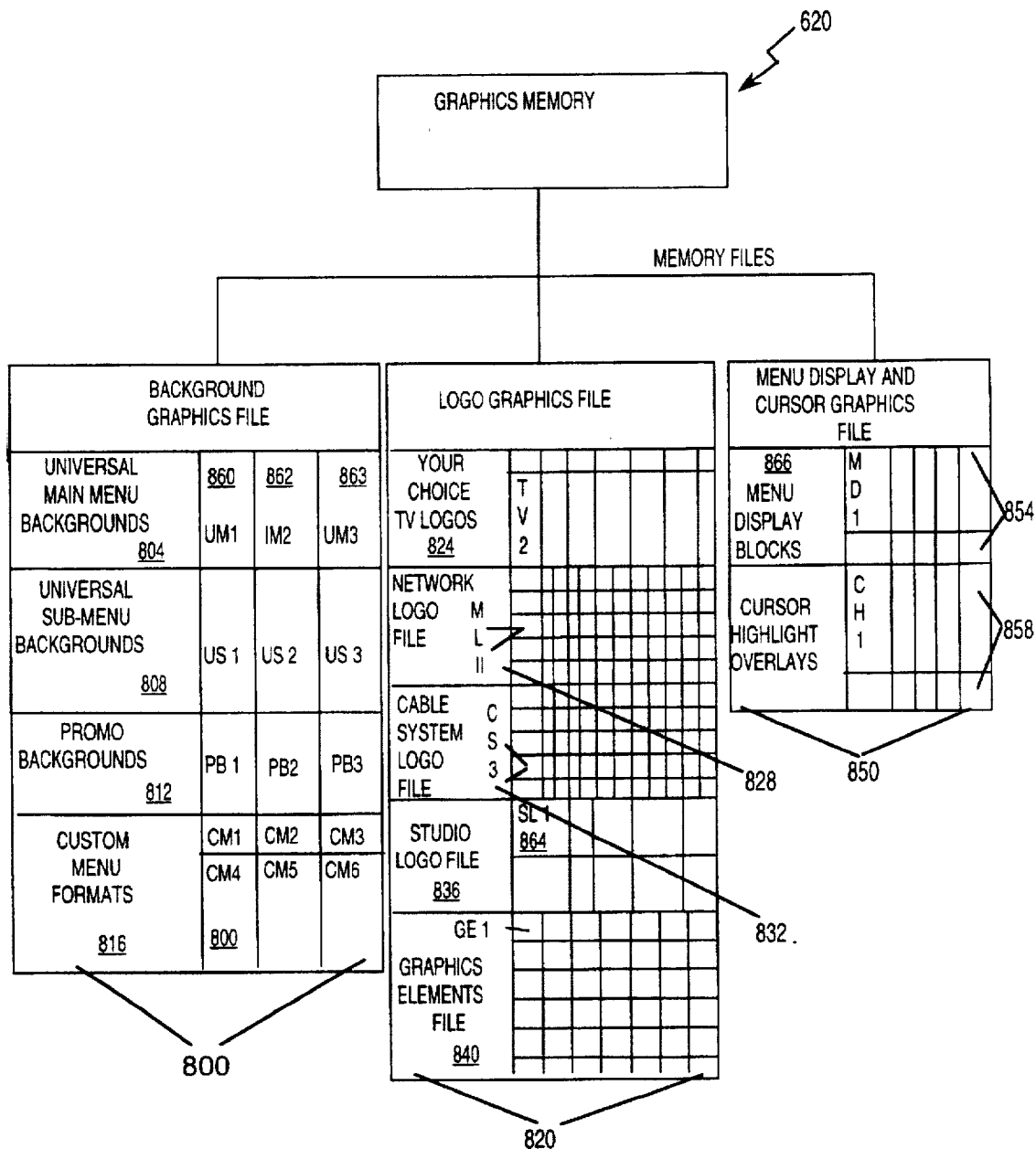
FIG. 27a is a drawing of storage for on-screen menu templates stored in graphics memory of the set top terminal.
Figure 27B:
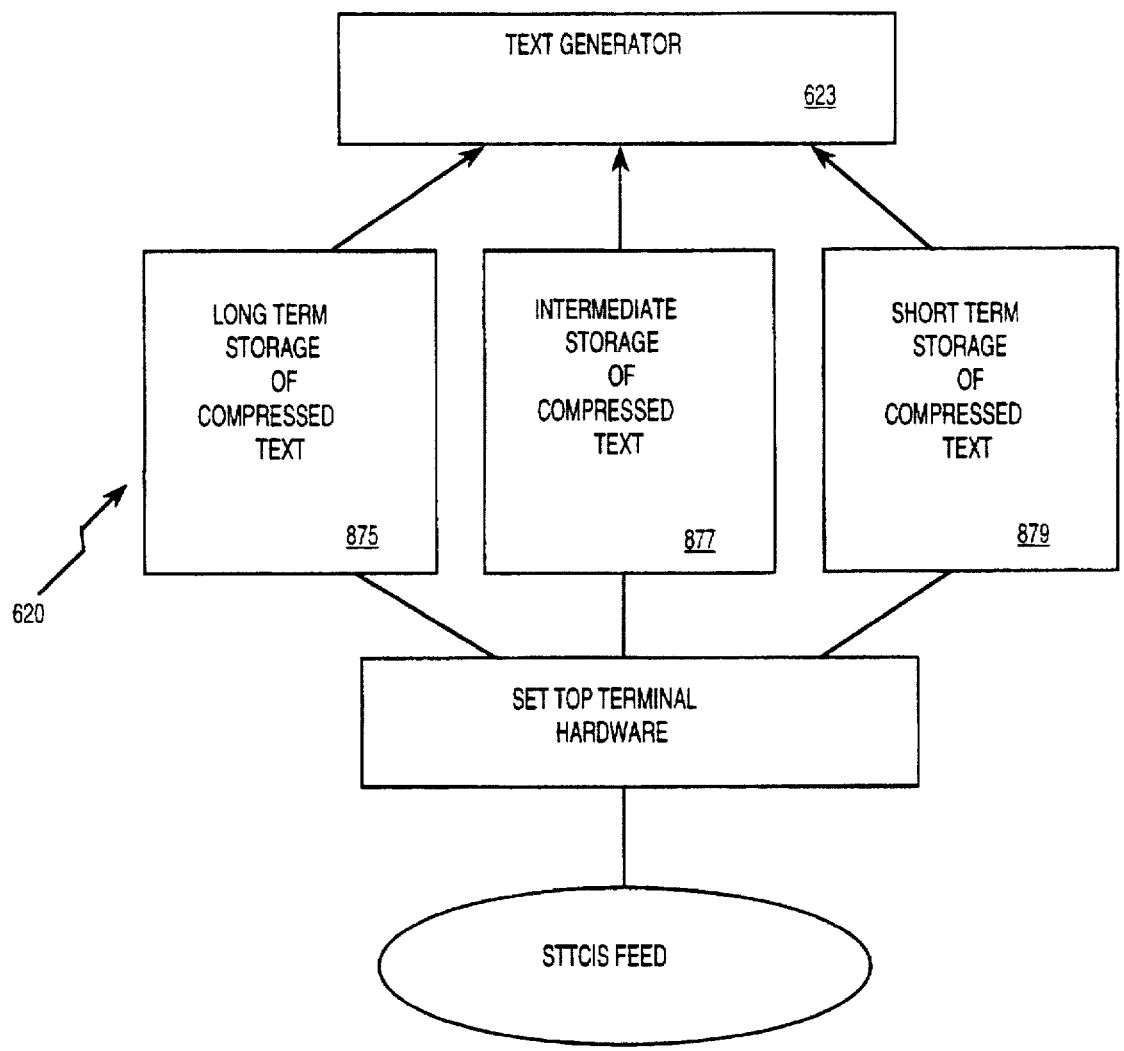
FIG. 27b is a drawing showing the hierarchical storage of text for the set top terminal.
Figure 27C:
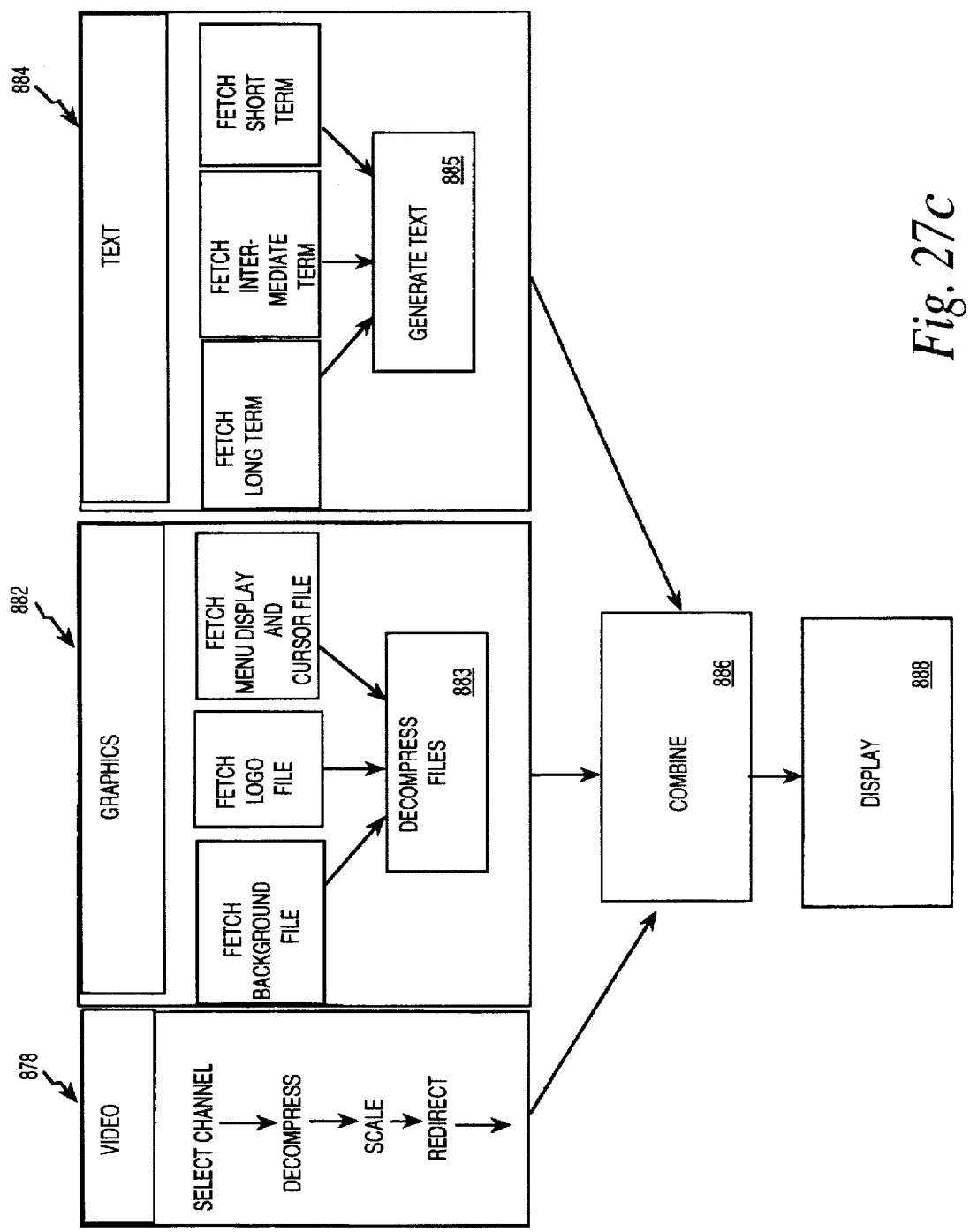
FIG. 27c is a drawing of a flow chart showing the steps required for the microprocessor to retrieve, combine and display a menu.

Referring to FIGS. 27a, 27b and 27c, after processing certain signals received from the cable headend 208, the set top terminal 220 is able to store menu templates for creating menus that are displayed on a subscriber's television by using an array of menu templates. Before a menu can be constructed, menu templates must be created and sent to the set top terminal 220 for storage. A microprocessor uses the control signals received from the operations center 202 or cable headend 208 to generate the menu templates for storage. Each menu template may be stored in volatile memory in the set top terminal 220. When the set top terminal receives template information it demultiplexes the program control signals received from the cable headend 208 into four primary parts: video, graphics, program logic and text. Each menu template represents a different portion of a whole menu, such as a menu background, television logo, cursor highlight overlay, or other miscellaneous components needed to build a menu. The menu templates may be deleted or altered using control signals received from the operations center 202 or cable headend 208.

Once the menu templates have been stored in memory, the set top terminal 220 can generate the appropriate menus. In the preferred embodiment, the basic menu format information is stored in memory located within the set top terminal 220 so that the microprocessor may locally access the information from the set top terminal instead of from an incoming signal. The microprocessor next generates the appropriate menus from the menu templates and the other menu information stored in memory. The set top terminal 220 then displays specific menus on the subscriber's television screen that correspond to the inputs the subscriber selects.

If the subscriber selects a specific program from a menu, the set top terminal 220 determines on which channel the program is being shown, demultiplexes and extracts the single channel transmitted from the cable headend 208. The set top terminal 220 then decompresses the channel and, if necessary, converts the program signal to an analog NTSC signal to enable the subscriber to view the selected program. The set top terminal 220 can be equipped to decompress more than one program signal, but this would unnecessarily add to the cost of the unit since a subscriber will generally only view one program at a time. However, two or three decompressors may be desirable to provide picture-on-picture capability, control signal decompression, enhanced channel switching or like features.

In addition to menu information, the set top terminal 220 may also store text transmitted from the cable headend 208 or the operations center 202. The text may inform the subscriber about upcoming events, billing and account status, new subscriptions, or other relevant information. The text will be stored in an appropriate memory location depending on the frequency and the duration of the use of the textual message.

Also, optional upgrades are available to enhance the performance of a subscriber's set top terminal 220. These upgrades may consist of a cartridge or computer card (not shown) that is inserted into an expansion slot in the set top terminal 220 or may consist of a feature offered by the cable headend 208 or operations center 202 to which the user may subscribe. Available upgrades may include on line data base services, interactive multi-media services, access to digital radio channels, and other services.

In the simplest embodiment, available converter boxes such as those manufactured by General Instruments or Scientific Atlanta, may be modified and upgraded to perform the functions of a set top terminal 220. The preferred upgrade is a circuit card with a microprocessor which is electronically connected to or inserted into the converter box.

6. Remote Control Device

The primary conduit for communication between the subscriber and the set top terminal 220 is through the subscriber interface, preferably a remote control device 900. Through this interface, the subscriber may select desired programming through the system's menu-driven scheme or by directly accessing a specific channel by entering the actual channel number. Using the interface, the subscriber can navigate through a series of informative program selection menus. By using menu-driven, iconic or alpha-character access, the subscriber can access desired programs by simply pressing a single button rather than recalling from memory and pressing the actual channel number to make a selection. The subscriber can access regular broadcast and basic cable television stations by using either the numeric keys on the remote control 900 (pressing the corresponding channel number), or one of the menu icon selection options.

In addition to enabling the subscriber to easily interact with the cable system 200, the physical characteristics of the subscriber interface 900 should also add to the user friendliness of the system. The remote control 900 should easily fit in the palm of the user's hand. The buttons of the preferred remote control 900 contain pictorial symbols that are easily identifiable by the subscriber. Also, buttons that perform similar functions may be color coordinated and consist of distinguishing textures to increase the user friendliness of the system.

7. Menu-Driven Program Selection

Figure 8:
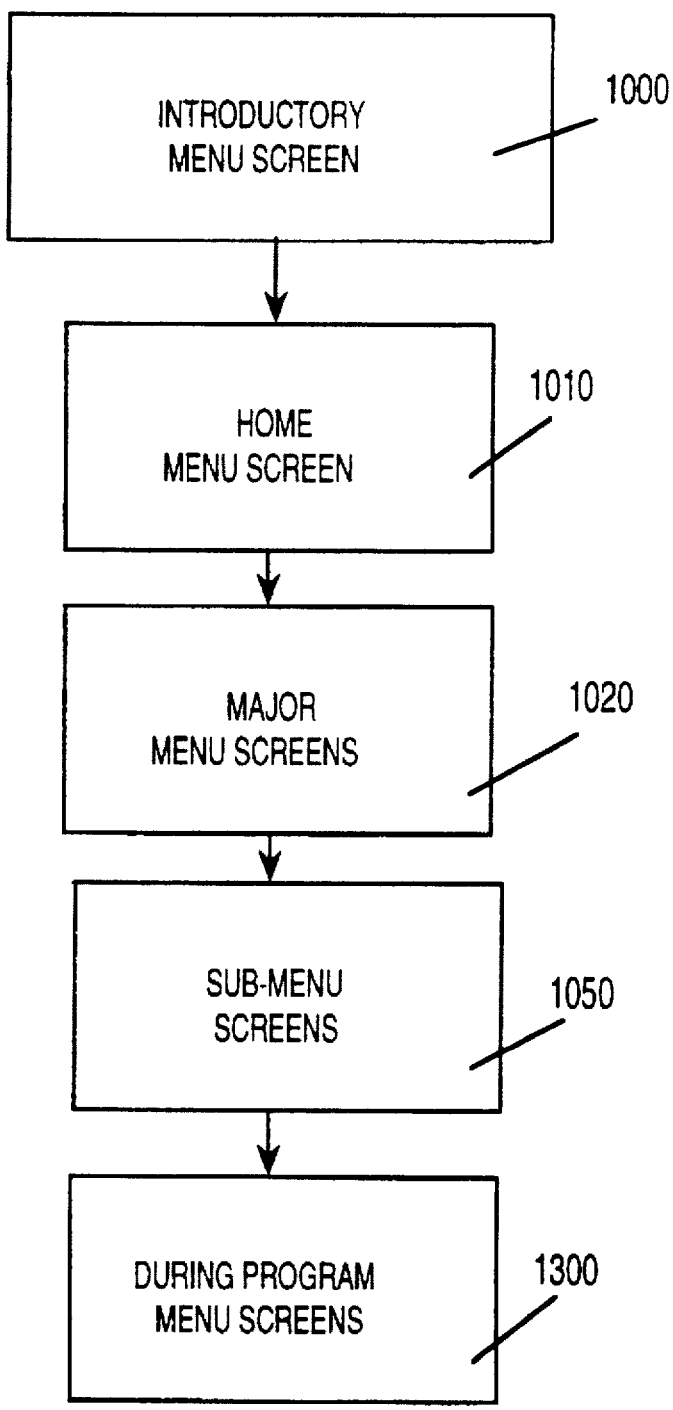
FIG. 8 shows the basic structure of the program menu system of the present invention.

The menu-driven scheme provides the subscriber with one-step access to all major menus, ranging from hit movies to sport specials to specialty programs. From any of the major menus, the subscriber can in turn access submenus and minor menus by cursor or alpha-character access (as shown in FIGS. 8–10).

There are two different types of menus utilized by the preferred embodiment, the Program Selection menus and the During Program menus. The first series of menus, Program Selection menus, consists of an Introductory, a Home, Major menus, and Submenus. The second series of menus, During Program menus, consists of two primary types, Hidden menus and the Program Overlay menus.

Immediately after the subscriber turns on the set top terminal 220, the Introductory menu welcomes the subscriber to the system. The Introductory menu may display important announcements from the local cable franchise, advertisements from the cable provider, or other types of messages. In addition, the Introductory menu can inform the subscriber if the cable headend 208 has sent a personal message to the subscriber's particular set top terminal 220.

After the Introductory menu has been displayed the subscriber may advance to the next level of menus, namely the Home menu. In the preferred embodiment, after a certain period of time, the cable system will advance the subscriber by default to the Home menu. From the Home menu, the subscriber is able to access all of the programming options. The subscriber may either select a program directly by entering the appropriate channel number from the remote control 900, or the subscriber may sequence through incremental levels of menu options starting from the Home menu. The Home menu lists categories that correspond to the first level of menus called Major menus.

If the subscriber chooses to sequence through subsequent menus, the subscriber will be forwarded to the Major menu that corresponds to the chosen category from the Home menu. The Major menus further refine a subscriber's search and help guide the subscriber to the selection of his choice.

From the Major menus, the subscriber may access several submenus. From each submenu, the subscriber may access other submenus until the subscriber finds a desired television program. Similar to the Major menu, each successive level of Submenus further refines the subscriber's search. The system also enables the subscriber to skip certain menus or submenus and directly access a specific menu or television program by entering the appropriate commands on the remote control 900.

The During program menus (including Hidden Menus and Program Overlay Menus) are displayed by the set top terminal 220 only after the subscriber has selected a television program. In order to avoid disturbing the subscriber, the set top terminal 220 does not display the Hidden Menus until the subscriber selects the appropriate option to display a Hidden Menu. The Hidden Menus contain options that are relevant to the program selected by the viewer. For example, a Hidden Menu may contain options that enable a subscriber to enter an interactive mode or escape from the selected program.

Program Overlay Menus are similar to Hidden Menus because they occur during a program and are related to the program being viewed. However, the Program Overlay Menus are displayed concurrently with the program selected by the subscriber. Most Program Overlay Menus are small enough on the screen to allow the subscriber to continue viewing the selected program comfortably.

B. Set Top Terminal Description

1. Overview

Preferably, the signal reaches the subscriber's home in a compressed format (e.g., MPEG) and is decompressed prior to viewing. Included in the delivered program signal is information which enables equipment at the subscriber's home to display menus for choosing particular programs. Depending on the particular embodiment, the television program signal may arrive at the subscriber's home through one or more coaxial cables, fiber cables, twisted pairs, cellular telephone connections, satellite or personal communications network (PCN).

FIG. 3 shows the set top terminal 220 receiving the signals from the cable headend 208 and manipulating them for the subscriber. The set top terminal 220 is equipped with local computer memory and the capability of interpreting the digitally compressed signal to produce menus for the subscriber. The remote control 900 communicates the subscriber's selections to the set top terminal 220. The subscriber's selections are generally based upon menus or other prompts displayed on the television screen.

2. Program Control Information Signal

The program control information signal is generated by the operations center 202 and provides the network controller 214 with data on the scheduling and description of programs. In an alternate configuration, this data is sent directly to the set top terminal 220 for display to the subscriber. In the preferred embodiment, the program control information signal is stored and modified by the network controller 214 and sent to the set top terminal 220 in the form of a set top terminal control information stream (STTCIS). The set top terminal 220 integrates either the program control information signal or the STTCIS with data stored in the memory of the set top terminal 220 to generate on-screen menus that assist the subscriber in choosing the programs for display.

Throughout this description the term "program control information" is being used to indicate control information coming from the cable headend 208 to the set top terminal 220, whether it is sent directly from the operations center 202, processed by the network controller 214 and then forwarded to the set top box (STTCIS), or transmitted over telephone lines.

The types of information that can be sent using the program control signal include: number of program categories, names of program categories, the channels assigned to a specific category (such as specialty channels), names of channels, names of programs on each channel, program start times, length of programs, description of programs, menu assignment for each program, pricing, whether there is a sample video clip for advertisement for the program, and any other program, menu or product information.

In this simple embodiment, the program control information, including these menu codes, is sent continuously from the operations center 202 to the network controller 214, and ultimately to the set top terminal 220. For example, four hours worth of programming information can be sent via the program control information signal continuously as shown in Table A.

TABLE A

| *Program name | *Program length | *Menu code | *Description | *Video |
|---|---|---|---|---|
| 12 PM | | | | |
| 1 Cheers | .5 | E24 | C | N |
| 2 Terminator | 2.0 | A33 | Tx | S |
| 3 PrimeTime | 1.0 | D14 | N | N |
| 4 Football Special | .5 | B24 | S | N |
| . | | | | |
| . | | | | |
| 12:30 PM | | | | |
| 1 Simpsons | .5 | E14 & C13 | C | S |
| 4 Football Game | 3.0 | B13 | S | N |
| . | | | | |
| . | | | | |

Table A shows the basic programming information that may be sent by the set top terminal 220. The program descriptions shown are coded abbreviations. For example, C for comedy, N for news, S for sports, A for cartoons, and TX for text. If there is a textual description for a program, such as a movie, the description may be given following that program's coded description or may be communicated following the four hours' worth of programming information. As is shown in the coded listing, program descriptions for programs greater than a half hour in length need not be repeated (each half hour). The video description code informs the set top terminal 220 of whether there is still or live video available to advertise the program.

For example, a sporting program may be assigned a code of B35-010194-1600-3.25-Michigan St. vs. USC. The letter B would assign the program to category B, sports. The second alpha-numeric character number 3 would assign the program to the third menu of the sports category. The third character of the code, number 5, assigns the program to the fifth program slot on the third menu. The next six characters, Jan. 1, 1994, represent the date. The following four characters, 1600 represent the start time which is followed by the length of the program and the program name. This entry represents a sports show, a college football game, which will be aired at 4:00PM on New Years day 1994.

In the 12:30 Channel 1 entry of Table A, two menu codes are shown. By allowing two menu codes, programs that may fit under two different category descriptions may be shown in both menus to the subscriber. With this minimal amount of information being communicated to the set top terminal 220 on a regular basis, the terminal is able to determine the proper menu location for each program and the proper time and channel to activate for the subscriber after his menu selection.

Table B shows an example Events Table that may be downloaded to a set top terminal 220 using an Event Data file which contains information about events and pricing. As shown in Table B, the three columns of the Events Table identify the field number, the field itself and the type of information downloaded in the Event Data file. The first column contains the field numbers 1 through 11. The middle column contains the corresponding field parameters, including the event type, event ID, global channel ID, price, start time, end time, start date, end date, P- icon, name and description. The third column contains corresponding field type information. Field type information typically consists of an unsigned integer; hours, minutes and seconds; months, day and year; and ASCII character identifier.

TABLE B

| Field # | Field | Type |
|---|---|---|
| 1 | Event Type | Unsigned Int |
| | 1 = YCTV | |
| | 2 = Pay-Per-View | |
| | 3 = Reg. TV | |
| 2 | Event ID | Unsigned Int |
| 3 | Global Channel ID | Unsigned Int |
| 4 | Price (in Cents) | Unsigned Int |
| 5 | Start Time | HH:MM:SS |
| 6 | End Time | HH:MM:SS |
| 7 | Start Date | MM/DD/YY |
| 8 | End Date | MM/DD/YY |
| 9 | P-Icon | ASCIIZ |
| 10 | Name | ASCIIZ |
| 11 | Description | ASCIIZ |

Table C shows an example Event Data file. In particular, Table C shows two data streams corresponding to two event types. The first data stream identifies an event in the first field. The second field designates the event ID, which is in this example. The third field includes the global channel ID number two. The fourth field indicates the cost of 50 cents for this event. The fifth and sixth fields indicate the respective start and end times of 3:00 AM to 3:00 PM, respectively. The seventh and eighth fields show the corresponding start and end dates, designated as Aug. 25, 1993 and Aug. 27, 1993, respectively. Field nine indicates the P-icon set to a graphics file. Finally, fields ten and eleven indicate the name and description of the event selected, which in this case is Sesame Street™ and Barney™. The second data stream in the Event Data example shown in Table C includes analogous information for Terminator IV™, which is designated in field one as a pay-per-view event.

TABLE C

Event Data Example

1'1234'2'50'03:00:00'15:00:00'08/25/93'08/27/93'pbs.pcx'Sesame Street & Barney's Sesame Street and Barney Abstract
2'1234'2'50'20:00:00'22:00:00'08/25/93'08/25/93't4.pcx'Terminator 4'Terminator 4 Abstract The program control information signal (and STTCIS) can be formatted in a variety of ways and the on-screen menus can be produced in many different ways. For instance, if the program control information signal carries no menu format information, the menu format for creating the menus can be fixed in ROM at the set top terminal. This method allows the program control information signal to carry less information but has the least flexibility since the menu formats can not be changed without physically swapping the ROM.

In order to limit the amount of bandwidth needed to transmit the program control information signal, various compression techniques employed for non-video may be used such as block coding, contour coding, blob encoding, and run-length encoding. Further, the program control information signal may contain data divided into text and graphics, or video, text and graphics and then recombined at the set top terminal 220 using a text generator, graphics decompressor, and video decompressor as necessary.

Preferably the menu driven program selection system, allows the subscriber to choose a program by touring through a series of menus utilizing the remote control 900 for cursor movement. The final choice in the series of menus will identify one particular channel and one time for activation of that channel. With a channel and activation time, the set top terminal 220 can display the selected program on the television for the viewer. To achieve this goal, a simple embodiment assigns an intelligent alpha-numeric code to each program. This alpha-numeric code identifies the category of the program, the menu in which the program should be displayed, its transmission time(s), and the position on the menu that the program should be displayed.

In the preferred embodiment, the menu format information is stored at the set top terminal 220 in temporary memory either in a RAM, FLASH ROM, EEPROM or EPROM. This configuration provides the desired flexibility in the menu format while still limiting the amount of information needed to be communicated via the program control information signal. New menu format information can be sent via the program control information signal to the set top terminals 220 each time there is a change to a menu.

3. Polling

In addition to the menu format information that is stored in graphics memory 628, the set top terminal 220 also stores data, tracking programs that have been selected for viewing. By gathering this data, the set top terminal 220 can maintain an accurate record of all programs accessed/watched by storing the data in EEPROM or RAM. Subsequently, this data can be transmitted to the cable headend 208, where it can be used in carrying out network control and monitoring functions. Such data transmissions between the set top terminal 220 and cable headend 208 can be accomplished, for example, through upstream transmission over the cable network or over telephone lines through the use of telephone modems. Where upstream transmission over the cable network is used, set top terminals 220 can complete any data transmissions on a scheduled or as-needed basis.

Figure 4A:
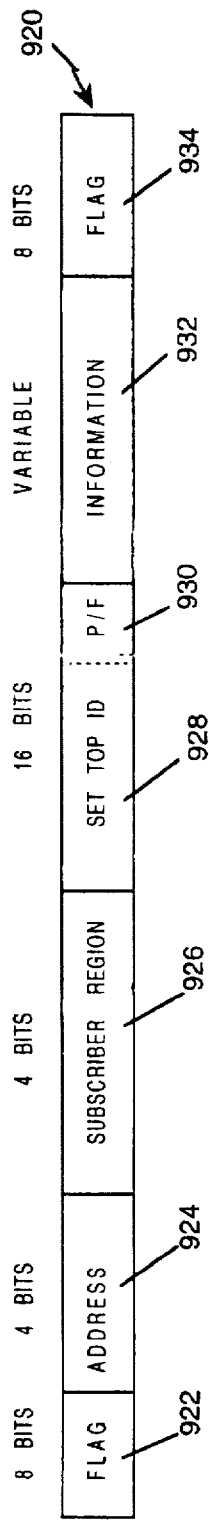
FIG. 4a is a drawing of a frame format for a program control information signal.

Program access information identifying each program watched by the viewer is stored at each set top terminal 220 until the terminal 220 is polled by the network controller 214 for information retrieval. This information can be accomplished by using a polling request message format 920 as shown in FIG. 4a. This frame format 920 consists of six fields, namely: (1) a leading flag 922 at the beginning of the message, (2) an address field 924, (3) a subscriber region designation 926, (4) a set top terminal identifier 928 that includes a polling command/response (or P/F) bit 930, (5) an information field 932, and (6) a trailing flag 934 at the end of the message.

The eight-bit flag sequence 922 that appears at the beginning and end of a frame is used to establish and maintain synchronization. Such a sequence typically consists of a "01111110" bit-stream. The address field 924 designates a 4-bit address for a given set top terminal 220. The subscriber region designation 926 is a 4-bit field that indicates the geographical region in which the subscriber's set top terminal is housed. The set top terminal identifier 928 is a 16-bit field that uniquely identifies each set top terminal with a 15-bit designation followed by an appended P/F bit 930. Although field size is provided by this example, a variety of sizes can be used with the present invention.

The P/F bit 930 is used to command a polling response from the set top terminal 220 addressed, as described below. The frame format 920 also provides a variable-length information field 932 for other data transmissions, such as information on system updates. The frame format 920 ends with an 8-bit flag (or trailing flag 934) that is identical in format to the leading flag 922, as set forth above. Other frame formats will be apparent to one skilled in the art and can be easily adapted for use with the system.

Using any such polling request message format, the network controller 214 (FIG. 3) interrogates each set top terminal 220. The set top terminals 220 are identified by a unique address and set top terminal identifier. It is preferred that the set top terminal 220 transmits information and messages to the network controller 214 only when given permission by the network controller 214.

Where, for example, specialty programs have been accessed since the previous poll, the set top terminal 220 is given permission to transmit a polling response 920 in the form of a status report that includes any such access information. These status reports generally include information that allows the network controller 214 to track a subscriber's program access history.

Figure 4B:
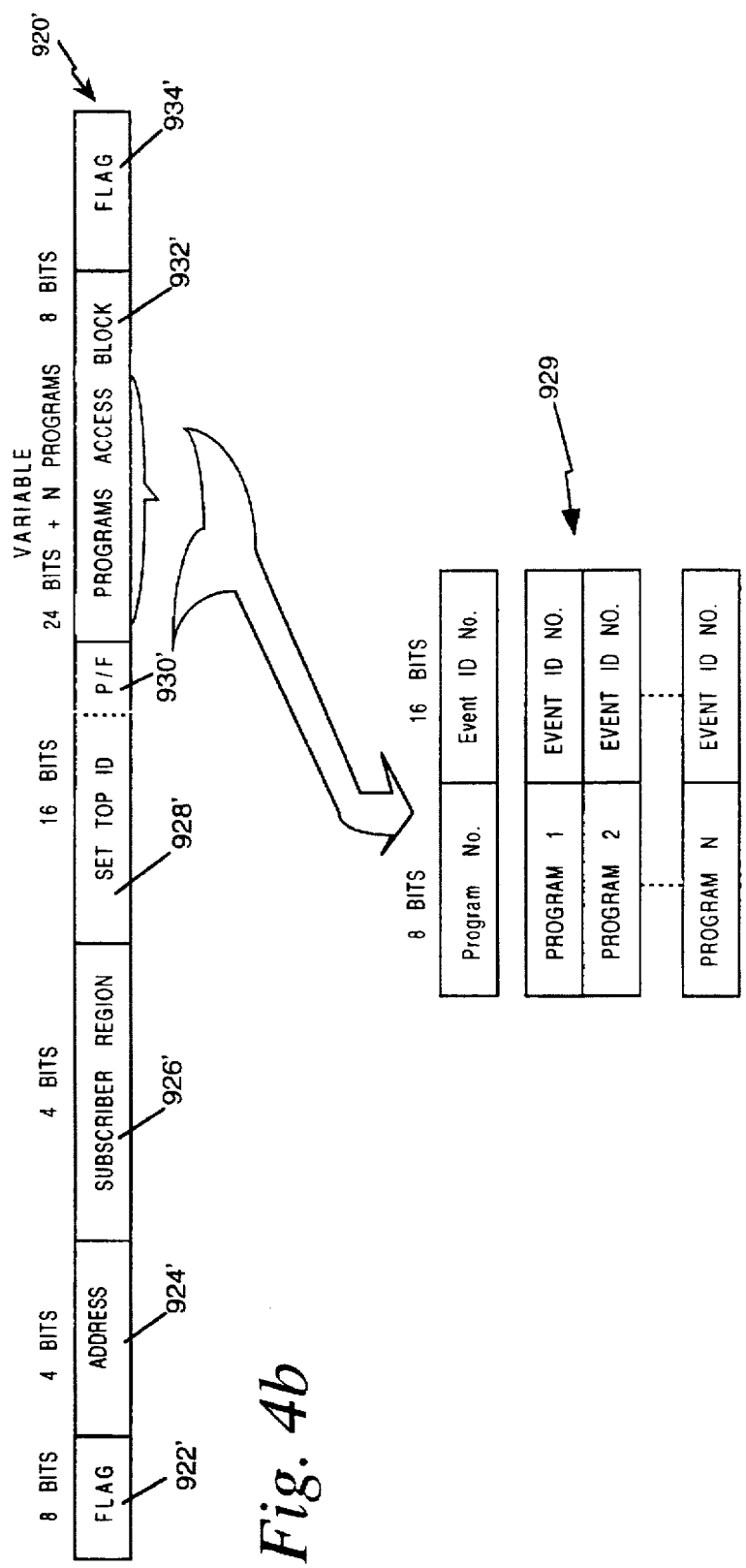
FIG. 4b is a drawing of a frame format for a polling response from the set top terminal.

FIG. 4b shows an example of frame format 920' for the status reports received from the set top terminals 220 during the polling cycle. This frame format is identical to the polling request message format 920 and is similarly numbered.

The information field 932 remains variable in length so that the status of an indeterminate number of programs, e.g., programs 1-N indicated generally at 929, accessed can be included in the frame. After a polling response 920' by a given set top terminal 220, the control message length increases in proportion to the number of programs accessed.

During transmission, the P/F bit 930 is used to carry out the polling function. In particular, the P/F bit 930 is set to a "1" position to command a polling response from the set top terminal 220 whose address is identified in the frame. The response will include the number of programs accessed and their corresponding event identification numbers as shown at 929 in FIG. 4b. In cases where the set top terminal 220 has not accessed any programs since the previous polling cycle, the set top terminal 220 responds with the P/F bit 930 set to "1" and the programs access block denoting zero programs accessed.

In between polling cycles, the program control information continues to supply the set top terminals with menu information. In the simplest embodiment, the menus remain fixed and only the text changes. Thus, the program control information signal can be limited to primarily text and a text generator can be employed in the set top terminal 220. This simple embodiment keeps the cost of the set top terminal 220 low and limits the bandwidth necessary for the program control information. Another simple embodiment uses a separate channel full-time (large bandwidth) just for the menu information.

4. Sending Promotional Video

As will be described later, live video signals may be used in windows of certain menus. These video signals can be transmitted using the program control information signal or can be taken off channels being transmitted simultaneously with the menu display. If the video signal is taken off a channel, less information needs to be transmitted using the program control information signal. While using this technique requires that separate decompression hardware be used for the program control information and the channel carrying the video, this embodiment allows for the greatest flexibility in the system and is preferred. A separate decompressor also assists in assuring that the switch from menus to television programming is smooth and without any significant time delay. Video for menus, promos or demos may be sent to the set top terminal 220 in several formats, including: (1) on a dedicated channel, (2) on a regular program channel and scaled to size, and (3) along with the program control information signal. However, in the preferred embodiment, a number of short promos or demo video are sent using a split screen technique on a dedicated channel as described later.

5. Set Top Terminal

Figure 5A:
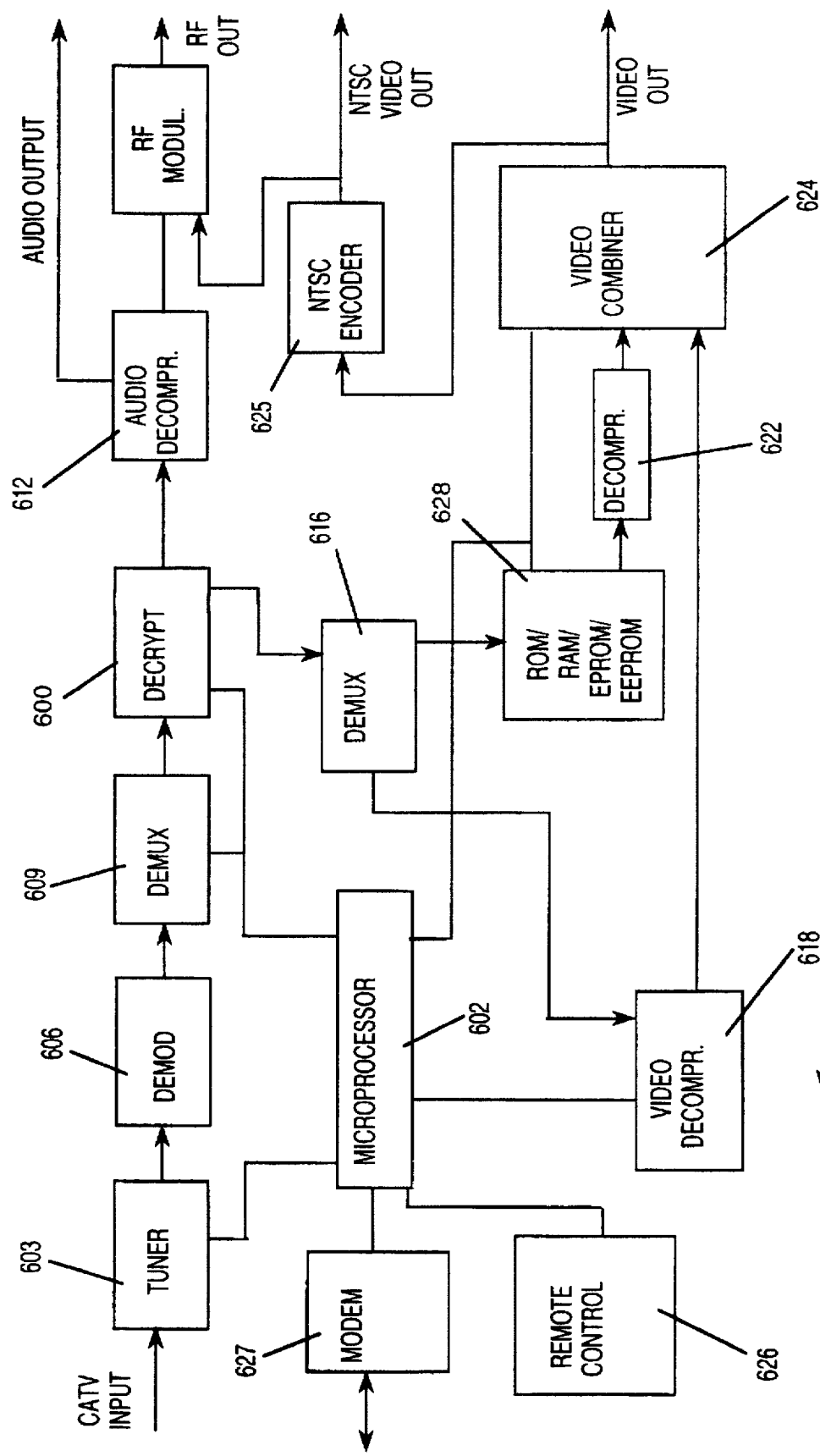
FIG. 5a is a block diagram of the internals of a set top terminal.

FIG. 5a shows a basic block diagram of the hardware components of a digital compression set top terminal 220. The set top terminal 220 has a decryptor 600, tuner 603, digital demodulator 606, and demultiplexers 609, 616 as well as audio equipment 612, 614. Also shown in FIG. 5a is a remote control interface 626 for receiving and processing signals from a remote control unit 900. A modem 627 is provided for allowing communication between a microprocessor 602 and the cable headend 208 (but not shown in FIG. 5a). An NTSC encoder 625 provides an NTSC video output.

The microprocessor 602 is capable of executing program instructions stored in memory. These instructions allow a user to access various menus by making selections on the remote control 900. The various program instructions for accessing menus and performing other functions are described below.

The manner in which the video is decompressed and the menus are generated from the program control signal varies depending on the specific embodiment of the invention. However, at a minimum, one video decompressor 618 capable of decompressing one video signal will be used. Basic menu format information may be stored in a graphics memory 628 comprising ROM, non-volatile RAM, EPROM, and/or EEPROM 620. If compressed graphics are used, a second decompressor 622 is used to generate menus. In one embodiment (not shown), a separate decompressor is used to process the program control information signal and a video combiner incorporates video and menu graphic information. The program control information signal may be sent with three primary parts, compressed video for menu display (or video location information), compressed graphics, and text. After the program signal is demultiplexed into its component parts, a video decompressor 618, a graphic decompressor 622, a text generator (shown in FIG. 5b at 623) and a video combiner 624 are used to assist in creating the menus.

Figure 5B:
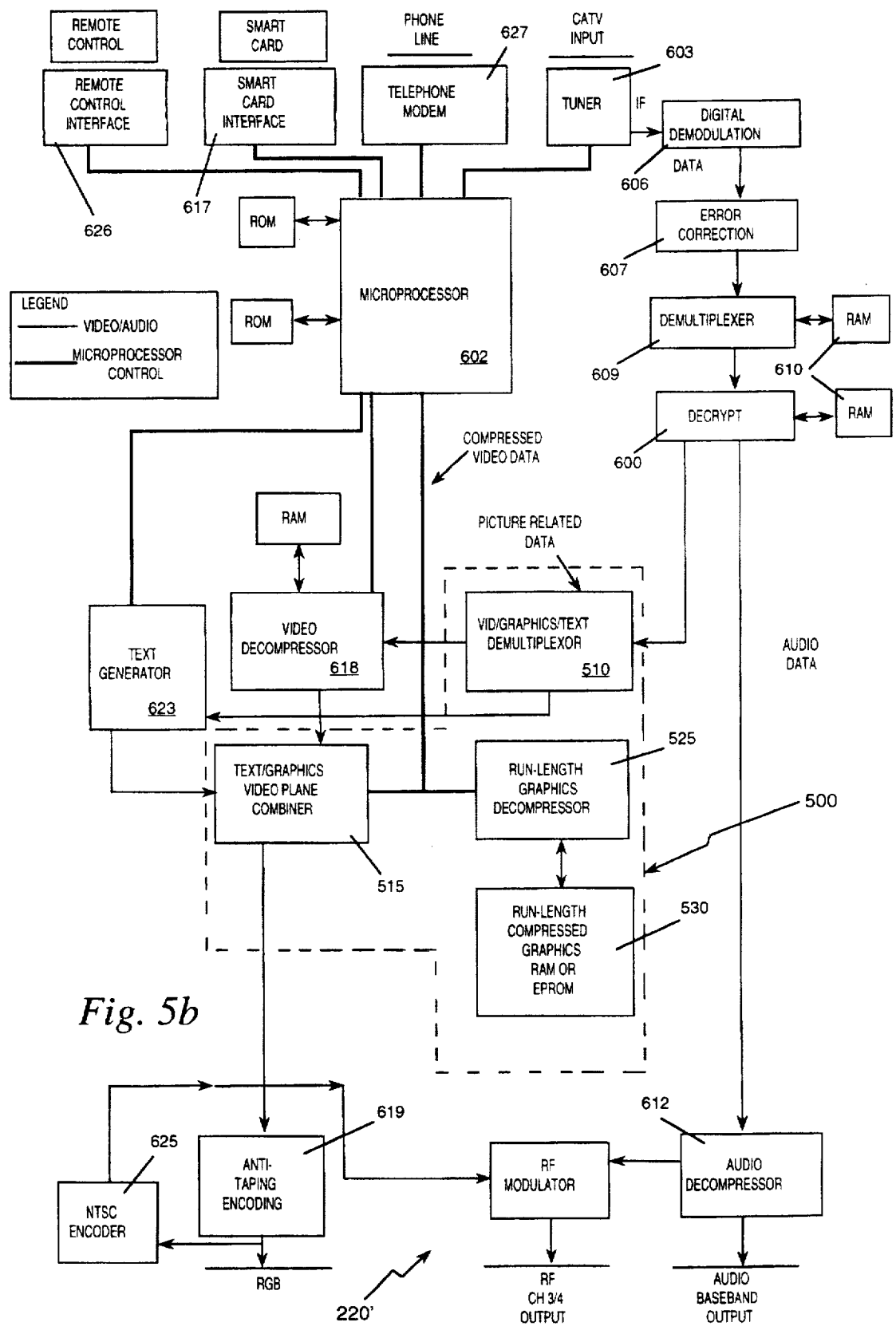
FIG. 5b is a block diagram of an alternative embodiment of the internals of a set top terminal.

FIG. 5b shows a basic block diagram of an alternative digital compression set top terminal 220'. The same components shown in FIG. 5a are repeated in FIG. 5b, and given the same reference numbers (e.g., tuner 603, modem 617, NTSC encoder 625, etc.). FIG. 5b also shows the addition of an expansion card interface 617 to allow additional features to be included on an expansion card (not shown) insertable into the expansion card interface 617. Error correction circuitry 607 is also shown receiving the demodulated signal, prior to demultiplexing the signal. Memory 610 associated with the microprocessor 602, the demultiplexer 609, the decryptor 600, and the video decompressor 618 is shown in FIG. 5b.

The elements of an upgrade module 500, (connected to a basic decompression box 520) are shown (in the dotted box) in FIG. 5b. The circuitry in the upgrade module 500 includes a video, graphics and text demultiplexer 510, a text, graphics, and (video plane) video combiner 515, a graphic decompressor 525 and a graphics memory 530. The graphics stored in memory 530 is preferably run-length compressed. However, other methods of compressing graphics known by those skilled in the art may be used with the present invention.

The generated menus and video are combined in the video combiner 515 and output to an anti-taping encoder 619. Any method of anti-taping encoding known by those skilled in the art may be used with the present invention.

Figure 6A:
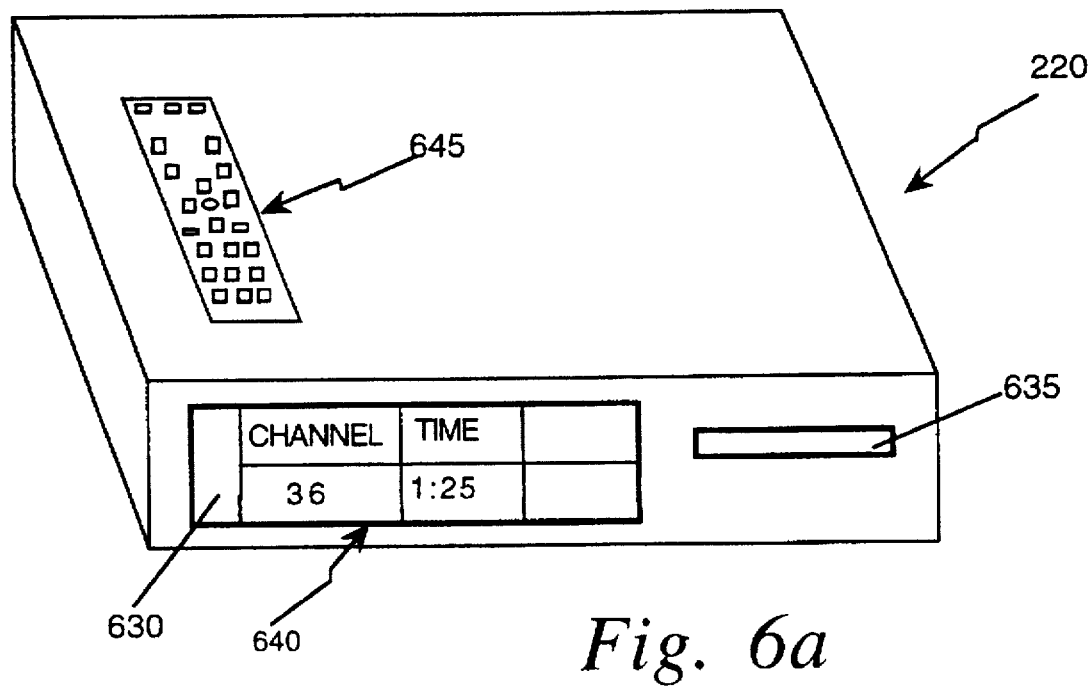
FIG. 6a is a perspective front view of a set top terminal.
Figure 6B:
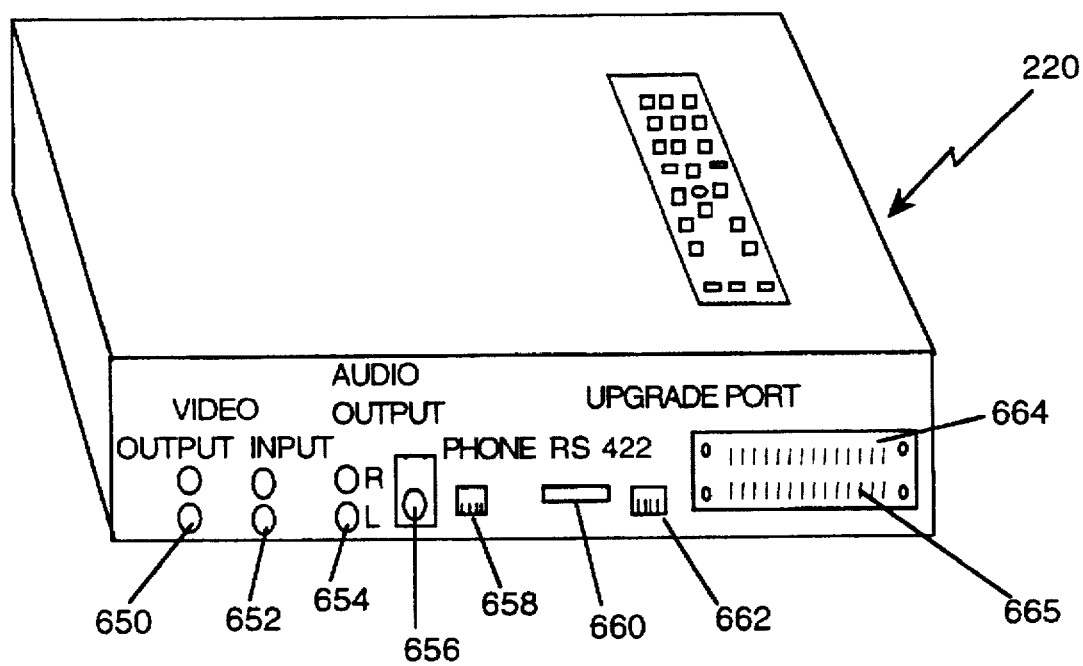
FIG. 6b is a perspective rear view of a set top terminal.

FIGS. 6a and 6b show front and back views respectively for the preferred embodiment of the set top terminal 220. The front panel of the set top terminal 220 includes an infrared sensor 630 and a series of LED displays 640. These LED displays 640 may indicate with an icon or a letter (e.g., A–K) the major menu currently selected by the set top terminal 220 or the channels selected directly by a user, or menu channel selections (e.g., from 1 to 50). This visual display will remain lit while the subscriber is watching (or listening to) programming within a major menu.

LEDs 640 are preferably provided to indicate a decompression error, a processing error, or other error. Text messages may be displayed on LEDs. During the normal functioning of the set top terminal 220, the LED display 640 can be customized by the user to display the time, the program channel, VCR activation or other pertinent information. Further displays may include current channel, time, volume level, sleep time, parental lock (security), account balance, use of a hardware upgrade, second channel being recorded by VCR, use of the Level D music hardware upgrade in a separate room, and any other displays useful to a subscriber to indicate the current status of the set top terminal 220.

The LEDs 640 may also provide an indication of the digital audio channel currently tuned. With this display feature, subscribers may use the digital audio feature without activating the television screen. The signal source and output selected (e.g., a subscriber's separate audio system, a VCR, etc.) may be displayed. Although LEDs are preferred, the set top terminal 220 may also use a CRT, LCDs, or other display technology.

The set top terminal 220 includes a flapped opening 635 on its front that allows the insertion of a magnetic cartridge (or similar portable storage device, including optical disk, ROM, EPROM, etc., not shown). This opening 635 allows the set top terminal 220 to be upgraded or reprogrammed locally with the use of the applicable magnetic or optical storage device.

On the top or cover of the set top terminal 220 are pushbutton controls 645. Preferably these pushbutton controls 645 duplicate the two-part alpha-iconic remote control 900. Any function that can be performed on the remote 900 may also be performed at the set top terminal 220 using the duplicative pushbutton controls 645.

FIG. 6b shows the back of the set top terminal 220 which includes the input/output ports of the terminal 220. The input/output ports include a pair of output terminals 650, a pair of input terminals 652, a pair of stereo/audio output terminals 654, a satellite dish input port 656, a telephone jack 658 and an RS422 port 660. One of the output terminals 650 is for a television and the other is for a VCR. The set top terminal 220 is equipped to handle incoming signals on one or two cables using the input terminal 652. The phone jack 658 and RS-232 or RS-422 port 660 are provided for maintenance, trouble shooting, reprogramming and additional customer features. In alternate embodiments, the telephone jack 658 may be used as the primary mode of communication between the cable headend 208 and the set top terminal 220. This connection is possible through local telephone, cellular telephone or personal communications networks (PCN).

The basic programming of each set top terminal 220 will be located on ROM within the set top terminal 220. Random access memory, the magnetic cartridge capability, and the extension card slot 635 allow upgrades and changes to be easily made to the set top terminal 220.

In the preferred embodiment, the set top terminal 220 includes a hardware upgrade port 662 as shown in FIG. 6b, in addition to expansion card slots 665. Each expansion slot 665 is covered by the metal plate cover 664. The hardware upgrade port 662 accommodates a four-wire (or more) connection for: (1) error corrected, decrypted data output of the set top terminal 220, (2) a control interface, (3) decompressed video output of set top terminal 220, and (4) video input port. In the preferred embodiment, multiple wires are used to perform each of the four functions. Typically, the four sets of wires are combined in a single cable with a single multipin connector.

In the preferred embodiment, multipin connections may be used for multiwire cable. The multipin connection 662 may range from DB9 to DB25. A variety of small computer system interface (SCSI) ports may also be provided. Alternatively, four or more ports may be provided instead of the single port 662 depicted. Port 662 may also be used to attach various hardware upgrades to a set top terminal 220.

The preferred embodiment has five hardware upgrades available for use with a set top terminal 220, including: (1) Level A interactive unit, (2) a Level B interactive unit, (3) Level C interactive unit with compact disc capability, (4) Level D digital radio tuner for separate room use, and (5) Level E information download unit. Each of these upgrades can be connected to the set top terminal 220 unit through the upgrade port 662.

The memory in the set top terminal is used to store the graphical and textual components of menus. Specifically, background, logo, menu display, and cursor graphical files are stored, as well as long term, intermediate, and short term text.

Existing set top converter boxes such as those made by Scientific Atlanta or General Instruments are presently unequipped to handle the menu selection system of the present invention. Thus, hardware modifications are necessary in order to use the menu selection system with existing set top converter technology.

6. The Turbo Card

Figure 7:
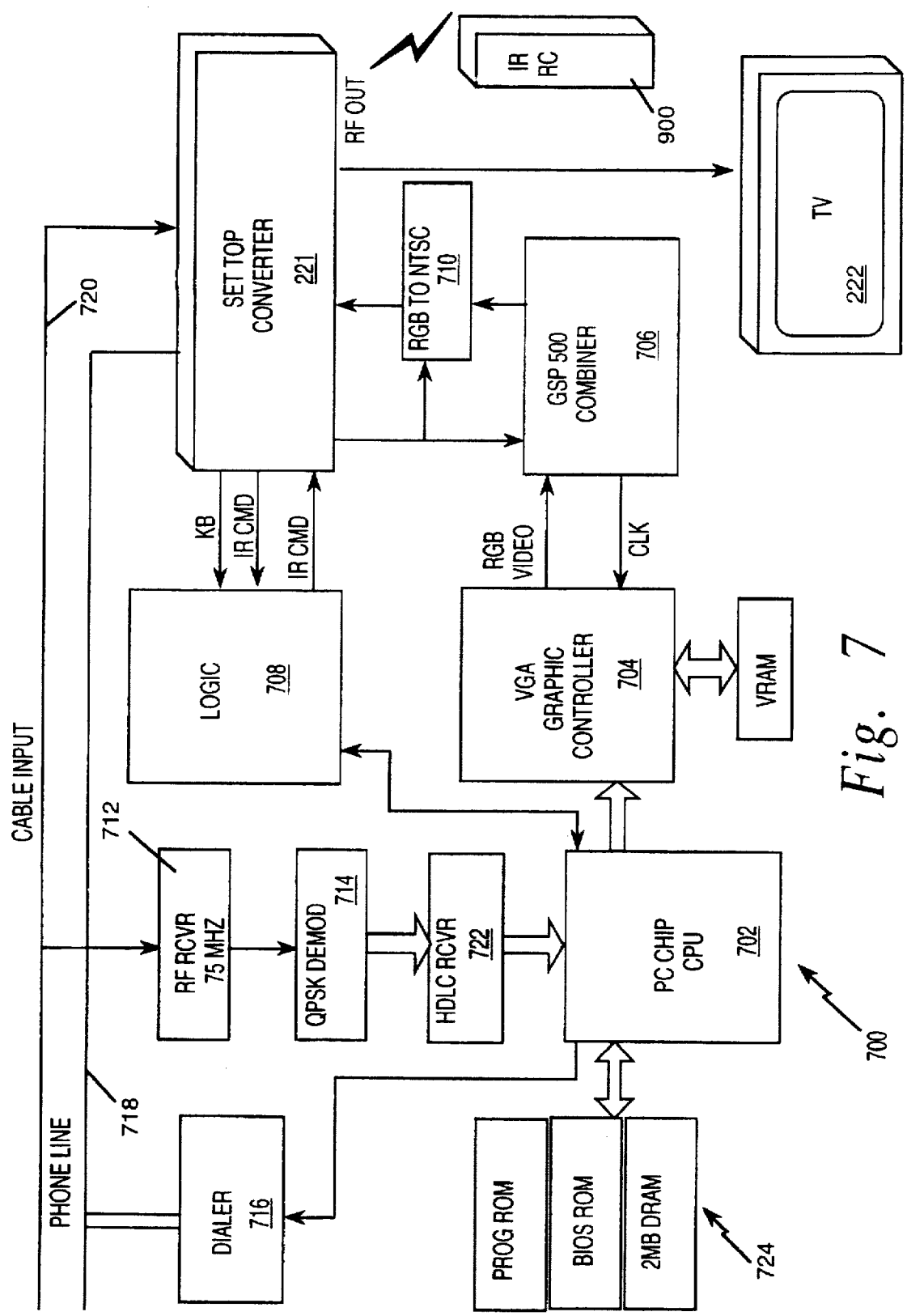
FIG. 7 is a schematic of the basic components of the Turbo Card.

FIG. 7 shows a Turbo Card addition to the set top converter. The Turbo Card 700 upgrade provides the additional functionality needed to utilize the menu system of the present invention with existing set top converter technology. The primary functions the Turbo Card 700 adds to the set top converter are interpreting of program control information signals, generating of menus, sequencing through menus, and, ultimately, the ability of the viewer to select a channel through the menu system without entering any channel identifying information. The Turbo Card 700 also provides, using the connections shown in FIG. 3, a method for a remote location, such as the cable headend 208, to receive information on programs watched and control the operation of the set top converter box 221 and Turbo Card 700. The programs watched information and control commands may be passed from the cable headend 208 to the Turbo Card 700 using telephone lines 718.

The primary components of the Turbo Card 700 are a PC chip CPU 702, a VGA graphic controller 704, a video combiner 706, logic circuitry 708, NTSC encoder 710, a receiver 712, demodulator 714, and a dialer 716. Preferably these components are located on a single circuit card.

The Turbo Card 700 has two connections coming from outside the viewer home: (1) a telephone connection 718, preferably with an RJ11C jack for communicating with the cable headend 208, and (2) a standard coaxial cable input 720. In addition to the two connections from outside the viewer home, the Turbo Card 700 must be electronically connected to the set top converter box 221. Preferably this connection is made with a ribbon cable connection with forty or more pins (not shown).

The information that is passed between the set top converter box 221 and the Turbo Card 700 includes data and infrared commands. Preferably video input and output to the set top converter 221 is through 75 ohm coax cable. In the preferred embodiment, the infrared commands of the remote control 900 are passed through (undisturbed from) the set top converter and to the Turbo Card 700. After interpretation and modification by the Turbo Card 700, the infrared commands are then returned to the set top converter 221 through the ribbon cable. Video signals are received by the Turbo Card 700 from the set top converter 221, manipulated by the Turbo Card 700, and returned to the set top converter 221 in NTSC format by the NTSC encoder 710. The Turbo Card 700 may also generate graphics which are passed to the set top converter 221 via the NTSC encoder 710.

The Turbo Card 700 utilizes the capability of the set top converter 221 as much as possible to avoid duplication of components. For example, the Turbo Card 700 uses the set top converter's tuner thus avoiding the cost of an additional tuner.

The PC Chip CPU 702 is used for controlling the components of the Turbo Card 700. The PC chip 702 is also used to perform database management, billing and data logging functions. An example of a PC Chip CPU 702 which can be used is the IC PC/Chip F8680E, manufactured by Chips & Technologies Corporation, located at 3050 Zanker Road, San Jose, Calif. 95134, (408) 434-0600. The PC chip CPU 702 is a single chip implementation of an IBM PC XT equivalent architecture. All peripherals may be interfaced to the PC chip CPU 702 through an industry standard architecture (ISA) bus. The memory on the card may be an EPROM or other similar device. Typically a 4-megabyte EPROM containing BIOS programs is used in this embodiment. Two BIOS programs, the PC chip BIOS and the VGA controller BIOS, are the primary contents of the EPROM. This EPROM also contains the equivalent of a C: hard drive. This hard drive is similar to those found on a PC which provides the means to "boot" the DOS Operating System. The card also includes a 1 megabyte DRAM, which may be expanded to 4 megabytes. Most of this memory is used as a RAM drive after the Turbo Card 700 boots up.

A video combiner 706 is used to combine RGB video created by the Graphics Controller 704 with video from the set top converter 221. An example of a video combiner 706 which can be used in the present invention is an IC GEN-LOCK Signal Processor GSP500, manufactured by Integrated Circuit Systems, Inc., located at 2626 Van Buren Avenue, P.O. Box 968, Valley Forge, Pa. 19482, (215) 666-1900.

The NTSC encoder 710 is used to convert RGB and sync signals into an NTSC format signal that can be used by a standard television 722. In an alternative embodiment, the synch signal is eliminated. An example of a component that can be used for the NTSC Encoder 710 is Encoder Card, model number BA7230LS, manufactured by Rohm Corporation, located at 3034 Owen Drive, Jackson Business Park, Antioch, Tenn. 37013, (615) 641-2020. The Turbo Card hardware may be implemented on a board built into the set top converter box 221 or, alternatively, using plug-in slots. The embodiment shown uses a Dual Tone Multi-Frequency (DTMF) dialer 716 to initiate telephone transmissions. An example of a DTMF dialer 716 which may be used with the present invention is an IC DTMF Transceiver CM8888, manufactured by California Micro Devices (CMD), located at 2000 W. 14th Street, Tempe, Ariz. 85287, (602) 921-4541. Such an interface uses DTMF tones, or pulse dialing, to make a telephone connection. The same DTMF tones used to initiate the call, communicates data from the PC chip CPU 702 upstream to the network controller 214 or operations center. Such upstream data may include purchase, logging and viewing information. The embodiment shown in FIG. 7 may be modified to transmit information upstream to the cable headend 208 through the coaxial cable 720, thereby eliminating the need for telephone lines.

Functionally, using the connection shown in FIG. 3, the Turbo Card 700 operates by receiving the program control information signal from the cable headend 208 through the coaxial cable 720. The program control information signal is used by the PC chip CPU 702 after being processed through an RF receiver 712, a quadrature phase shift keyed (QPSK) demodulator 714, and an HDLC serial receiver 722. This receiver 712 demodulates any data transmissions at a fixed frequency of 108 MHz. Typically, the card receives and demodulates 108 MHz FSK carrier signals, having a data rate of 56 kilobits. In the preferred embodiment, a 1.5 megabyte QPSK encoded signal is used.

Once such signals are received, the contents of the signals are stored in the card's databases. Each signal's content is commonly structured in Synchronous Data Line Control (SDLC) format. Other formats, such as HDLC, may also be used. The HDLC/SDLC receiver 722 processes the demodulated signal from the 108 MHz FSK or QPSK receiver demodulator 714, which provides a clock and data synchronously into the HDLC/SDLC receiver during such processing. The HDLC/SDLC receiver 722 presents the data stream (or packets) to the PC chip CPU 702 for storage. The stored data packets form the basis for the data base files and other information, which have been downloaded from the cable headend 208 to the Turbo Card 700.

The VGA controller 704 is used to generate new graphics. An example of a VGA graphic controller 704 which can be used with the present invention is a VGA Controller ET4000-144 manufactured by Tseng Labs. The VGA graphic controller 704 is an industry standard VGA controller chip and makes use of an additional 512 kbits of dynamic memory (e.g., a VRAM), from which one complete drawing page of 256 color pixels (640×480 resolution) may be formed. The VGA controller 704 receives its dot clock from the GSP 500 combiner 706. The GSP 500 combiner 706 receives a sync signal from any incoming NTSC video signals provided by the set top converter 221. Typically, the GSP 500 combiner 706 strips sync information from each NTSC video signal and uses it to generate each dot clock used by the VGA controller 704. In this way, the GSP 500 combiner 706 synchronizes the VGA controller 704 to the incoming NTSC-formatted cable TV signal. Such synchronization allows VGA graphics to be displayed on the users's television 722 alone or in conjunction with NTSC video.

In the preferred embodiment, the logic block is enhanced to make use of the sync signal extracted from the separate portion of the set top converter 221. This enhancement allows the VGA controller 704 to be injection-locked directly with the sync signal using some additional circuitry. In this embodiment, the GSP 500 combiner 706 phase locks the VGA controller's dot clock to the NTSC video clock to accomplish the synchronization described above.

The logic circuitry of the Turbo Card 700 receives the data, infrared commands, and synchronization from the set top converter 221. When the Turbo Card has finished processing and modifying the IR command it returns the command to the set top converter 221 for further processing. When appropriate, the VGA graphics controller 704 generates menu screen graphics which are combined with video by the video combiner. The menu, with video, is now in RGB format and is encoded into standard NTSC format by the NTSC encoder 710.

The RGB to NTSC encoder 710 accommodates the overlay of graphics and video. This encoder 710 makes use of two input signals: (1) a NTSC video signal and (2) an analog RGB signal. The RGB signal comes from the VGA controller 704. On a pixel-by-pixel basis, the encoder 710 can choose between sending its output to the TV screen in either NTSC or RGB signal format. This allows graphics to be displayed on the screen alone or in conjunction with NTSC video on a pixel-by-pixel basis.

The Turbo Card's logic is customized to interface the PC chip CPU 702 to either the General Instruments CFT 2000 or the Scientific Atlanta 8600 converter. The logic includes the ability to scan the keypads (not shown) that are present in the set top converters 221 for keystroke entry and also the ability to receive infrared commands from the set top converter's remote control. Any keystroke entries and commands generate a signal that is sent to the PC chip CPU 702 for processing by the application software. Likewise, the Turbo Card 700 has the ability to simulate a serial infrared command and send it to other set top converter components. This allows the PC chip CPU 702, along with its software, to control the set top converter 221.

Menu selections made by the viewer on the remote control 900 are received by the IR equipment of the converter 221 and passed through to the Turbo Card 700. The Turbo Card software interprets the IR signal and determines the program (or menu) the viewer has selected. The program selection information is sent by the Turbo Card software to the set top converter 221 by modifying the IR command. The modified IR command contains the channel information needed by the set top converter 221.

7. Menu Organization and Sequence

FIG. 8 shows the basic organization of the program menu system. Although the term "menus" has been used above, the menus could also be seen as defining zones or categories of programming. The first series of menus, Introductory menu 1000, Home menu 1010, Major Menus 1020, and Submenus 1050 execute subscriber program selection inputs. The During program menus 1300 provide a subscriber with additional features or options after a program has been selected and shown. There are two primary types of During program menus 1200, Hidden Menus and Program Overlay Menus. The menu sequence and each menu structure has been particularly program designed using the "eye-off-the-remote" design concept (e.g., the cursor movement and "go" buttons 970, 975). Since the subscriber never needs to take his eye off the television screen, the cable operator is likely to have the subscriber's complete attention.

The introductory menu screen 1000 automatically appears upon power-up and initialization of the set top terminal 220. The introductory menu screen 1000 provides important announcements or messages. In addition, the menu 1000 can be used to inform the subscriber that a personal or group message is available for viewing. The subscriber may then access the personal or group message with an appropriate key entry while viewing the introductory menu 1000. Since the introductory menu 1000 must be viewed by each subscriber, it also provides an opportunity for the cable provider to run advertisements.

Following the introductory menu screen 1000 the subscriber will normally be advanced to the home menu screen 1010. The home menu 1010 is the basic menu from which the subscriber will make the first level of viewing decisions (and to which the subscriber may later return). From the home menu 1010, the subscriber is able to access all television programming options. Some programming options may be accessed through cursor movement on the screen, others directly by a button selection on the remote control 900, or both, on-screen selection and remote control 900 direct access.

In the normal progression through the menu screens, the subscriber will be forwarded to a major menu screen 1020 that correlates to his direct remote control 900 selection or selection from the home menu screen 1010. The selections on the home menu 1010 are for large categories of programming options and therefore the major menu 1020 allows the subscriber to further refine a search for a desirable television program.

Following the major menu 1020 the subscriber will navigate through one or more submenu screens 1050 from which the subscriber will choose one particular program for viewing. For most programming selections the user will proceed from the home menu 1010 to a major menu 1020 and then to one or more submenus 1050. However, for certain programming options or functions of the set top terminal 220 the user may skip one or more menus in the sequence. For example, in the preferred embodiment the subscriber may directly access a major menu 1020 by pressing a single icon button. In an alternative embodiment, the introductory menu 1000 will provide the user with the capability of directly accessing information on the subscriber's cable television account without proceeding through a series of menus.

The series of menus shown in FIG. 8 is the standard format, a variety of alternative sequences are possible. An introductory screen upon power up that contains important messages, followed by a home menu 1010 with major programming categories is the basis upon which many alternative embodiments of the menu driven selection process can be built.

Skipping a sequence or level of the menu structure is possible and perhaps desired in certain instances. In simple alternate embodiments it is possible to combine the home menu 1010 and introductory menu 1000 into one menu that performs both functions. It will be apparent to one skilled in the art that specific functions of the Home menu 1010 and Introductory menu 1000 may be exchanged or shared in a number of ways. It is also possible to allow a user to skip directly from the introductory menu 1000 to a submenu 1050. This can be accomplished most easily with a separate direct access remote control 900 button. Generally, a subscriber will access a television program through execution of a submenu 1050.

The During Program Menus 1300 (shown in FIG. 9a as Hidden Menus 1380 and Program Overlay Menus 1390) are enacted by the set top terminal 220 only after the subscriber has selected a television program. These menus provide the subscriber with additional functionality and/or additional information while viewing a selected program.

Figure 9A:
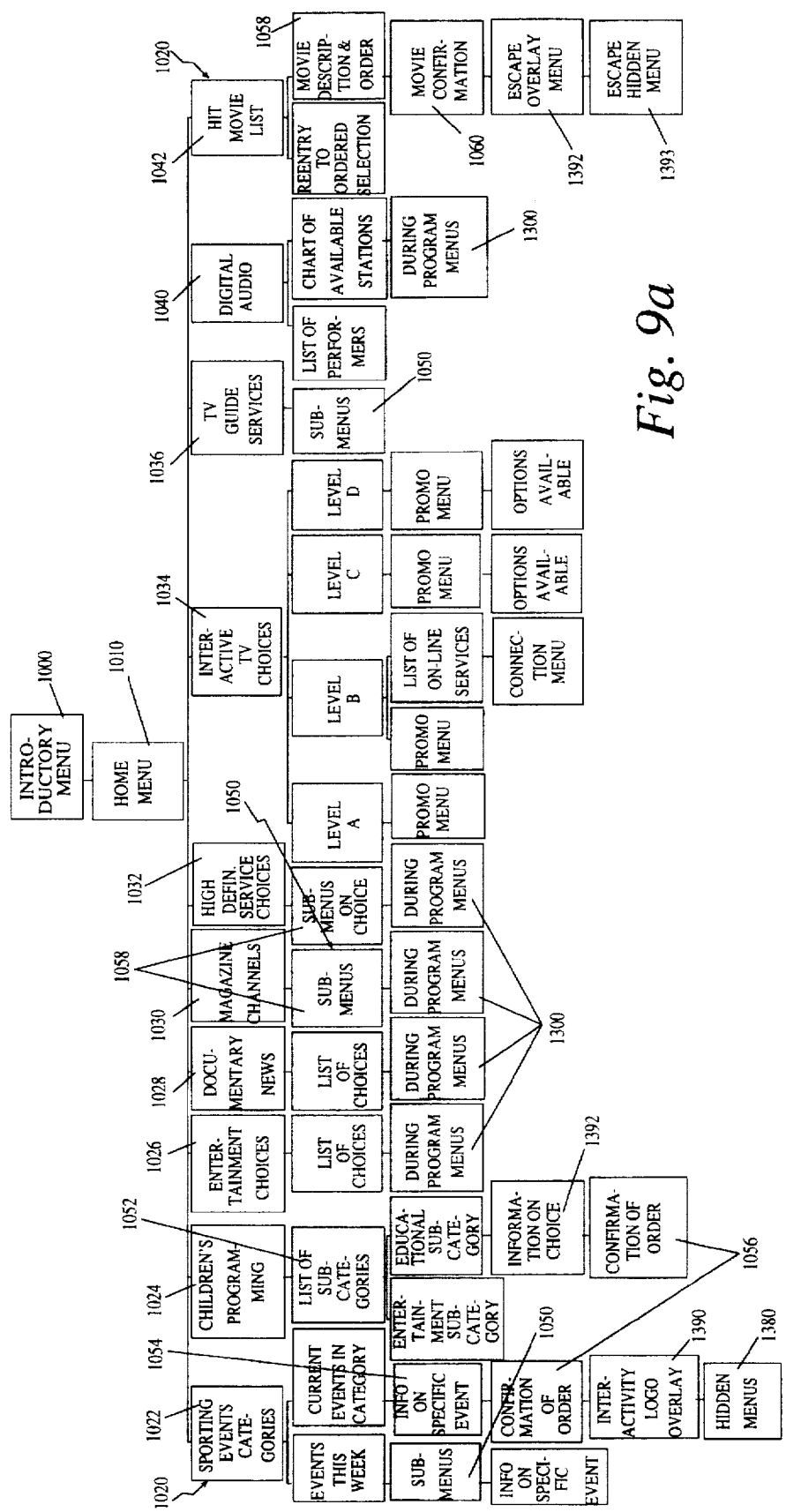
FIG. 9a is a drawing of the basic menus used in the present invention, including the ten major menus represented by icons.
Figure 9B:
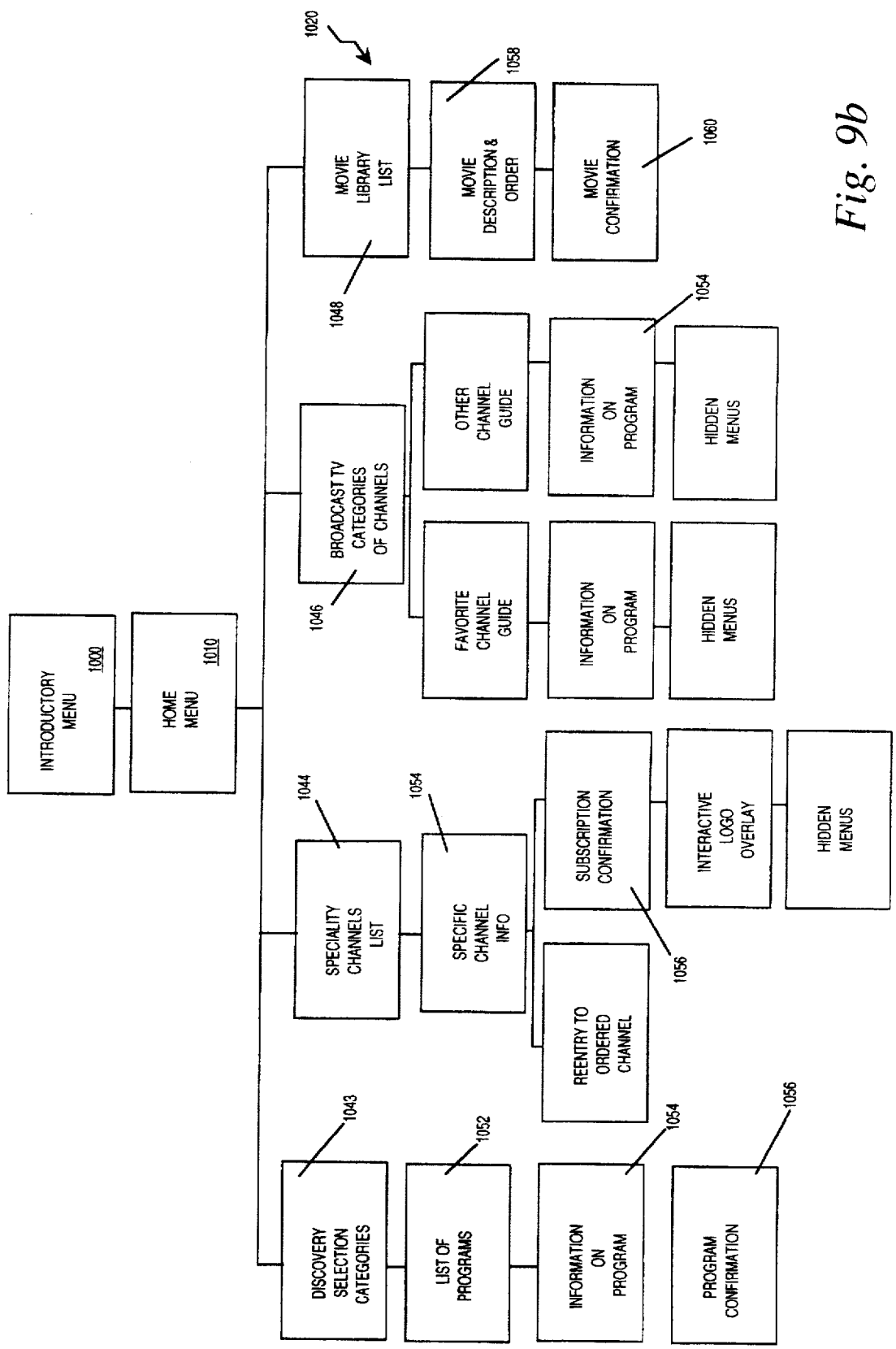
FIG. 9b is a drawing of additional menus used in a preferred embodiment (in addition to FIG. 9a).
Figure 10:
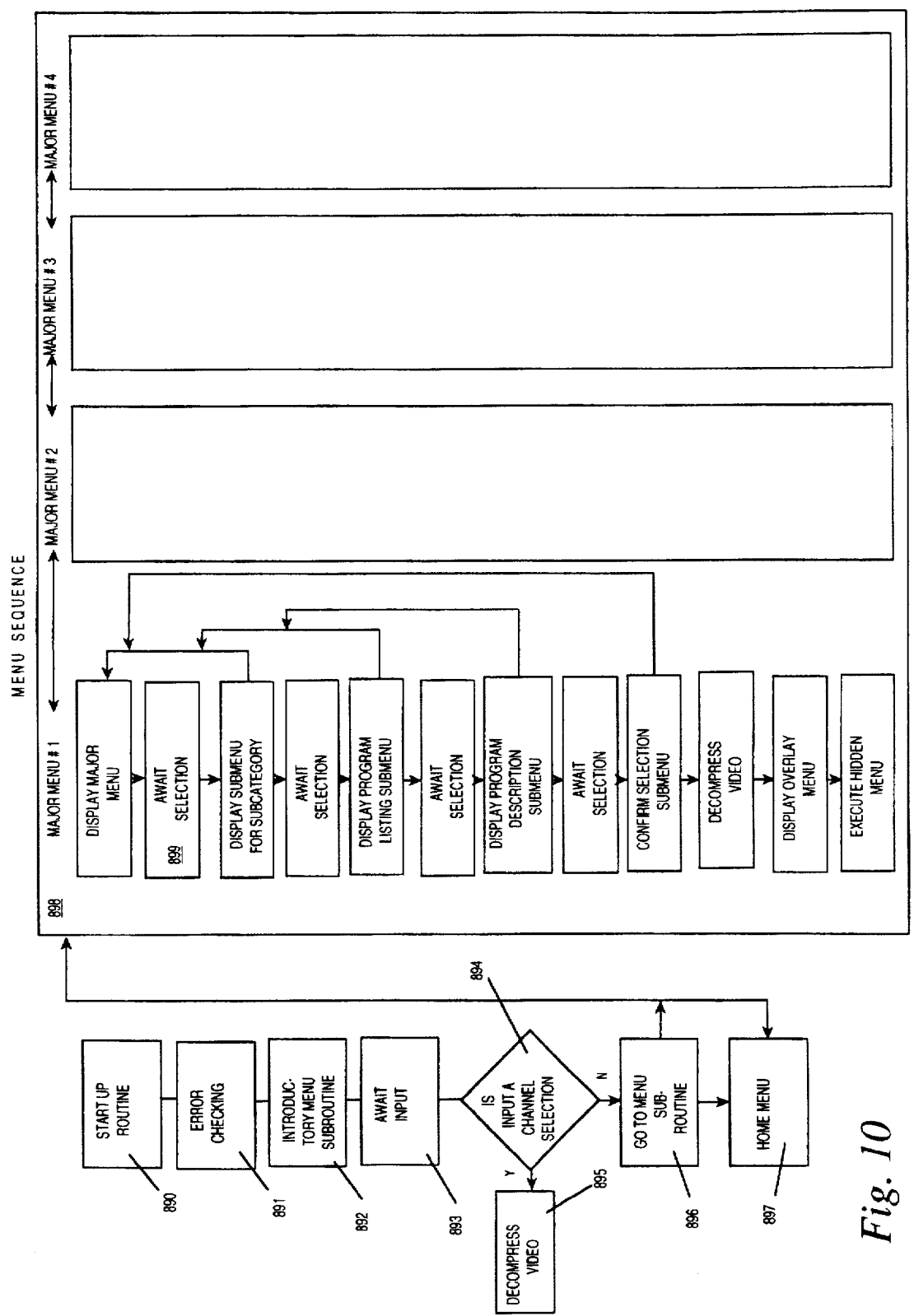
FIG. 10 is a drawing of a flow chart showing the steps required for the microprocessor to sequence program menus.

FIG. 9a shows the preferred embodiment for subscriber selection of television programming. FIG. 9b shows additional major menu 1020 categories, 1043, 1044, 1046, 1048, which may be used with the invention. Both FIGS. 9a and 9b show that the introductory menu 1000 followed by the home menu 1010 is the preferred sequence of on-screen displays. As shown in FIG. 9a, the home menu 1010 provides a choice of at least ten major menus 1022, 1024, 1026, 1028, 1030, 1032, 1034, 1036, 1038, 1040. Upon selection of a major menu 1020 category from the home menu 1010, the program proceeds to a major menu 1020 offering further viewer selections. Each major menu 1020 is customized to target the expected viewership. Depending on the number of available program choices the major menus 1020 either breakdown the major category into subcategories or provide the subscriber with access to further information on a particular program.

For example, referring to FIGS. 9a, 9b and 9c, the major menu for children's programing 1024 provides a list of subcategories 1052 from which the subscriber selects. Upon selection of a subcategory, a submenu represented generally at block 1050, listing program choices within that subcategory is shown to the subscriber. Upon selection of a particular programming choice within the first submenu 1050, the subscriber may be provided with a second submenu 1054 describing the program that the subscriber has selected. From this menu, the subscriber may confirm his program choice and receive a confirmation submenu 1056 from the set top terminal 220 software.

To avoid disturbing a subscriber during viewing of a program, hidden menus 1380 are used. The Hidden Menus 1380 are not shown to the subscriber but instead "reside" at the set top terminal 220 microprocessor. The Hidden Menus 1380 do not affect the selected program audio. The microprocessor awaits a button entry before executing or displaying any Hidden Menu options. The Hidden Menus 1380 provide the subscriber with additional functions such as entering an interactive mode or escaping from a selected program.

Program Overlay Menus 1390 (similar to Hidden Menus 1380) are used during a program. However, the Program Overlay Menus 1390 are overlayed onto portions of the television screen and not hidden. The Program Overlay Menus 1390 allow the subscriber to continue to watch the selected television program with audio but place additional information on portions of the television screen. Most overlays cover small portions of the screen allowing the subscriber to continue to comfortably view his program selection. Other Overlays which are by their nature more important than the program being viewed will overlay onto greater portions of the screen. In the preferred embodiment, some Program Overlay Menus 1390 reduce or scale down the entire program's video screen and redirect the video to a portion of the screen.

With continued reference to FIGS. 9a and 9b, since the system utilizes digital signals in compressed format, High Definition Television programming 1032 can also be accommodated through the menu system. In addition, since the set top terminal 220 has two way communication with the cable headend 208, interactive television programming is possible, with return signals generated by the set top terminal 220. Similarly, the system can support "movies on demand" 1042, 1048 (FIG. 9a) where a subscriber communicates through the set top terminal 220 with an automated facility to order movies stored at the facility, and may confirm the order (as indicated at block 1060). These features, HDTV, interactive television and "movies on demand" are further described in patent application Ser. No. 08/160,194, entitled ADVANCED SET TOP TERMINAL FOR CABLE TELEVISION DELIVERY SYSTEMS, filed Dec. 2, 1993, by the same assignee.

Using this on-screen and "eye-off-the-remote" menu approach to program selection, there is nearly an unlimited number of menus that can be shown to the subscriber. The memory capability of the set top terminal 220 and the quantity of information that is sent via the program control information signal are the only limits on the number of menus and amount of information that can be displayed to the subscriber. The approach of using a series of menus in a simple tree sequence is both easy for the subscriber to use and simply implemented by the set top terminal 220 and remote control device 900 with cursor movement. A user interface software programmer will find many obvious variations from the preferred embodiment shown.

8. Menu Sequencing Software

FIG. 10 is a chart showing a preferred embodiment of program routines for sequencing menus. Upon powerup of the set top terminal 220, a start up routine 890 is performed. Any error checking is thereafter performed 891, and an introductory menu subroutine 892 is performed. This subroutine displays the introductory menu and the microprocessor 602 thereafter awaits for an input 893.

At the home menu portion 897 of the sequence of routines, a subscriber may select one of the major menus, thus starting the sequence of displays represented by routine block 898. Alternatively, a subscriber may go directly to a major menu by depressing a menu select button on the remote 900 and the microprocessor will go to the selected menus subroutine 896.

Once a subscriber has selected a major menu, the appropriate subroutines are executed by the microprocessor (shown in block 898). After each display, the microprocessor 602 awaits for a selection by the subscriber (shown as block 899).

After displaying the major menu 1020 and receiving a selection by the user, a particular submenu 1050 for a subcategory is displayed, as shown in FIG. 8. Again, the microprocessor 602 waits for an input from the subscriber. Following the input, a routine to display a program listing submenu is executed. After receiving another selection, the microprocessor 602 performs the next routine for displaying a program description submenu. Thereafter, if a particular selection requires a confirmation menu, that subroutine is executed and the appropriate menu displayed. The selected video is then decompressed and displayed on the television screen. If there are any display overlay menus or hidden menus, the proper subroutine is executed by the microprocessor 602 and these menus are displayed.

With continued reference to FIG. 10, at any time during the selection of menus in major menu block 898, the subscriber may also depress another major menu button to move into a second column of routines (represented by major menu 2, major menu 3, etc. columns). Thus, a subscriber may move from major menu to major menu. Additionally, a subscriber may depress a home menu button on remote 900 to return to the home menu 897 at any time.

The various subroutines executed by the microprocessor 602 allow a subscriber to navigate through the various menus of the present invention. A subscriber may sequence back through menus or return to the home menu 897 with one-touch of the home menu button on the remote control 900. All of these functions help to add to the system's user friendliness.

Figure 11A:
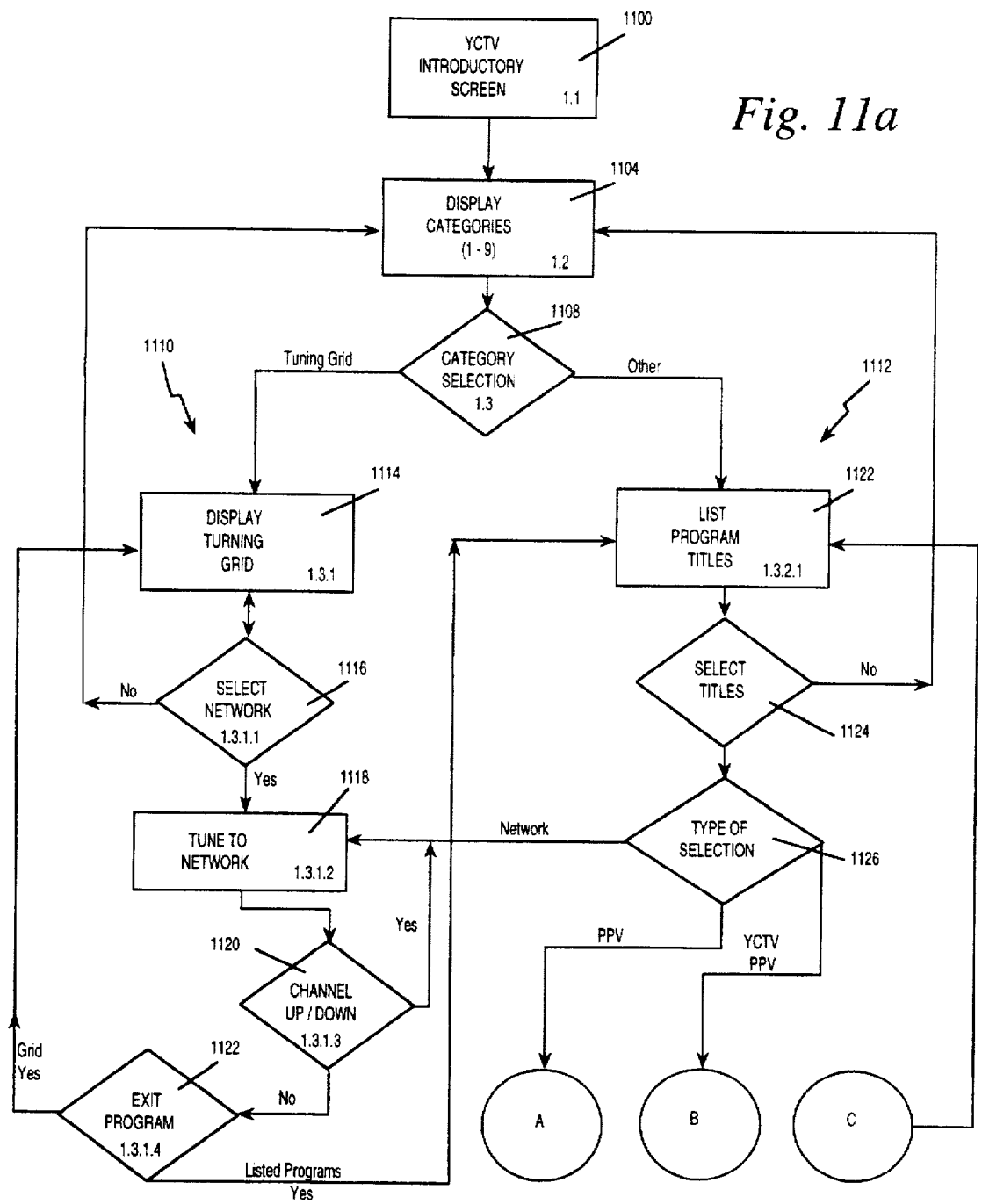
FIGS. 11a, 11b and 11c depict an alternative approach to the sequencing of menus.
Figure 11B:
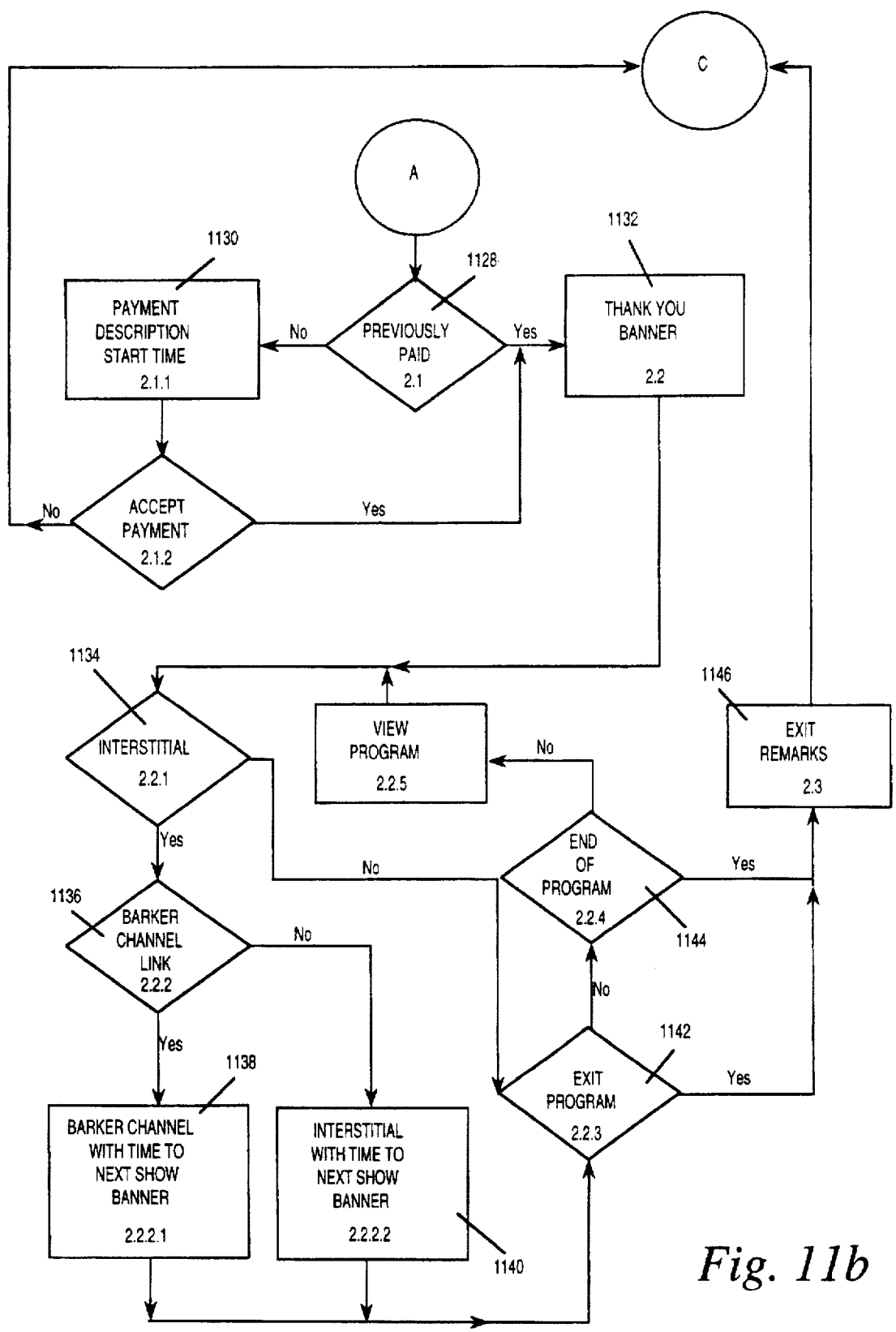
Figure 11C:
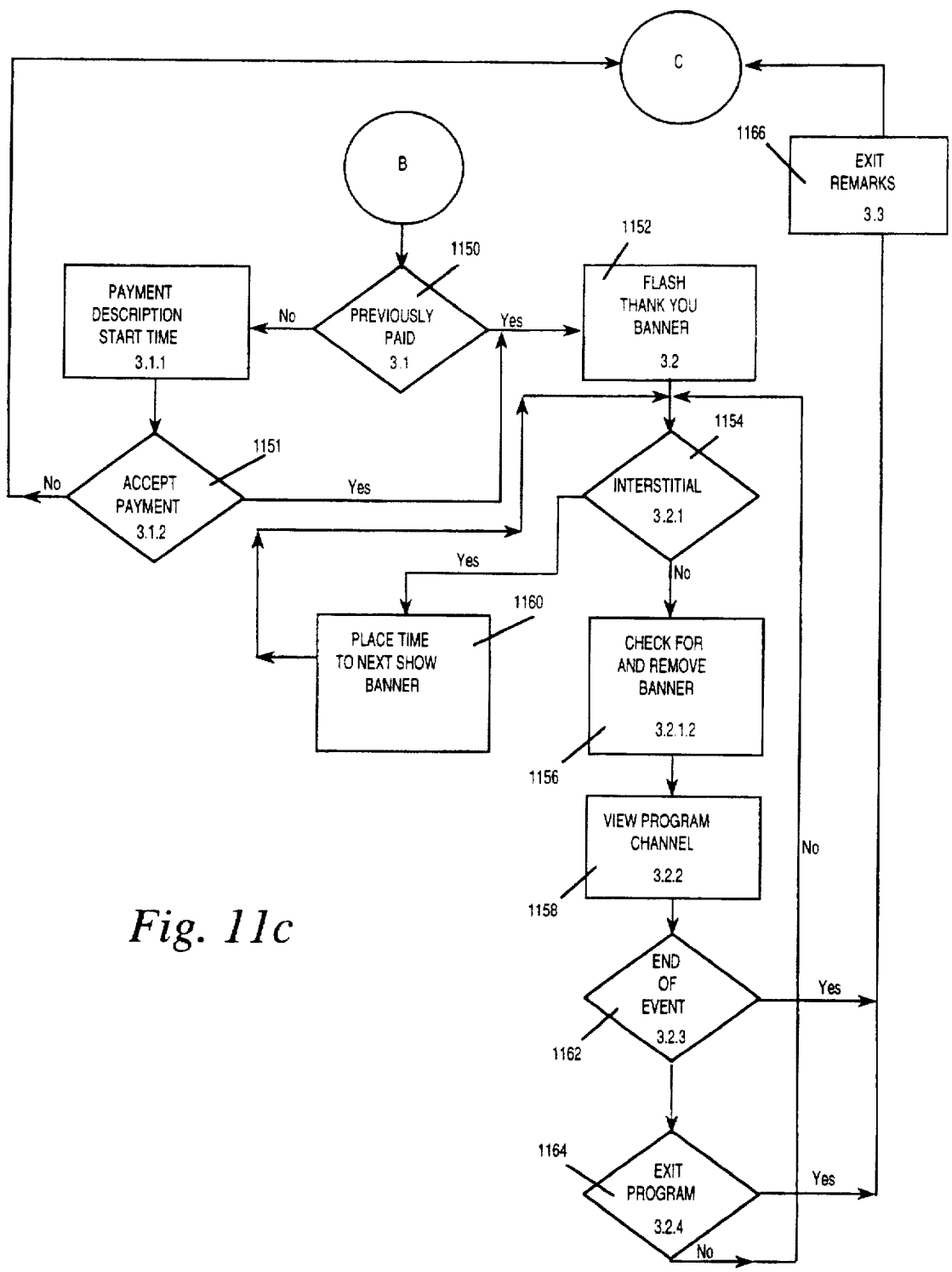

FIGS. 11a, 11b and 11c, diagram an alternative approach to the sequencing of menus. This approach involves separate sequencing logic for (1) menu system entry, (2) PPV (pay per view) navigation and selection and (3) menu and PPV navigation and selection.

FIG. 11a diagrams the sequence for system entry. Upon entry into the system, an introduction screen 1100 is displayed. The introductory screen is removed by pressing any key on the remote 900 or, alternatively, on the set top terminal key pad 645. The introductory screen 1100 also has a timer so that, after a specific period of time, the screen 1100 will be removed regardless of whether any key has been pressed by the subscriber.

A home menu 1104 displaying program categories follows the introductory menu. This screen displays a set of program categories that may be individually selected using a cursor highlight bar (as represented at decision block 1108). The subscriber has the ability to move from one category to the next by using the channel-next and channel-previous keys. In addition, the viewer or subscriber has the choice of selecting a category or exiting from the menu system. Upon selection of a particular program category, a major menu (similar to major menus 1020 shown in FIGS. 9a and 9b) will be displayed. From this major menu the viewer can make a category selection. Such a selection may involve non-PPV networks 1110 (e.g., NBC, CBS, ESPN™ etc.), PPV programs or PPV programs 1112.

If the subscriber selects a non-PPV network 1110, a network submenu 1114 will be displayed. This submenu 1114 includes a grid or matrix of non-PPV network logos. The subscriber has the ability to move from logo to logo using the channel-next and channel-previous keys (as shown at decision block 1116). The subscriber also has the option of exiting to the previous network submenu 1114 or returning to the home menu. Should a specific network be selected, the subscriber's set top terminal will be tuned 1118 to that particular network. The network's identifier or logo flashes on the screen to provide feedback to the subscriber on the selection. From the network submenu 1114, the subscriber has the ability to channel surf through the network channels system using the channel-up and channel-down keys 1120. At any time during this process, the subscriber may exit 1122 back to the network submenu 1114.

In addition to selecting specific networks from a particular major menu, the subscriber also has the option of choosing a PPV program 1112. Should the subscriber select a PPV program category from the major menu, a list of PPV program titles will be displayed as a submenu 1122. From this submenu 1122 the subscriber can select a specific PPV program title 1124. The menu sequencing logic will vary depending on which is selected (as shown at block 1126).

FIG. 11b diagrams the menu sequence logic for a PPV program selection. As shown in FIG. 11b, once a PPV program title has been selected (at block 1126) the menu system determines whether the title has been previously purchased 1128. If the event has not been previously purchased, a payment screen 1130 will be displayed. A description of the event will be provided to the subscriber along with the next start time, the cost of the event and the amount of free viewer time for previewing. The subscriber has the option of purchasing the event. If the subscriber chooses not to purchase the event, the PPV program title list will be redisplayed.

Once a PPV program has been purchased or a previously paid program has been selected, a "thank you banner" 1132 will be displayed. This banner 1132 provides the name of the program selected and the amount of preview time left before the program is actually logged as a paid event. This "thank you banner" 1132 has a timer associated with it which automatically removes the banner after a set period of time (e.g., 30 seconds). Alternatively, the subscriber can immediately remove the banner 1132 by pressing any key. Once the "thank you banner" 1132 is removed, the system checks whether interstitial material is playing at the time of the PPV event selection (as at block 1134). If a program is in progress, the system will remove any "time to event banner" and the set top terminal 220 will be tuned to the program's channel (View Program 1145). In addition, the system determines whether there is a link to a barker channel 1136 (or event field item) when the interstitial material is present.

If a barker channel link exists for the event, the set top terminal will be tuned to the barker channel (block 1138). Subsequently, a banner will be displayed which indicates the program's name and time remaining until it starts. At the start time of the program, the set top terminal 220 will be tuned to that program's channel 1145. If, on the other hand, no barker channel link has been specified, the set top terminal 220 will be tuned to the program's channel 1140 and display the interstitial with time to next show banner 1140.

During this process, the subscriber has the option of exiting 1142 the program at any time by pressing the cancel key. During the program, the system will constantly check for the end of the program 1144. Where the program remains in progress, the set top terminal 220 will remain tuned to the program's channel 1145 and all banners will be removed. The system will continue to view the program, looping through the interstitial and barker channel link loops, until the program is ended or exited. Once the program ends or the subscriber exits the program, exit remarks and a final "thank you banner" will be displayed 1146.

FIG. 11c diagrams the alternate sequence for the selection of a PPV program, beginning at decision block 1126. Once a PPV program title has been selected, the menu system determines whether the program has been previously purchased 1150, as in the PPV selection process described above. The system again displays a "thank you banner" 1152 upon purchase 1151 or previous payment and determines whether interstitial material is presently being viewed 1154. If interstitial material (e.g., promotionals) is present on the program channel, a banner showing the next show time is generated and placed on the television screen 1160. When the program is in progress, the system removes any "time to event banner" 1156 and the set top terminal 220 will be tuned to the appropriate program channel. Another banner will be displayed which indicates the program's name and time remaining to start and the program is viewed 1158.

The system software will stay in a loop until access to the program ends 1162 or when the subscriber exits the program 1164. Again, the system constantly checks for the end of the program or the end of access. The subscriber also has the option of exiting the program at any time by pressing the cancel key. Upon end of access or exiting of the program exit remarks and a final "thank you banner" 1166 will be displayed.

9. Turbo Card Software

Figure 12A:
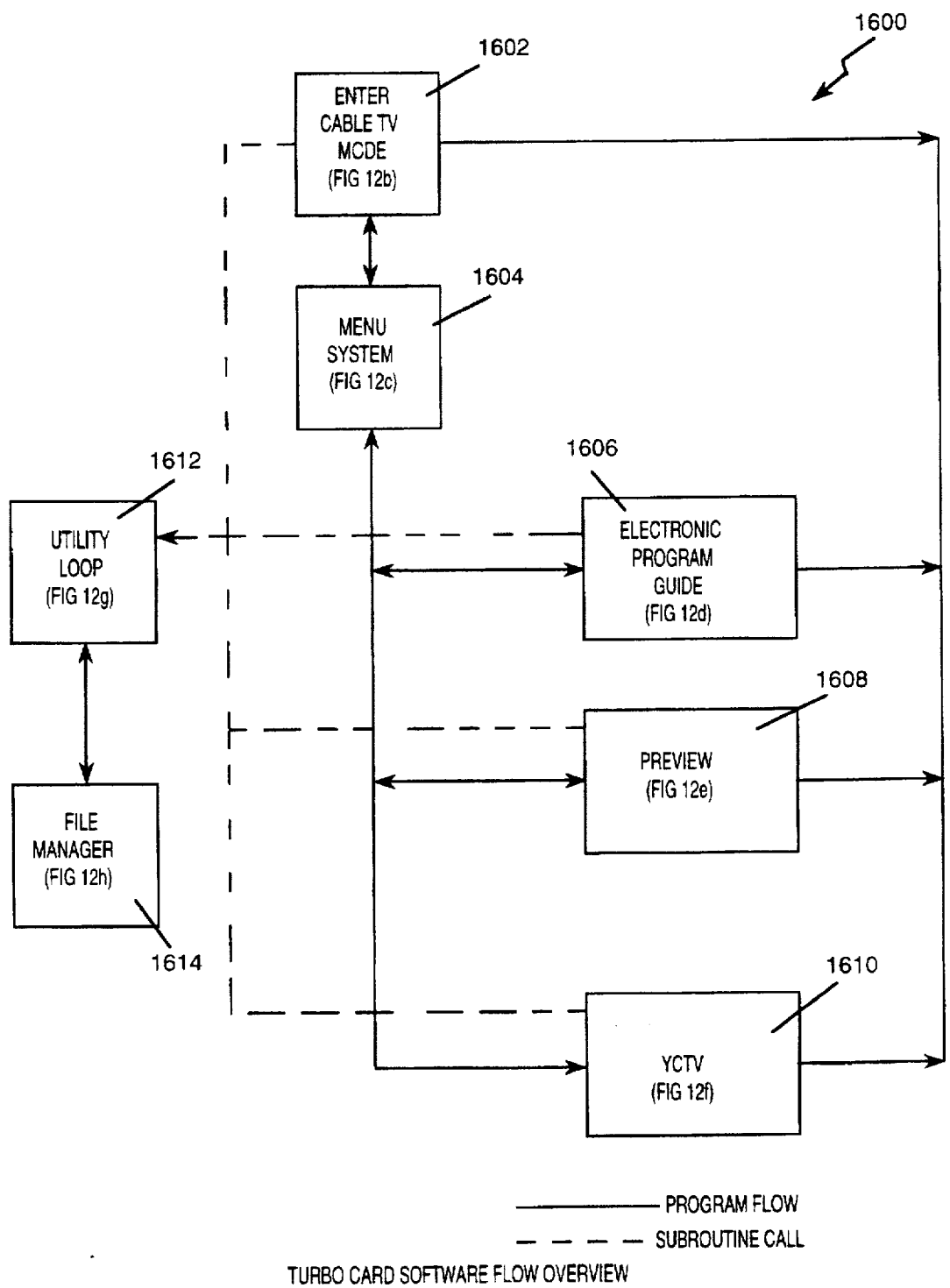
FIGS. 12a–12h depict the program flow of a Turbo card upgrade for an existing set top converter box.

FIG. 12a provides a detailed overview of the Turbo Card software flow 1600, which implements a menu sequence (with the main program flow depicted as single, solid continuous lines and routine calls depicted as single dashed lines). As shown in FIG. 12a, the Turbo Card software makes use of seven software routines. These routines include: (1) enter cable TV mode 1602, (2) menu system 1604, (3) electronic program guide 1606, (4) preview 1608, (5) YCTV 1610, (6) utility loop 1612, and (7) file manager 1614. FIGS. 12b through 12g diagram each of these software routines in further detail.

Figure 12B:
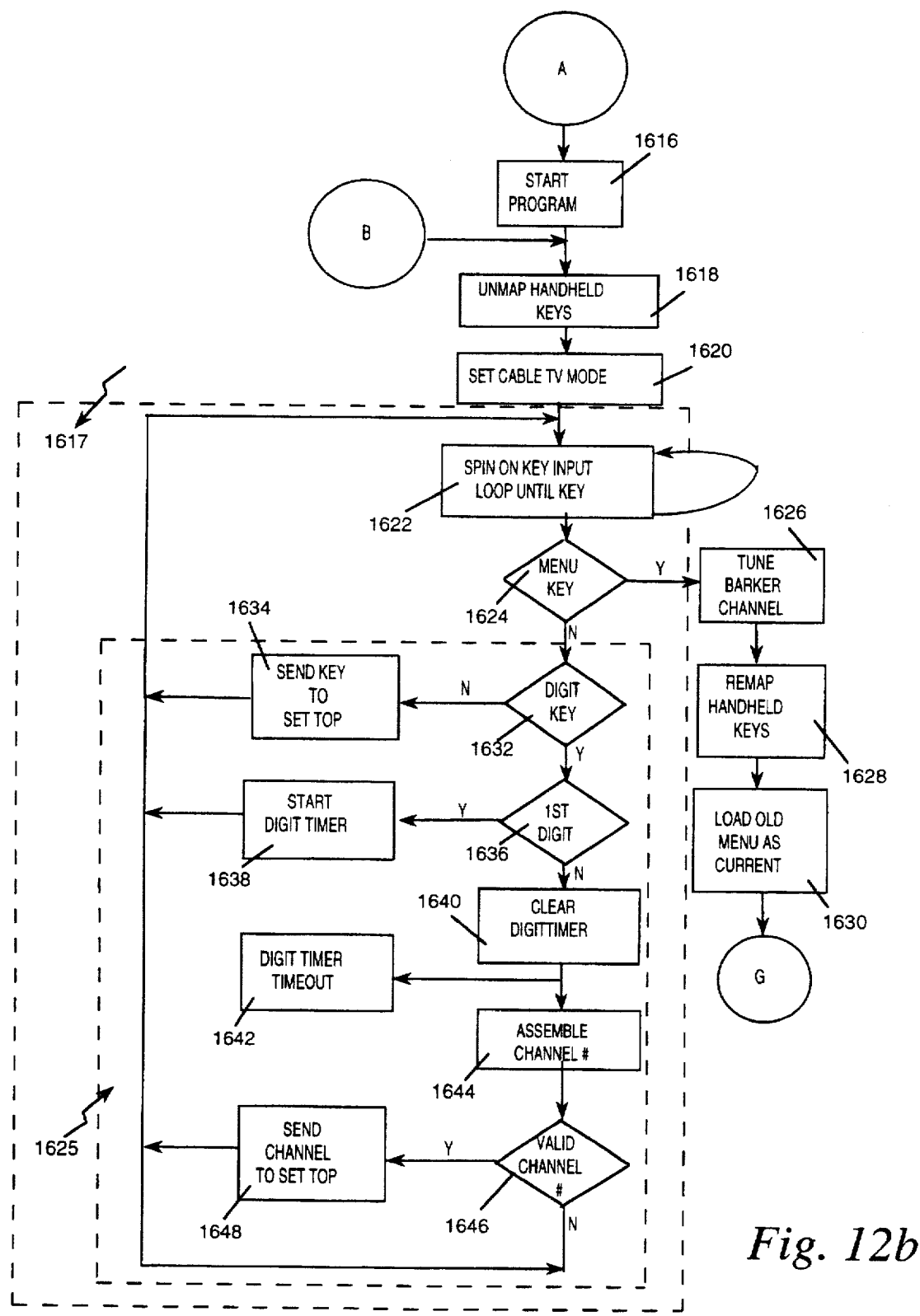

FIG. 12b details the initialization and normal operating mode of the Turbo Card software 1600. The figure shows the flow of the software before the subscriber selects any functions or menu options. The first block 1616 of the figure indicates the start of the program, which is subsequently followed by the portion of the routine that unmaps the remote control 900 hand-held keys 1618. This unmapping step disables any previously entered keystrokes on the remote control 900. The software then enters the cable TV mode 1620 followed by the keystroke loop 1617. The key input subroutine 1622 in the keystroke loop 1617 spins until a keystroke is entered (as shown at block 1622).

Following an entered keystroke, the keystroke loop checks whether a menu keystroke has been entered (decision block 1624). If a menu keystroke has been entered, the keystroke loop 1617 is exited. The system tunes to a barker channel 1626, remaps the hand-held keys to the new selection (at 1628) and loads the old menu as the current menu (at 1630). Subsequently, the file manager software described below is initiated through software flow entry point G, FIG. 12c.

If an alpha/numeric or digit key is entered instead of a menu key, the keystroke loop 1617 continues with a digit key entry sequence 1632. This sequence sends the key selected to the set top 1634, which effectively places the routine in the key input spin 1622 again. Where only the first digit has been entered (as at block 1636), a digit timer will be initiated (block 1638) and the routine returns to the key input spin 1622. If, however, both digits have been entered the digit timer is cleared 1640 and the digit timer will experience a time out 1642. Subsequently, the channel number selected will be assembled by the software (as at block 1644) and then compared with those channels available for selection to determine the validity of the channel number (block 1646). Where a valid channel number has been selected, the routine sends the channel to the set top terminal 220 (as at block 1648), returning the keystroke loop routine 1617 to the key input spin 1622 until another keystroke is entered. Conversely, if the channel number is invalid, the set top terminal software will return to the loop without sending the channel to the converter box 220 itself.

Figure 12C:
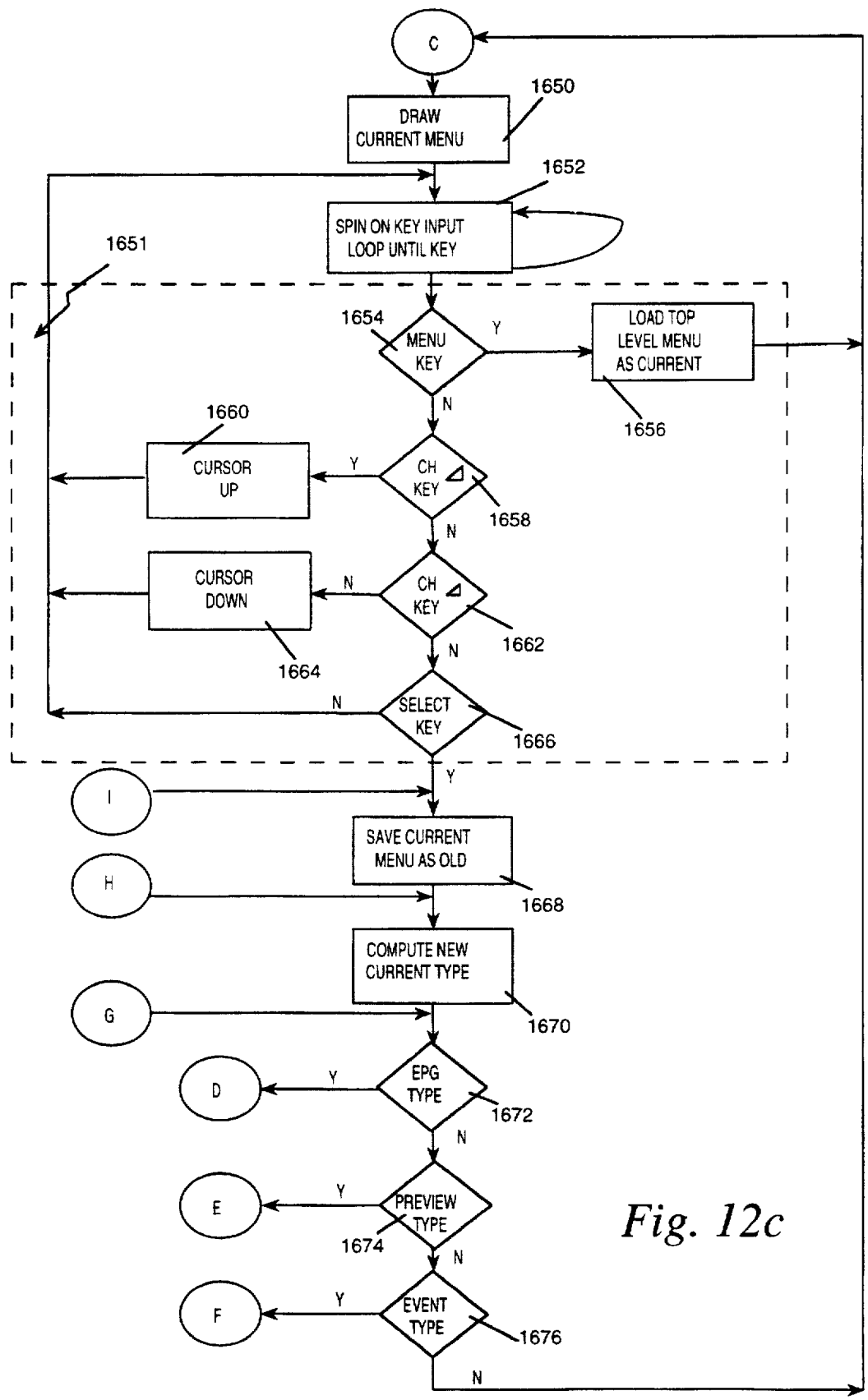

FIG. 12c depicts the general menu drawing routine 1604 (of FIG. 12a) that is used throughout the execution of the graphical user interface. The routine 1604 begins by initiating the draw current menu subroutine (block 1650). A keystroke loop 1651 and key input spin is used (block 1652) until a key input is entered. Upon selection of a menu key 1654, the keystroke loop 1615 loads the top level menu 1656 as the current menu and loops around to the draw current menu subroutine (block 1650). Where a menu key is not chosen, the keystroke loop 1651 determines whether the cursor up key has been selected (decision block 1658).

If, instead, the channel or cursor up key has been selected the keystroke loop 1651 moves the cursor up selection 1660 and returns to the key input spin 1652. Where, however, a channel up or cursor up key has not been selected, the keystroke loop 1651 checks whether the channel down key has been selected (block 1662). If the channel down key has been selected, the routine moves the cursor down the screen 1664 and returns to the key input spin 1652. Where, however, the channel down key has not been selected, the routine determines 1666 whether another key has been entered by the subscriber. If no other key has been entered, the routine returns to the key input spin 1652. If, on the other hand, a keystroke has been entered, the current menu will be saved as an old menu (block 1668) and the routine will compute a new current menu type 1670.

As shown in FIG. 12a routine 1604 sequentially determines whether this current menu type is either an electronic program guide type 1672, preview type 1674 or event type menu screen 1676. If the electronic program guide type has been selected, the routine initiates the draw electronic program guide (EPG) screen routine shown in FIG. 12d. If the preview type menu has been selected, the routine initiates the preview screen routine shown in FIG. 12e. If the event type menu screen has been selected, the buy screen software shown in FIG. 12f is initiated. If none of these menu type screens have been selected the routine 1604 returns to the draw current menu subroutine 1650.

Figure 12D:
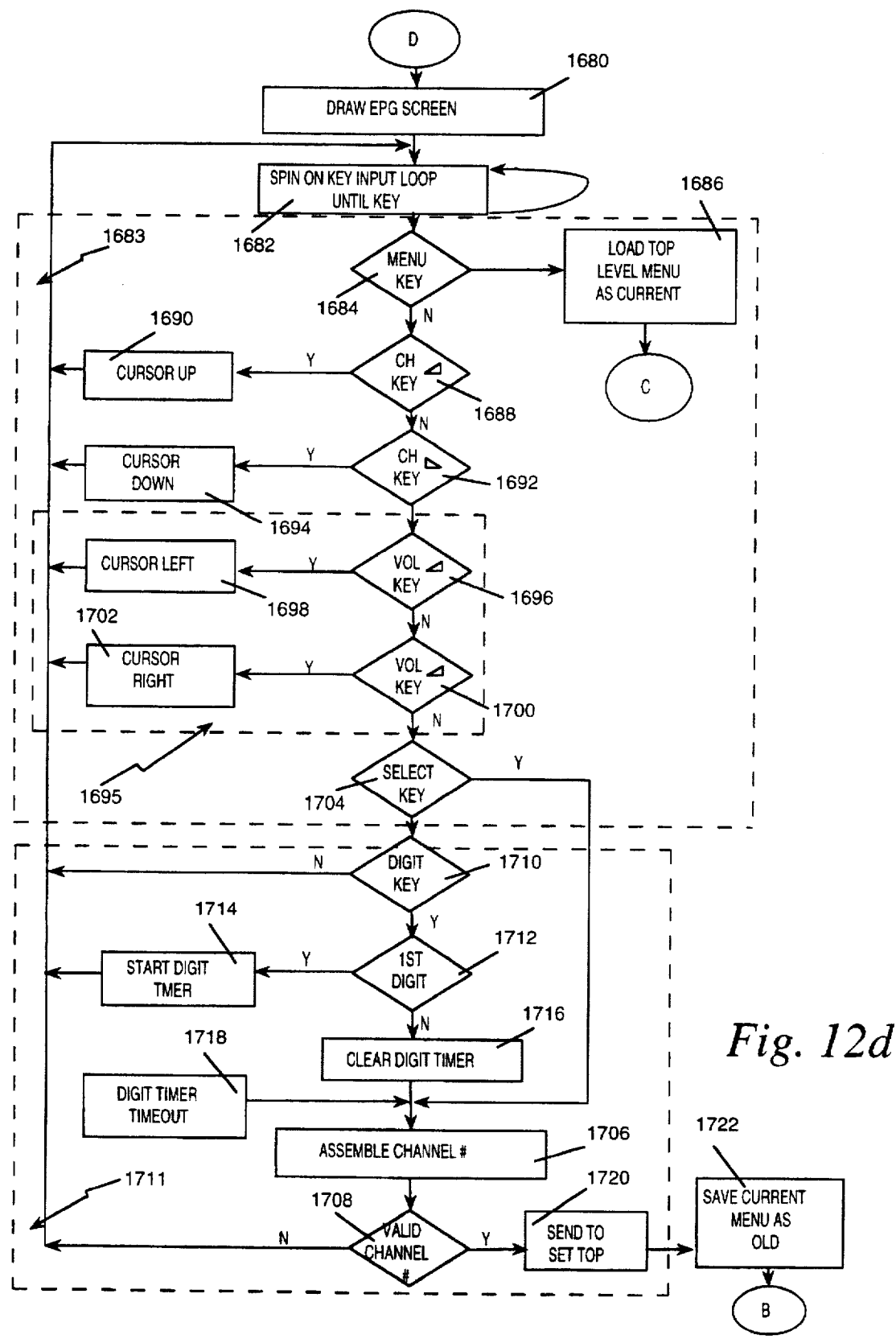

FIG. 12d diagrams the electronic program guide software flow 1606. The routine 1604 begins with the draw electronic program guide screen subroutine 1680. The routine 1606 executes the key input spin 1682 waiting for a subscriber keystroke entry. Once a keystroke is entered, the routine 1606 enters a keystroke loop 1683, which has a flow similar to the keystroke loop 1651 described above and shown in FIGS. 12c and 12d, respectively.

Unlike the keystroke loop 1651 described above, however, this loop also checks whether the volume down key has been selected 1696. If the volume down key has been selected, the cursor is moved to the left on the screen 1698 and the routine re-enters the key input spin 1682. When, however, the volume up key has been entered 1700 the routine moves the cursor to the right on the screen 1702 and returns to the key input spin 1682. If the cursor up, down, left, or right keys have not been selected, the system software determines whether another keystroke instead has been entered 1704. Where another keystroke has, in fact, been entered, the software assembles the channel number 1706 and checks whether the channel number selected is a valid entry 1708.

Upon selection of a key, the routine next enters a digit key entry sequence 1711, which has a flow similar to the digit key entry sequence 1625 described above. Subsequently, the routine returns to the normal operating mode shown in FIG. 12b, existing through software flow entry point B.

Figure 12E:
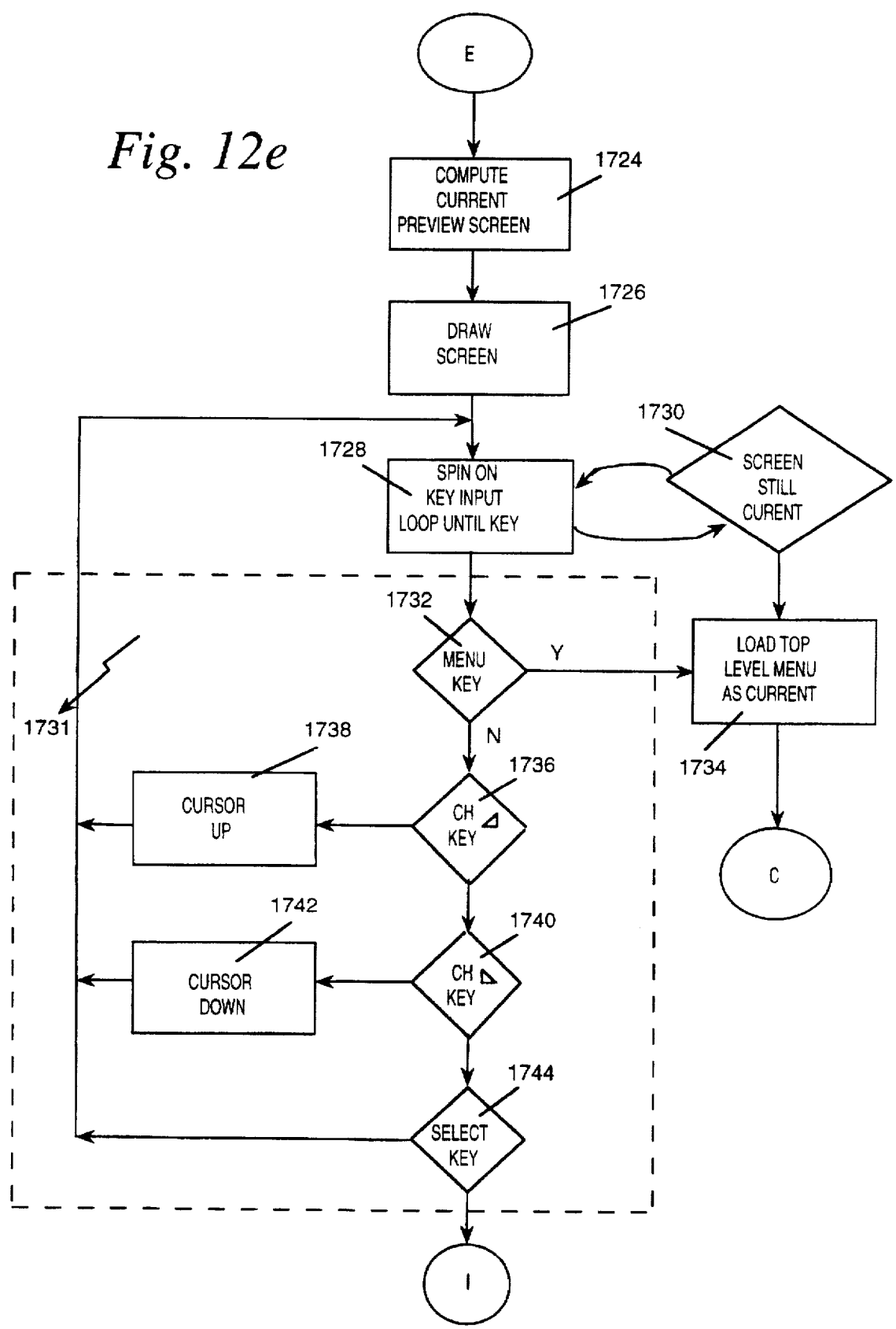
Figure 12F:
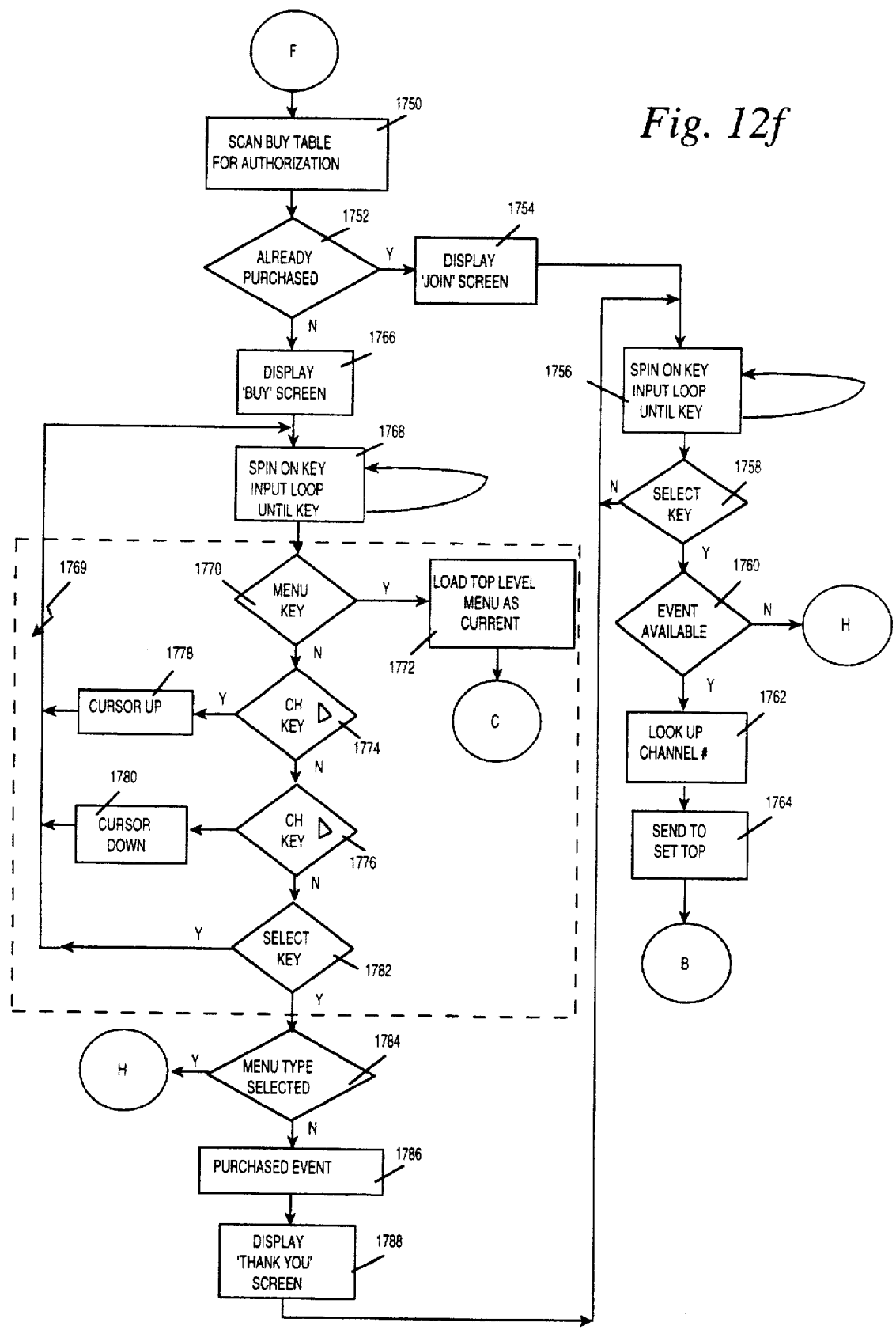

FIG. 12e diagrams the preview screen software flow 1608. This routine initially computes the current preview screen 1724 in those cases where a preview type menu screen has been selected during the general menu drawing routine flow 1650 of FIG. 12c. The routine next begins to draw the screen 1726 and enters the key input loop 1728, waiting for keystroke entry by the subscriber. This loop continually checks whether the screen is still current, as represented by decision block 1730.

Once a key is entered 1732, the routine enters a keystroke loop 1731, which is similar to the keystroke loops 1651 and 1683, described above. If the subscriber has selected a specific key 1744, the routine exists the keystroke loop 1731 and enters the general menu drawing routine 1650 shown in FIG. 12c. The routine 1650 is entered through software flow entry point "I".

FIG. 12f diagrams the flow of the software for generating a buy screen 1610. This routine 1610 is initiated after an event type program selection from the routine 1610 shown in FIG. 12c. In order to generate a buy screen, this routine initially scans a buy table for authorization 1750 and then determines whether or not the event selected by the subscriber has been already purchased 1752. If the event has been already purchased, a "join the event screen" 1754 will be displayed by the routine and the routine will enter the key input loop 1756.

Once a key has been entered 1758, the routine determines whether or not the event corresponding to the key is available 1760. If the event is unavailable, the routine returns to the general menu drawing routine shown 1650 in FIG. 12c, entering that routine 1650 at the circle designated by the letter "H" in that routine. Where, however, the event is available, the software looks up the channel number 1762 and sends that specific channel number to the set top terminal 220, as represented at block 1674. The routine subsequently enters the normal operating mode routine shown in FIG. 12b, beginning between block 1616 and 1618.

Where the event chosen, on the other hand, has not already been purchased, as at block 1752, the routine generates a buy screen for display 1766. The routine subsequently enters a keystroke entry loop 1769, which is similar to the keystroke loops 1651, 1683 and 1731, described above. This loop 1769 is exited upon entry of an alpha/numeric or digit key as at block 1782. The routine 1610 subsequently determines whether a menu type has been selected 1784.

Where a menu type has been selected, the routine enters the general menu drawing routine 1650 shown in FIG. 12c through software flow entry point "H". Where a menu type has not been selected 1784, however, the routine determines whether an event has been purchased 1786. If an event has been purchased, a thank you screen is displayed 1788 and the software re-enters the key input loop routine 1756, awaiting a determination of whether the event is available for program selection.

Figure 12G:
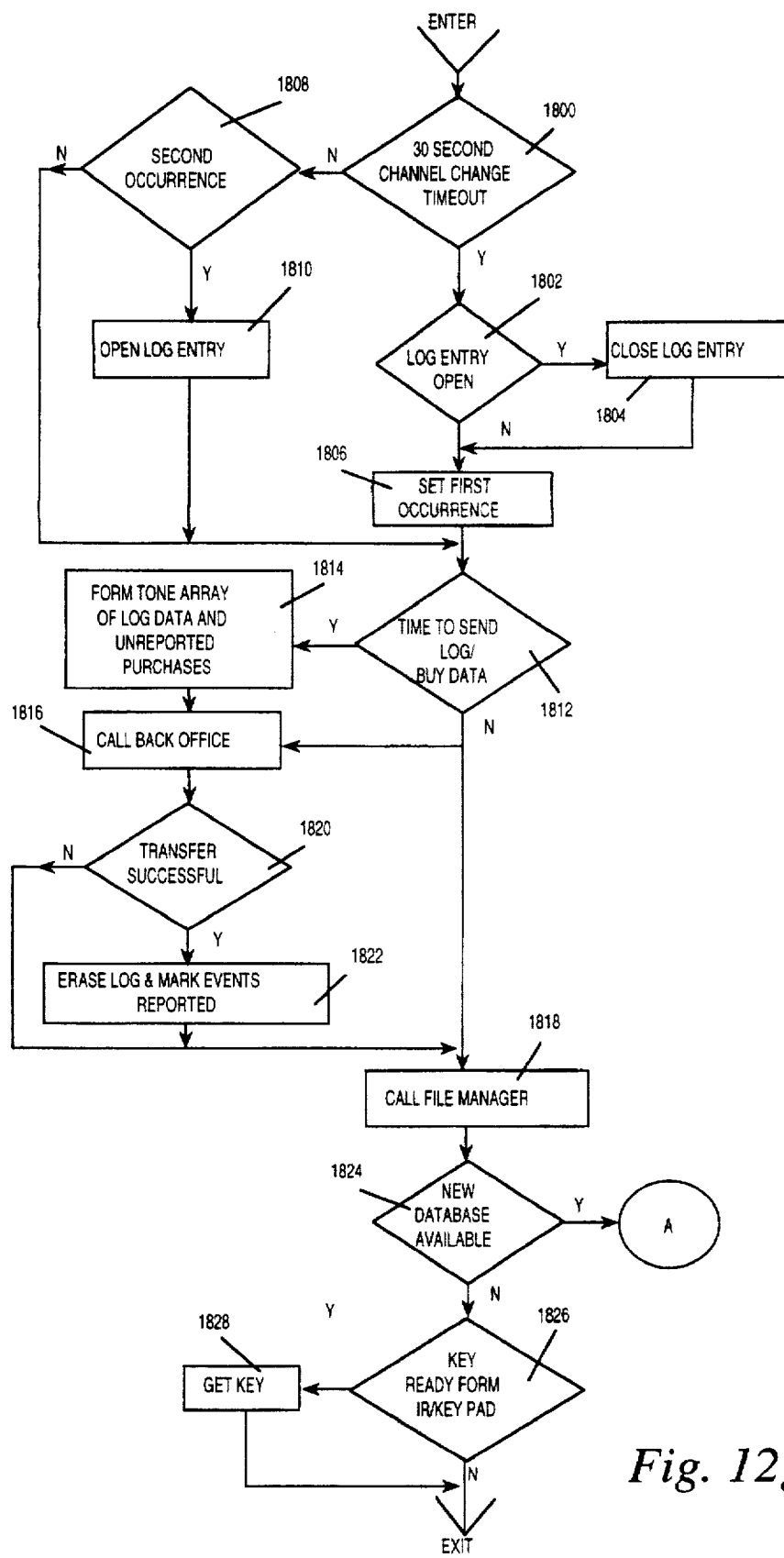

FIG. 12g diagrams the utility loop software (shown generally at 1612 in FIG. 12a). This software 1612 is a continuously executed subroutine that monitors the changing of channels to determine whether a subscriber has remained on a channel for more than 30 seconds (as represented at decision block 1800). When the subscriber remains on the channel for more than 30 seconds, a time out is effected and the routine opens a log entry 1802. The routine subsequently notes that the subscriber has remained on the channel for more than 30 seconds and closes the log entry 1804. The routine then sets the first occurrence 1806.

When the subscriber has not remained on the channel for more than 30 seconds, this routine 1612 determines whether the channel change is a second occurrence 1808. In those instances where such a channel change is deemed a second occurrence, the log entry is opened 1810 and the occurrence is noted. If, however, the channel change is not a second occurrence, the routine 1612 determines whether there is time to send any log or buy data back to the cable headend 208 (represented at block 1812). Where such time exists, the routine forms a tone array of log data and unreported purchases 1814 and subsequently calls the cable headend 208 (as at block 1816). If the time to send log or buy data back to the cable headend 208 is insufficient, the routine calls the cable headend 208 (depicted at block 1818) and initiates the file manager routine 1614 discussed below with reference to FIG. 12h.

Once the cable headend 208 has been called, the routine 1612 determines whether the transfer has been successful 1820. If the transfer is unsuccessful, the file manager routine 1612 is called (at block 1818), otherwise, the log is erased and events marked are reported back to the cable headend 208 (as shown at block 1822). Upon completion of this process, the routine calls the file manager routine 1614 described below, and determines whether a new database is available 1824.

If a new data base is available the routine enters the normal operating mode (diagramed in FIG. 12b beginning at 1616), otherwise, the routine 1612 determines whether a key has been entered 1826, either through infrared command or through key pad entry. If a key has been entered, the routine reads the key 1828 before exiting this routine 1612. If no key has been entered, the routine 1612 is exited.

Figure 12H:
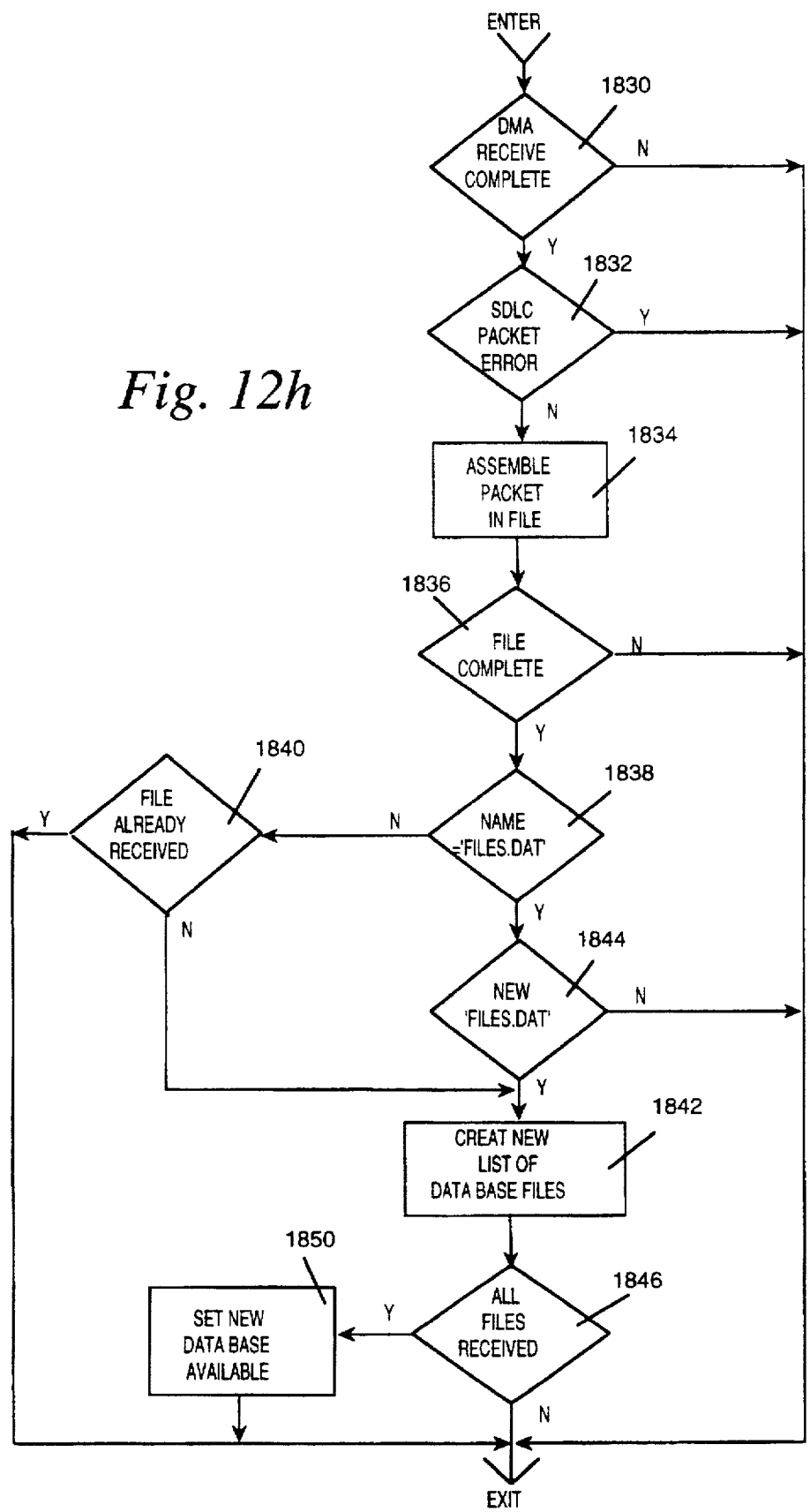

FIG. 12h diagrams the software routine for the file manager 1614. This software is transparent to the subscriber, runs in background, and makes use of files downloaded from the headend 208. These files typically consist of polling requests that command the set top terminal 220 to report purchase information to the headend 208.

During the download process, the routine 1614 determines whether the DMA receive is complete 1830. If the DMA receive is incomplete, the routine 1614 is exited, otherwise, the routine checks for packet errors 1832. If an error in the SDLC packet is detected, the routine 1614 is also exited. Where no error has been detected the routine 1614 assembles each packet in the file 1834.

Subsequently, the routine 1614 determines whether the file is complete 1836. If the file is incomplete the routine 1614 is exited. If complete, the file name is checked to determine whether it is the Files.Dat file 1838. If it is not the Files.Dat file, the routine determines whether the received file has already been received 1840. If previously received, the routine 1614 is exited. If the file has not been received, a new list of data base files will be created 1842 by the routine 1614. Where the routine finds a match for the Files.Dat file, the routine determines whether this file is a new Files.Dat file 1844. If this file is not new, the routine 1614 is exited. If, however, this file is new, the routine 1614 creates a new list of database fries (again represented at block 1842).

The routine 1614 subsequently determines whether all files have been received 1846. If all files have been received, a new database is made available 1850 and the routine 1614 is exited. If, on the other hand, all files have not been received, the routine 1614 is nonetheless exited.

10. Detailed Description of Menu Screens

Figure 13:
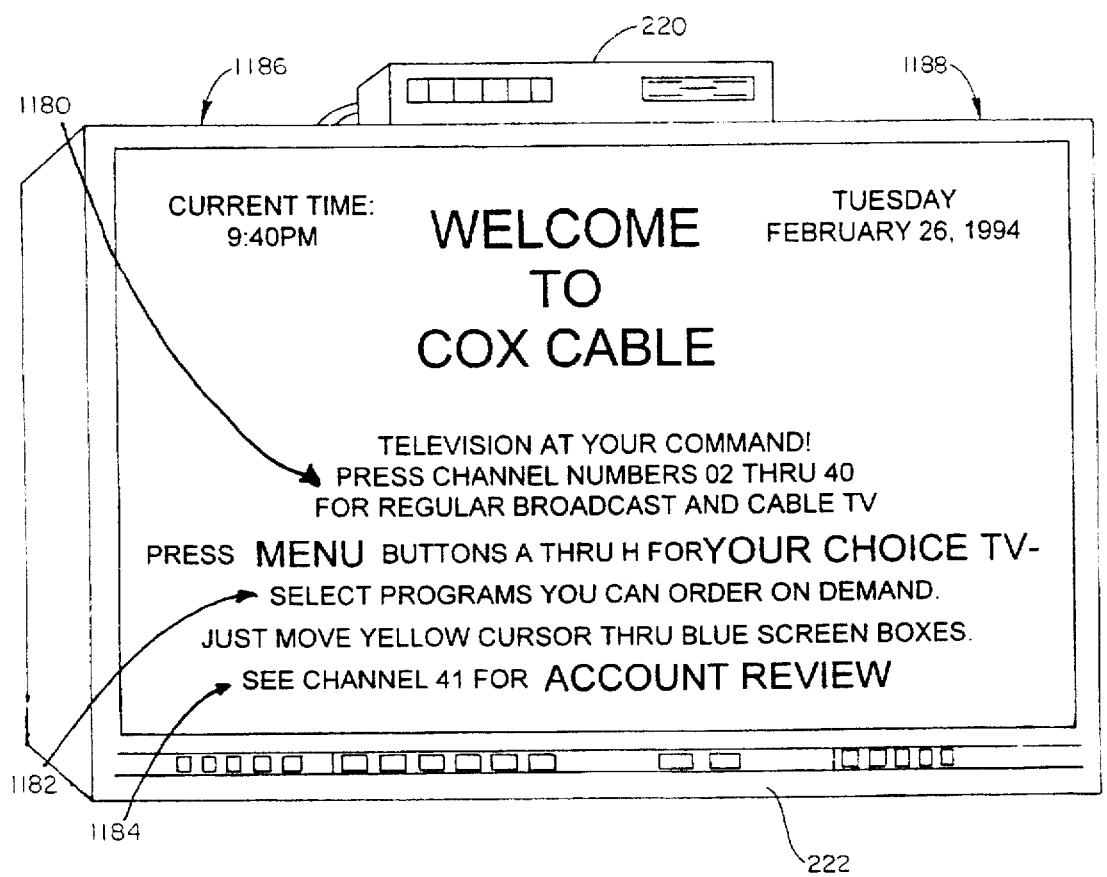
FIG. 13 depicts an introductory menu.

FIGS. 13 through 26 show examples of specific menus and sequences of menus which may be used with the present invention. FIG. 13 shows an example of an introductory menu screen 1000 that is displayed on a subscriber's television 222. This menu screen 1000 offers the subscriber three options. The subscriber may choose regular cable television (channels 2 through 40 1180), programs on demand 1182 (e.g., movies), or a subscriber's account review 1184. Other basic program options are possible on the introductory menu screen 1000. For example, a system "help" feature (not depicted) can be offered on the introductory menu 1000.

In the upper left-hand corner of the menu 1000, there is a small window 1186 that may be customized to the subscriber. A subscriber will be given the option of showing the current time in this window. In the upper right-hand corner a second customized window 1188 is available in which a subscriber may show the day and date. These windows may be easily customized for subscribers to show military time, European date, phase of the moon, quote of the day, or other informational messages. These windows may be customized by subscribers using on-screen menu displays following the introductory menu 1000.

In the preferred embodiment, the subscriber is given the capability of accessing base channels such as regular broadcast TV and standard cable channels and account (billing information) directly from the introductory menu 1000 (e.g., by entering the channel number). Further, in the preferred embodiment, the subscriber may directly access a major menu 1020 and bypass the home menu screen 1010. If the subscriber is familiar with the programming choices available on the major menus 1020 (FIG. 14), an icon button or a lettered key (alpha key) of the remote control 900 may be selected to directly access the desired major menu 1020. If any key entry other than those expected by the set top terminal 220 software program is made, the home menu 1010 is placed on the television screen. In addition, after a period of time if no selections are made from the introductory menu 1000, the program defaults to the home menu screen 1010.

Figure 14:
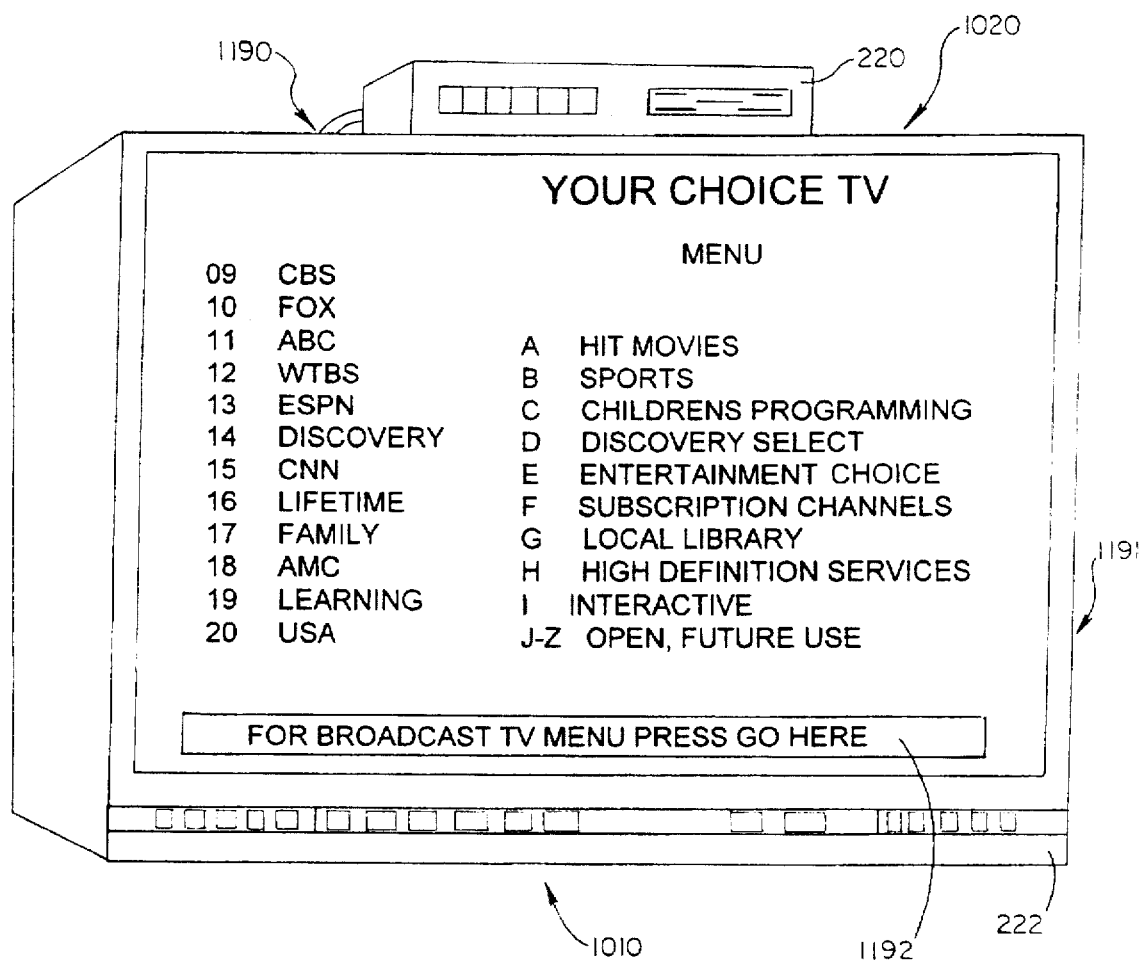
FIG. 14 depicts a home menu display screen.

FIG. 14 is an example of a home menu screen 1010 that may be used. This sample home menu 1010 employs multiple window techniques to make the menu user friendly and offers a significant number of choices. It is preferred that a channel line up 1190 and the major menu 1020 categories both appear on the home menu 1010 icons for selection by the subscriber. Various levels of subscription programing may be used, including a "Basic" cable package and a "Basic Plus" package. Each of the choices of subscription programming preferably is assigned a different color. This increases the user friendliness of the present invention.

Typically, the left half of the screen is used to list the channel number and network abbreviation of the most popularly watched networks as shown at 1190. The right half of the screen offers access to a variety of major menus 1020 listed by category names as shown at 1020.

A number of major menus 1020 may be utilized in conjunction with the home menu. By pressing the alphanumeric or icon key of the remote 900 corresponding to the category of programs the subscriber desires, the appropriate major menu 1020 is accessed. In addition, the subscriber may employ an on-screen cursor to select any option shown in the menu.

FIG. 14 also shows how additional major menus 1020 can be displayed on the home menu screen 1010. When there is no longer room available for additional major menu 1020 choices on the home screen, the subscriber may access a second screen of the home menu 1010. For example, in FIG. 14, if additional major menus 1020 "J-Z" 1191 existed, the subscriber would access those menus by highlighting and selecting the J-Z menu option (or press the J-Z key on the remote 900). After selecting J-Z, the second or extended home menu screen 1010 would appear on a subscriber's television. This menu would then list options J-Z separately by name. Theoretically, the home menu 1010 may have many extended home menu screens. However, any more than a few extended home menu screens would confuse the average subscriber.

The home menu 1010 may be modified to include additional features at the bottom of the television screen. For example, one option 1192 would allow a subscriber to access program selections that are available on broadcast television. Clearly, numerous variations are available for the home menu 1010.

Figure 15:
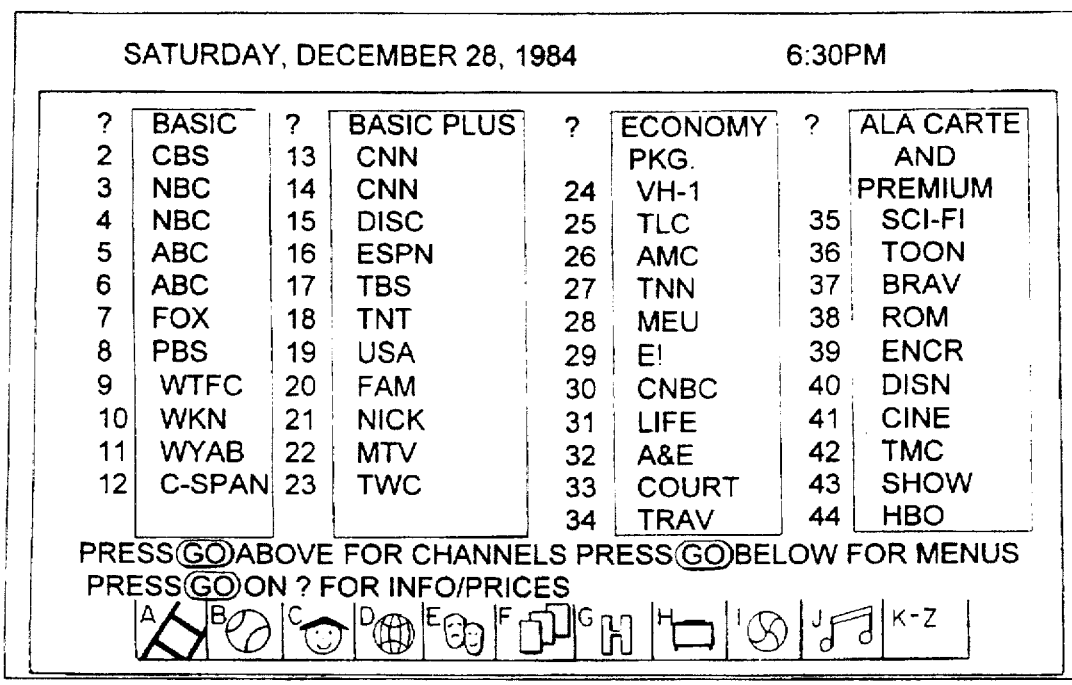
FIG. 15 depicts an alternative home menu screen.

FIG. 15 shows an alternate embodiment 1193 of the home menu 1010 (or the menu which would normally follow the introductory menu 1000) which can simply be the standard cable channel line-up. Offering the standard cable line-up on a separate menu may make selection easier for viewers with small television screens.

Figure 16:
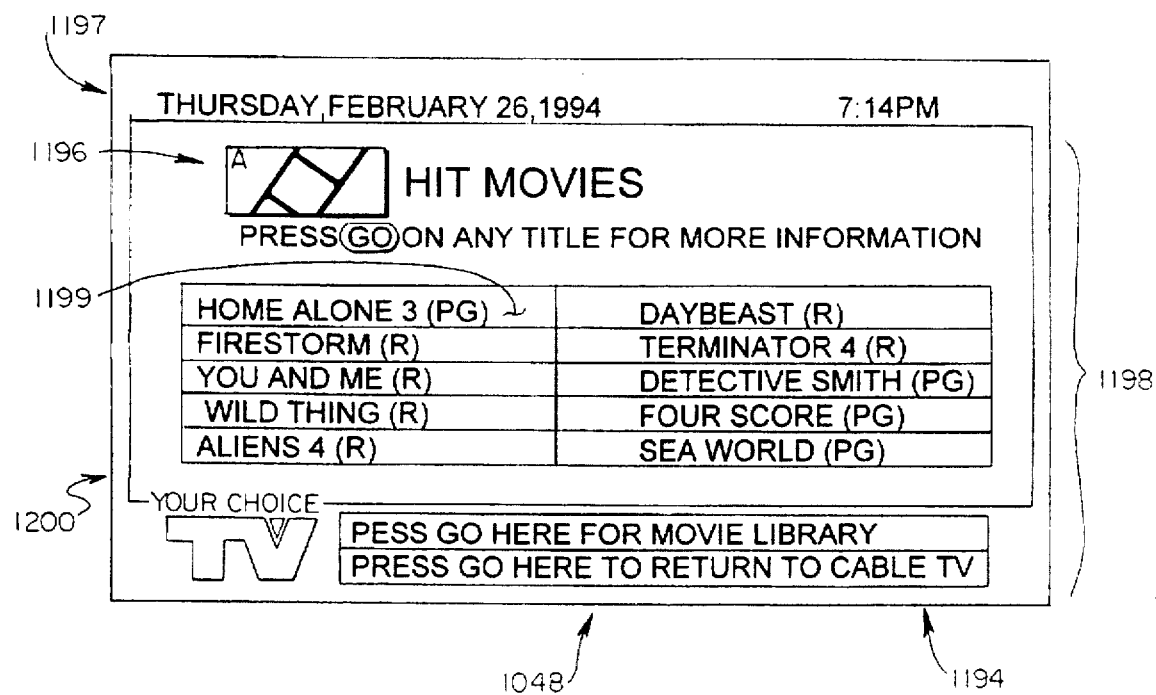
FIG. 16 depicts a major menu for the hit movies category.

FIGS. 16 is an example of a major menu 1020 for the movies categories depicted as 1042 and 1048 in FIGS. 9a and 9b, respectively. The hit movies category 1048 is a list of recently released movies which have been found to be popular among movie goers. This movie list is changed once or twice a week to keep in line with new movie releases. Again, multi-window and customized window techniques for example option instructions 1194 are utilized to make the menu as user friendly as possible.

In the preferred embodiment of the hit movies menu 1048, the hit movies menu icon 1196, along with the hit movies category letter A, are displayed. The current date and time are displayed at the top of the screen 1197 over a menu background. Ten movie selections, with their ratings 1199, are displayed in the center of the screen 1198, each in a box which may be highlighted when selected. In the lower part of the screen 1194, a logo window 1200 is available as well as other option choices, Movie Library and Return to Cable TV. If the subscriber desires further information on any particular movie, the subscriber may select a movie using the cursor movement buttons and press the "go" button.

In alternate embodiments (not shown), the "return to Cable TV" option may be changed to "return to the Home menu" 1010 (or return to other viewing choices). In addition, the left upper corner window displays current time and the right upper corner window displays a message, but the windows in the upper corners remain in substantially the same location from menu to menu. Also, the name of the menu and category generally will be at the top and center of the menu screen. To make the menus aesthetically pleasing, generally the instructions are given across the center of the screen and choices are provided in large legible type. Additionally, at the bottom of most menu screens, the subscriber is given the option of returning to regular TV or returning to the home menu 1010.

It is important in creating user friendly interfaces that the menus are consistent and follow a pattern. This consistency or pattern between the different menus provides a level of comfort to the subscriber when encountering new menus.

Other major menus may be directed to the types of subscription services available (e.g., basic service, basic plus, economy package, and ala carte and premium channels). Such menus may also provide promotional or advertising information, for example, the cost for the particular subscription service. These menus are grouped by using similar colors or shades of colors. For example, the basic subscription service is a light pink color. As the subscription services increase in terms of the number of channels available, the color shading may increase intensity correspondingly. Therefore, the premium subscription service (ala carte service) would have a dark red color, contrasting with the light pink color of the basic subscription service.

Figure 17:
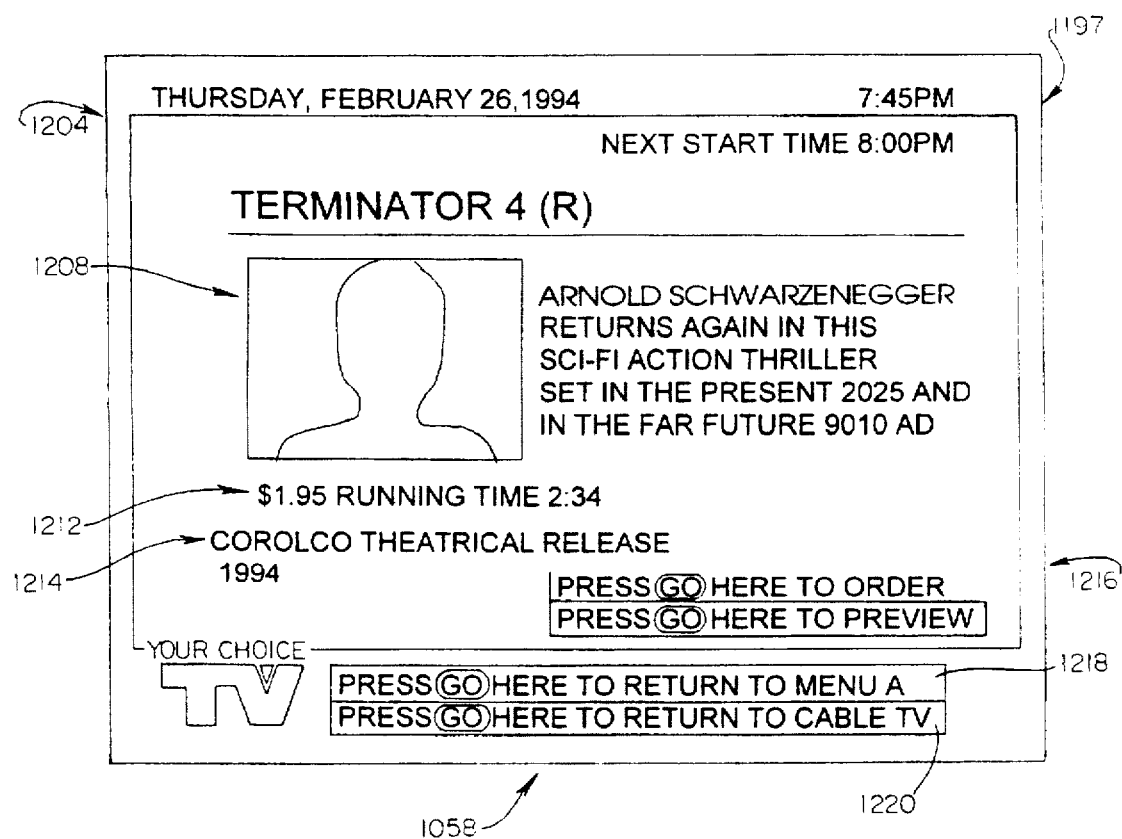
FIG. 17 depicts a hit movie description menu.
Figure 18:
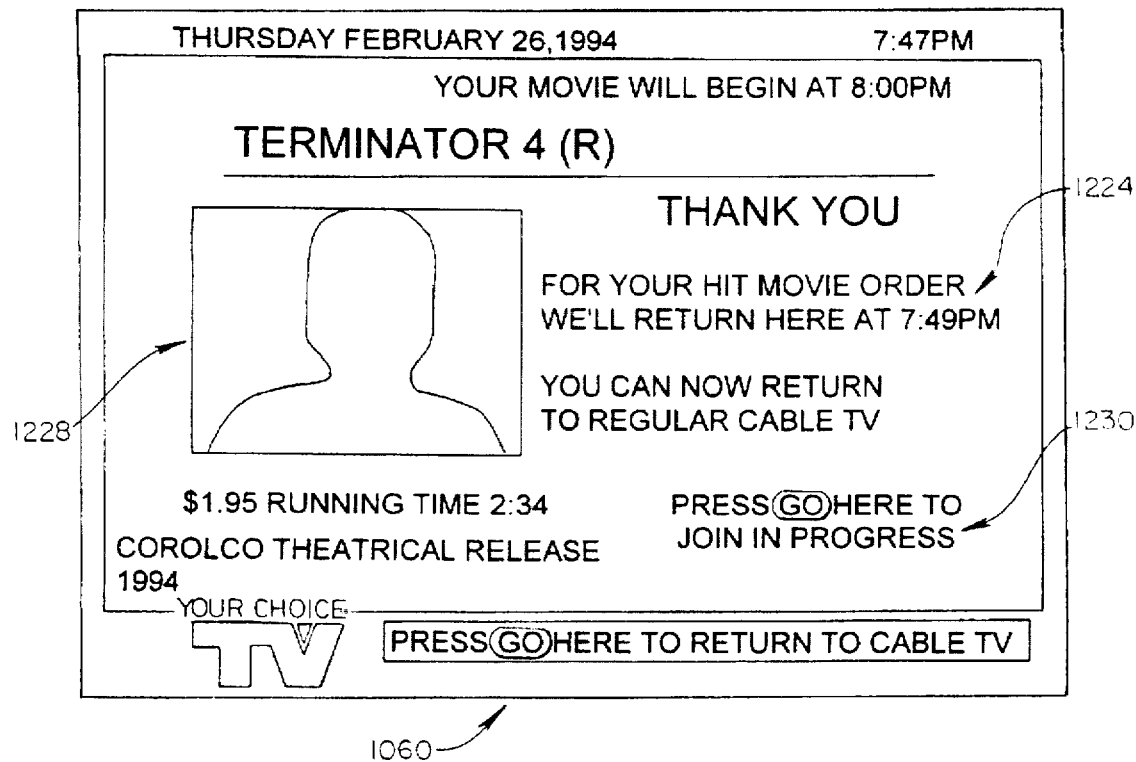
FIGS. 18 depicts a hit movie confirmation submenu.
Figure 19:
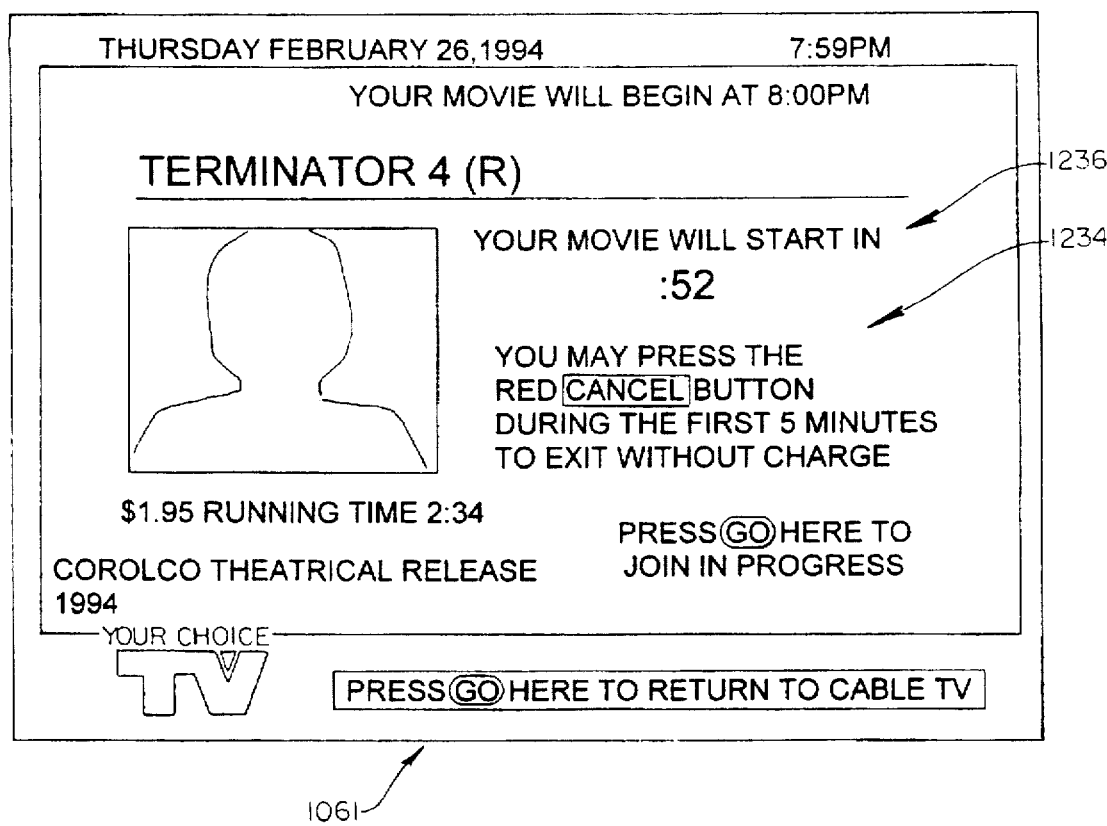
FIGS. 19 depicts a hit movie notification submenu.

In FIG. 17, the movie description submenu 1058 for the movie titled Terminator Four is shown, signifying that the subscriber may choose this program option from the hit movie major menu 1042. FIGS. 17–19 show submenus which would follow the selection of Terminator Four from the hit movie major menu 1058. In FIG. 17, the sash 1197 across the top of the screen remains constant from major menu 1020 to program description submenu 1058. For the comfort of the subscriber, the left upper window in an alternative embodiment can remain the same and show the current time. The upper right-hand corner contains a message stating the next start time for the movie selected.

In order to allow subscribers to view hit movies at their convenience, multiple start times for the same movie are provided. In order to provide the multiple start time service, the same movie must be shown on multiple channels at staggered start times. For example, if Terminator Four is a two-hour length movie it can be shown continuously on eight different channels, with each showing delayed fifteen minutes after the previous showing. This allows the subscriber to begin viewing the movie within a fifteen minute time interval. Since the subscriber is not required to find the channel which has the correct start time, the subscriber is unaware that the movie is being shown on eight different channels. In fact, with the use of the submenus, a subscriber is able to nearly effortlessly choose the correct channel and correct activation time for viewing the desired movie. The channel selection is invisible to the subscriber.

The set top terminal 220 is able to automatically determine which channel will next begin to show the selected movie using any number of techniques. For example, the set top terminal 220 has an internal clock representing the current time. The set top terminal 220 could compare the current time with the start times for the movie on the various channels. Alternatively, a signal could be sent with the movie on all channels. This signal will set, or reset, a counter to indicate that a particular channel will next begin the movie. Those skilled in the art will recognize that other methods to determine the next available start time and channel for the selected movie are available.

The FIG. 17 movie description submenu 1058 retains the title in a window 1204 generally at the top center of the screen. A multiple window technique is used in the middle of this menu to display a description of the movie and one or more video frames 1208 that assist the subscriber in selecting the movie. The video window 1208 provided by the menu may include a still picture, a short but repetitive video cut, or a portion of the movie that is currently showing on any one of the channels carrying the movie at the time of the submenu's display.

Just below the video window 1208, the submenu provides the cost of viewing the movie and the movie length in hours and minutes 1212. An additional strip window 1214 is provided, below the video and description windows 1208, 1212, informing the subscriber of the movie's release date.

Moving towards the bottom of the menu, the subscriber is given at least four options: (1) the ability to order the movie 1216, (2) preview the movie, (3) to return to the hit movie menu 1218, and (4) to press "go" and return to regular TV 1220.

FIG. 18 shows the next submenu 1060 in the hit movie menu sequence stemming from the selection of Terminator Four. This particular submenu 1060 shows confirmation 1224 of the subscriber's hit movie order of Terminator Four. The menu display retains the sash across both the top and bottom of the screen. An alternate form of the menu 1060 maintains the current time in the left upper window, the title in the top center window, and the next movie start time in the upper right-hand window.

In the center of the submenu screen 1060 is a video window 1228 which may be used for still or moving video. As indicated at 1230, the submenu provides the subscriber with two on-screen options, return to regular TV or join the movie Terminator Four already in progress. In an alternative embodiment of this submenu 1060, the user is given the ability to return directly to the home menu screen 1010 (FIG. 14).

When the movie's start time is approaching, the set top terminal 220 will automatically bring the viewer to the correct channel carrying the movie Terminator Four. However, FIG. 19 depicts a notification submenu 1061 informing the user that a program selection is about to begin (e.g., counting down until start time). Using this submenu 1061, the set top terminal 220 warns the subscriber prior to switching from the channel being viewed to a prior selected program channel. This notification submenu 1061 is provided to the subscriber approximately one or more minutes before the set top terminal 220 changes the viewing channel.

The notification submenu 1061 also allows the subscriber to cancel the movie order. In FIG. 19, the subscriber is notified in the center of the screen, generally at 1234, that the subscriber may be canceled within the first five minutes. Alternatively, the subscriber may press escape to cancel his order without charge. The notification submenu 1061 then informs the subscriber of the start time generally at the upper right portion 1236 of the screen.

An alternative notification submenu (not shown) would use a simple three-window menu. A strip window at the top of the screen would notify a subscriber of the movie selected and the amount of time before the movie will begin. A center window would display a scene from the movie, and at the bottom of the screen, the submenu would carry another strip menu which informs the user how to escape from the program selection without charge.

Using a notification submenu allows a subscriber to view other programs prior to the movie start time. The subscriber is amply notified of the start time of the program and is effortlessly moved to the correct channel to view the selected program. This notification-type submenu represented in FIG. 19 may be used to move a subscriber from the current channel to any preselected channel for viewing a program which has been ordered at an earlier time. In the preferred embodiment, the amount of time provided by the notification submenu 1061 and similar submenus may be customized by the subscriber to a preferred length. If a subscriber cancels or escapes, the set top terminal 220 will return to the channel currently being viewed.

Figure 20A:
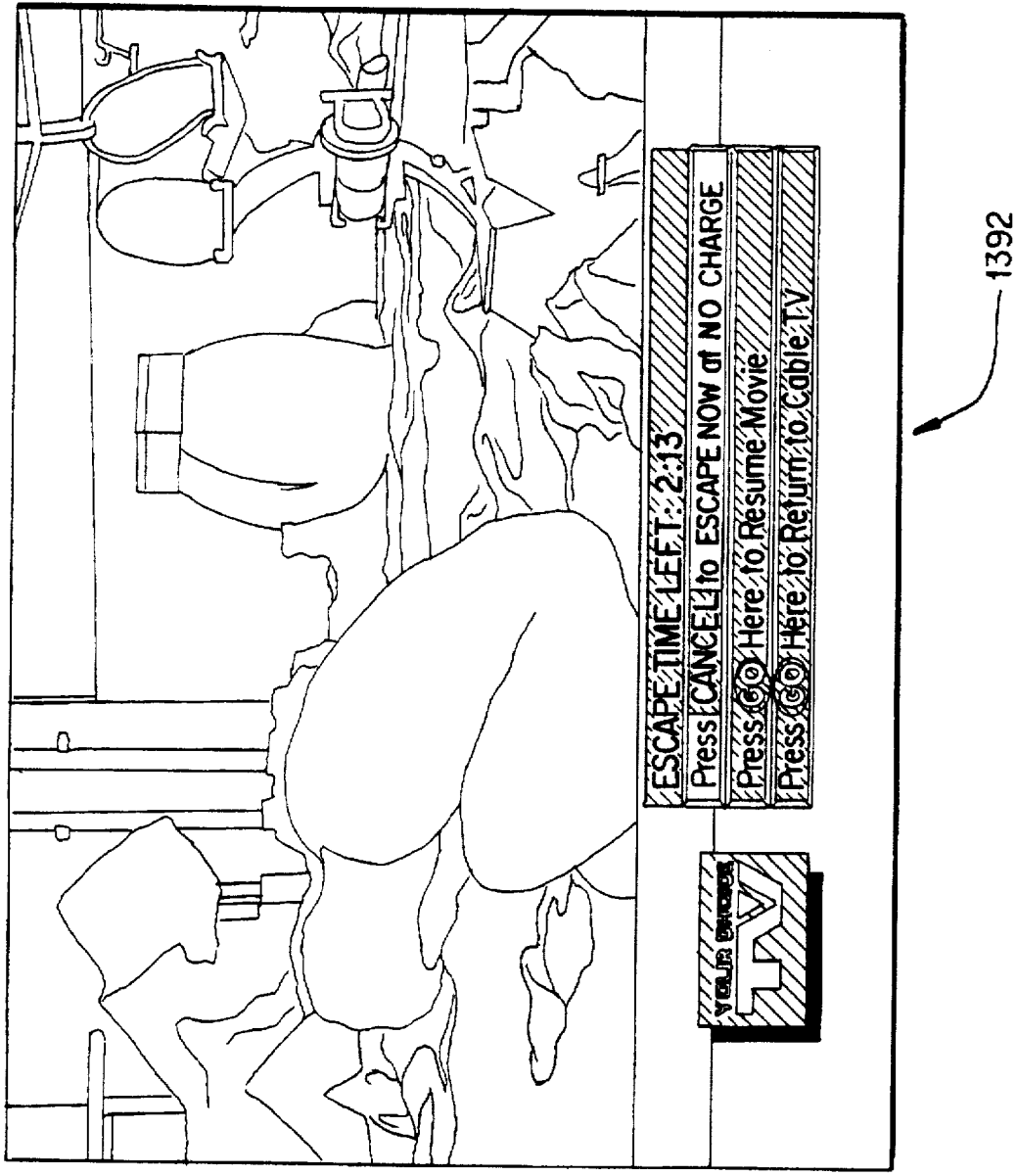
FIG. 20a is a drawing of a hit movie escape during program menu.

As shown in FIG. 20a, in the preferred embodiment, the subscriber is given a During Program Menu 1300, specifically, an escape overlay menu 1392 to inform the subscriber when the five minutes of movie escape time has expired. Once the time has expired, the subscriber will be billed for the movie selection.

Figure 20B:
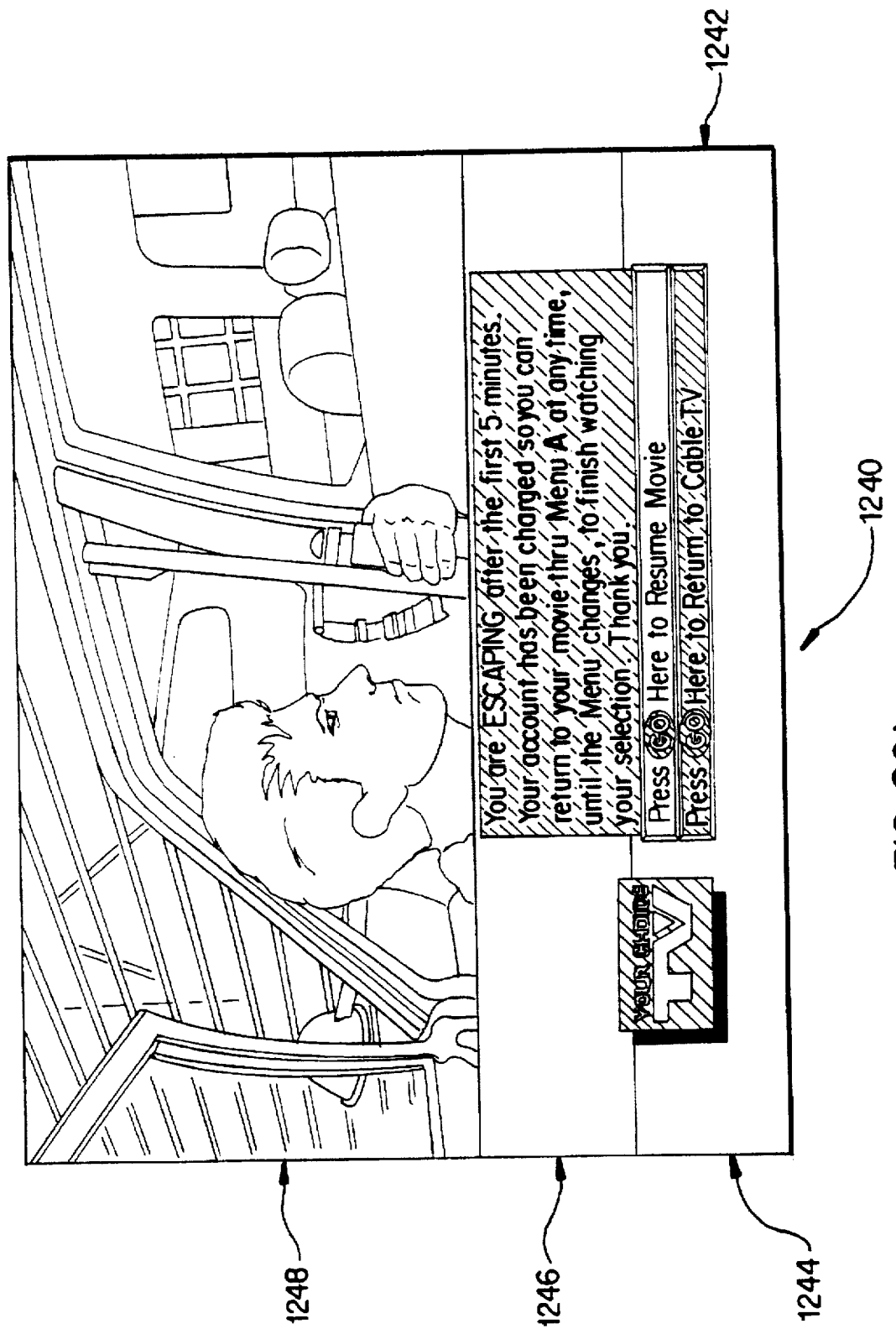
FIG. 20b is a drawing of a hit movie during program hidden menu.

FIG. 20b shows another overlay menu 1240 (part of the group of During Program Menus 1300) warning that the subscriber is escaping a program after being charged for the order of that program. The warning overlay menu 1240 of FIG. 20b follows in sequence and is prompted by a hidden menu 1393 (shown in FIG. 9a) which constantly monitors for subscriber input during viewing of the program. The hit movie hidden menu (not shown) specifically waits for certain key entries by the subscriber. In particular, the hit movie hidden menu awaits for a key stroke such as escape, cancel or an icon selection. If the escape button is depressed during the viewing of a hit movie the overlay menus of FIG. 20a and FIG. 20b will be shown. A strip menu 1242 in the lower sash 1244 of FIG. 20b allows the subscriber to resume full screen viewing of the hit movie.

FIG. 20b is a representative example of overlay menus 1390 (FIG. 9a). Typically, such menus 1390 have a dark lower background sash 1244 and a light colored informational sash 1246. The upper portion 1248 of the screen continues to display the video of the program selected.

Figure 20C:
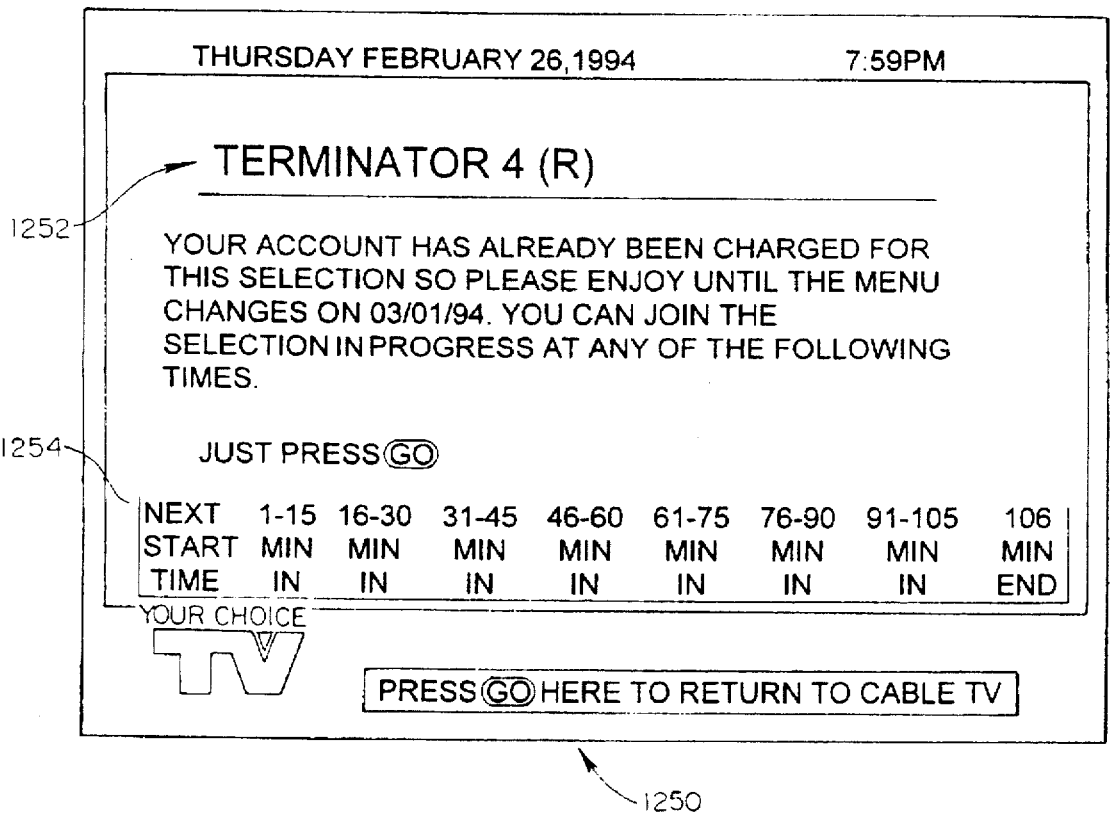
FIG. 20c is a drawing of a hit movie re-entry menu.

FIG. 20c depicts a representative reentry to ordered selection submenu 1250 for the hit movie category. The reentry to ordered selection submenus 1250 appear whenever a subscriber selects a programming option (program, event, or subscription channel), that the subscriber has already ordered. This menu has a program title window 1252 with a text title entry and a description of the order that has already been placed for the program (or channel). In the preferred embodiment, the submenus 1250 which allow reentry to ordered selection provide the subscriber with the added option of joining the program within any fifteen minute interval. This special feature of the preferred embodiment allows a subscriber who has viewed one-half of a particular program to rejoin the program at the half-way point. In this manner, the program delivery system mimics a VCR tape recording of the program. For example, if a subscriber had rented a videotape of the movie Terminator 4 and had watched thirty minutes of the movie, he would have left his videotape in the thirty minute position. With the menu 1250 of FIG. 20c, a subscriber to the system who has watched thirty minutes of Terminator 4 may reenter the movie at the thirty-one to forty-five minute interval. The nine blocks 1254 of fifteen minutes of the menu display are representative of the choices available for a two-hour hit movie. Other variations are possible depending on the length of the movie and the timing intervals desired.

Figure 21:
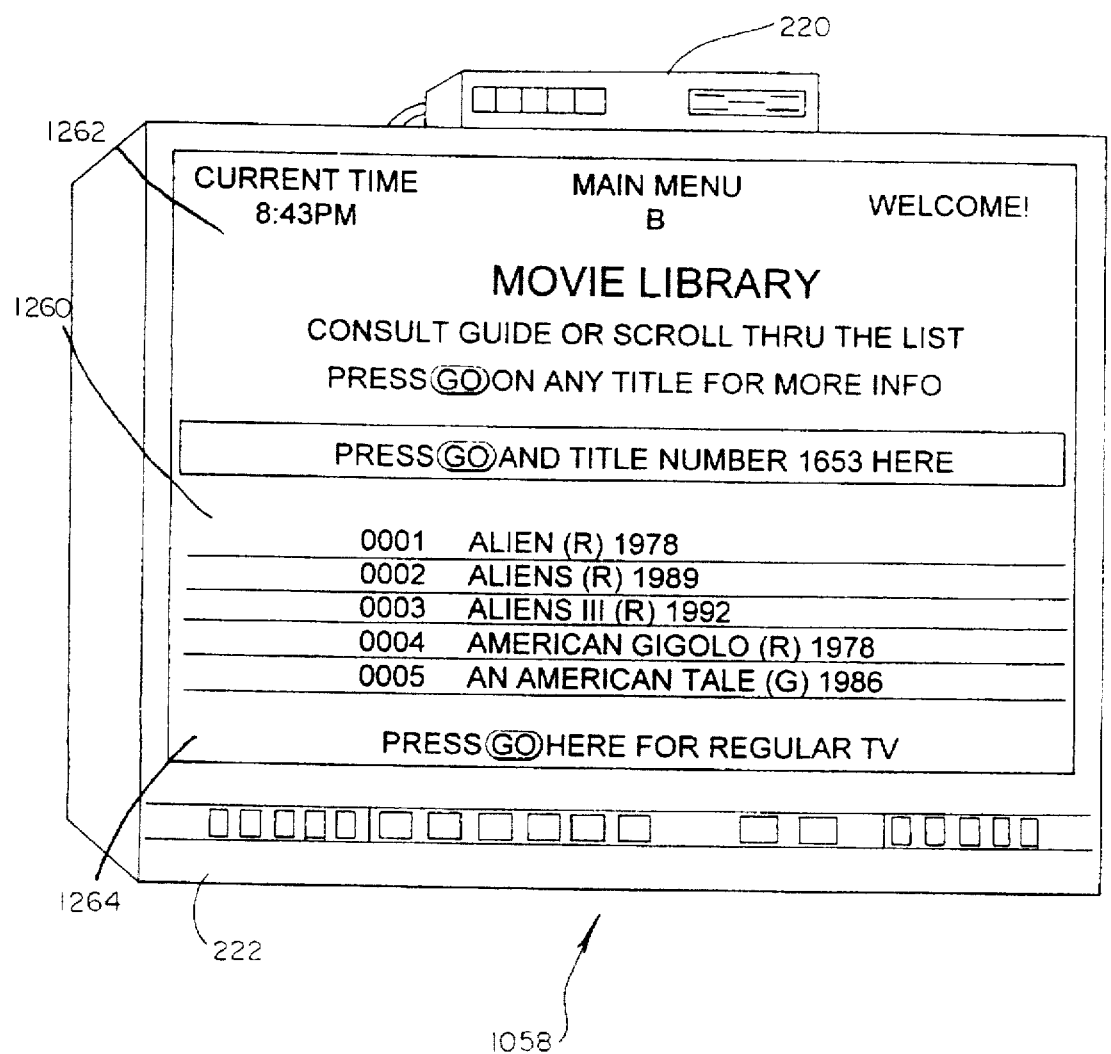
FIG. 21 is a drawing of a movie library major menu.

FIG. 21 shows the major menu for the movie library category 1048 (shown in FIG. 9b). The movie library category provides subscriber access to a large number of movies. Using several transmission channels, each movie in the library is shown at least once during a one-month period. Using the movie library, a subscriber may access information on a particular movie and ascertain the various start times for that movie.

The movie library major menu 1058 shown in FIG. 21 is an extended menu having many follow-on extensions to the major menu screen shown. The extended menus continue to show lists of movies in alphabetical order. In an alternative embodiment, the movie library is broken down into subcategories (not shown) of various types of movies. For instance, movie categories such as murder-mystery, documentaries, westerns, and science fiction would appear on the movie library major menu 1058. By selecting one of these movie library subcategories the subscriber would be moved onto a particular submenu for that movie library subcategory. Each submenu (not shown) would list movie titles whose contents fall within the particular subcategory.

With reference to FIG. 21b, following a selection of a movie title, the subscriber is displayed a movie description submenu 1058. In order to maintain a similar pattern throughout the menus, such movie description submenus 1058 are designed similarly to FIG. 18 (which depict movie description submenus for the hit movie menu 1042) and may include other information such as title numbers. Using the submenu 1058 the subscriber may order the movie described 1260, return to the movie library major menu 1262, or return to regular TV 1264.

Figure 22A:
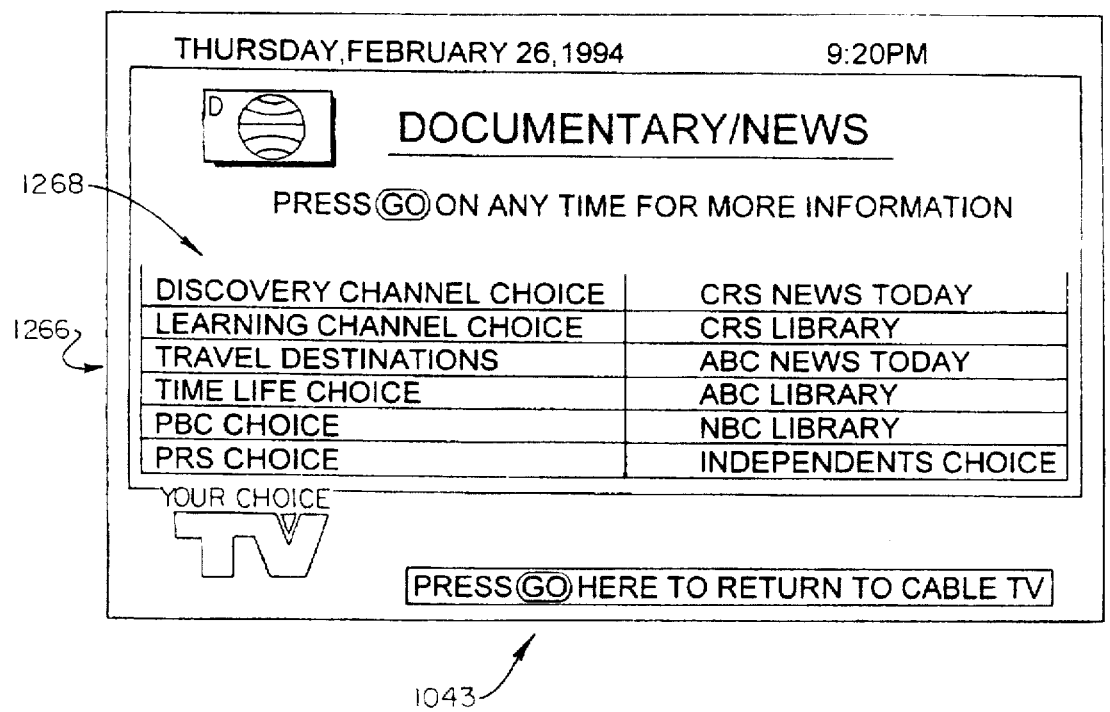
FIGS. 22a–22e depict a typical menu sequence of the present invention.
Figure 22B:
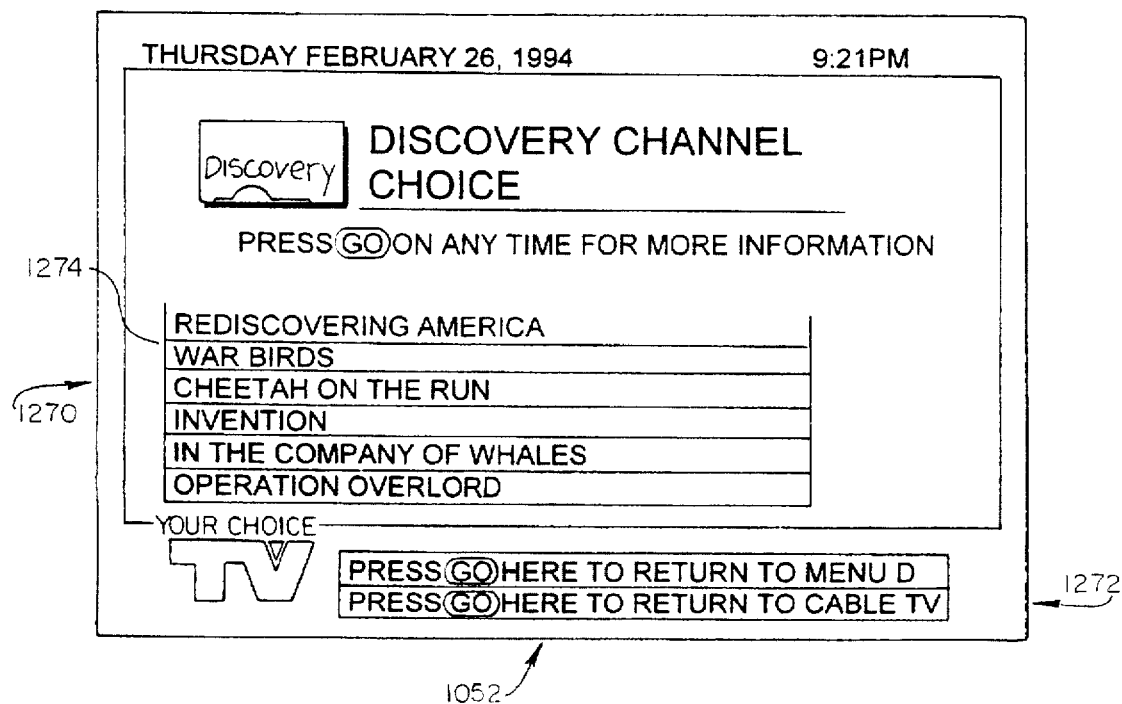
Figure 22C:
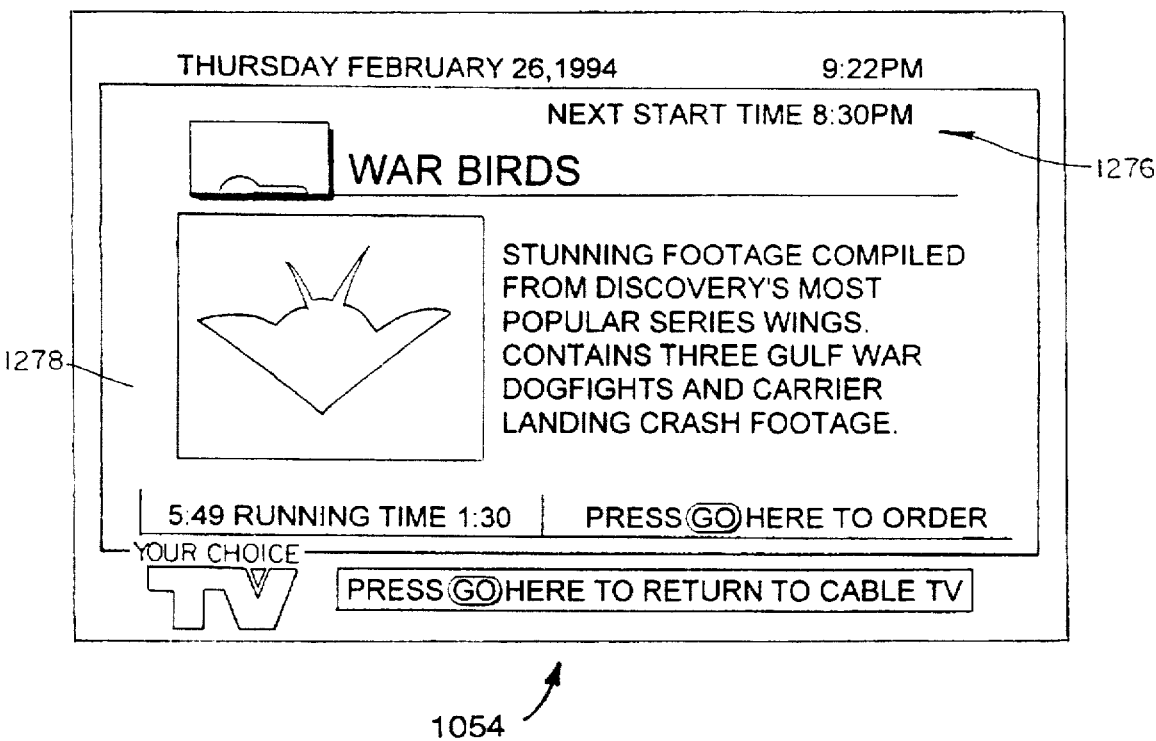
Figure 22D:
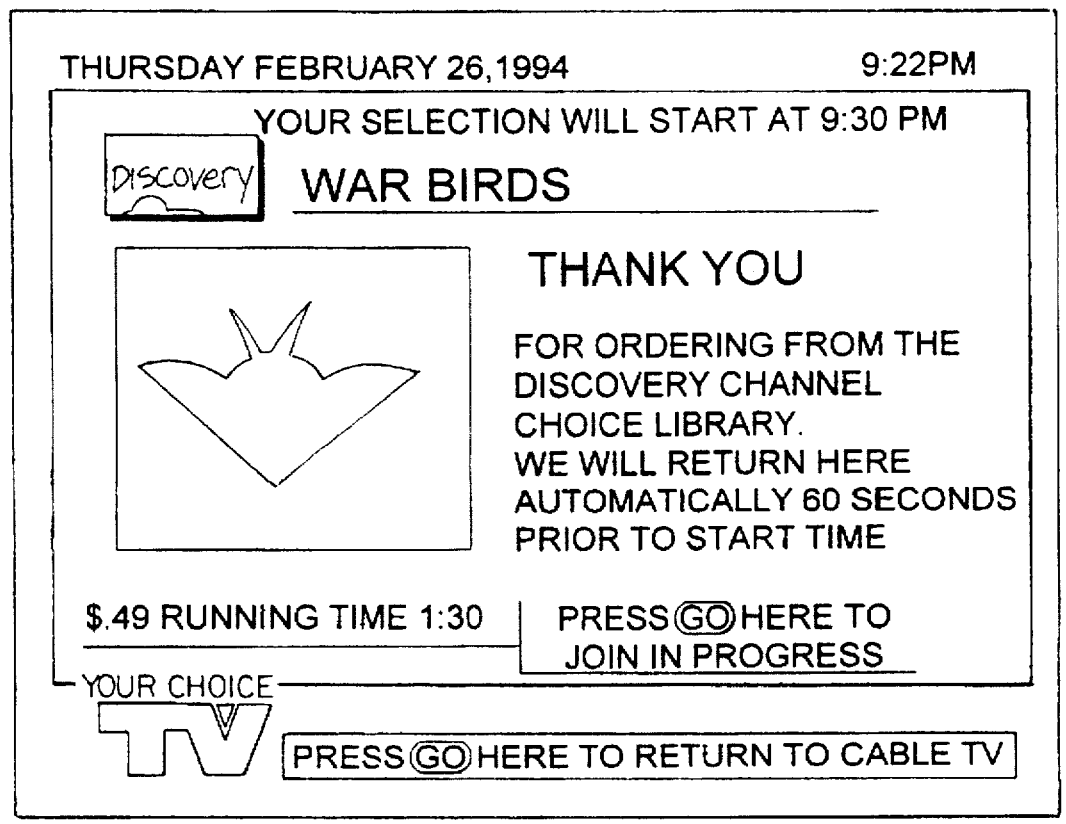

The series of FIGS. 22a–22d depict a typical menu sequence including a major menu 1043 (FIG. 22a), a subcategory submenu 1052 (FIG. 22b), a program description submenu 1054 (FIG. 22c), and a confirmation submenu 1056 (FIG. 22d). This simple progression of menus is represented generally and repeats itself through the menu tree of FIGS. 9a and 9b.

In the preferred embodiment, FIGS. 22a–22d are a series of menus which are categorized in the Documentary and News Major category. FIG. 22a, the Documentary and News major menu 1043 shows, at central region 1266, twelve different subcategories of services available to the subscriber. After selecting a subcategory from this major menu 1043, the set top terminal 220 moves the subscriber to a submenu describing programs that are available in the selected subcategory. For example, FIG. 22b is a submenu 1052 for subcategory Discovery Channel™ choice 1268, and shows six programming choices 1270 available for this subcategory. In an alternate embodiment, this submenu can display any number of program choices. By choosing one of the programming choices on this Discovery Channel™ choice submenu 1152, the subscriber may obtain more information about the particular program. In FIG. 22b, the subscriber has highlighted and selected the program War Birds 1274 for further description.

FIG. 22c is a program description submenu 1054 which describes an available program. War Birds. FIG. 22c uses the upper right-hand corner window 1276 to inform the subscriber of the next start time available for the particular program War Birds. In packaging the special selection of programs, the programmer at his option may show an identical program on several channels in order to permit the subscriber greater flexibility in start times. FIG. 22c shows the use of a strip menu 1278 across the lower half of the screen displaying a message and the price of the program. Similar to other submenus, the subscriber may order the program, return to the major menu 1043, or return to regular TV simply by selecting the choices on the lower part 1278 of his screen. FIG. 22c depicts the subscriber ordering the program War Birds.

FIG. 22d is a confirmation submenu 1056 generally similar to confirmation submenus in other major menu categories. It confirms the subscriber's order of the program War Birds. This confirmation submenu retains the video window 1276 from the prior submenus and also displays the program running time. An alternative submenu may show a strip window (not shown) on the lower part of the screen displaying an "800" number and advertising the Discovery™ catalog. Similar windows may be used throughout submenus to assist in advertising for particular programs, channels, or groups of programs. Many variations of the confirmation submenu 1056 are possible, including allowing the user to join the selected program already in progress or return to regular TV. In addition, by depressing the escape button, the subscriber may cancel his order of War Birds from this screen.

Figure 22E:
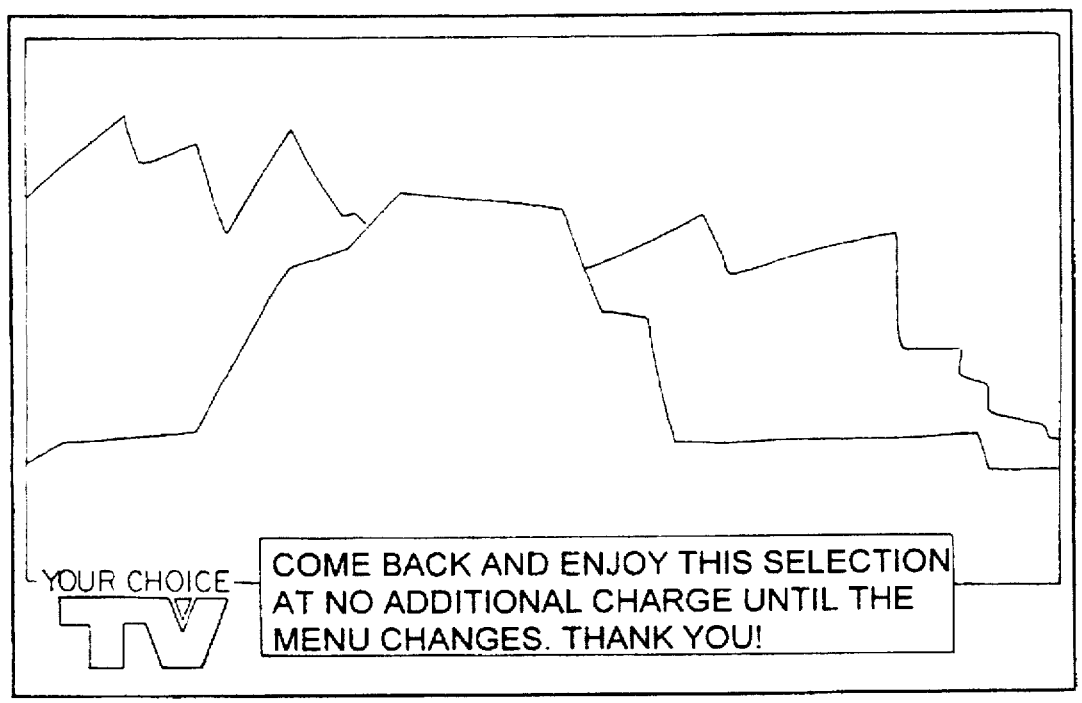

FIG. 22e is an example of an overlay menu 1392 presented when a subscriber is exiting from a program selection in which he may rejoin at a later time. This exiting ordered program overlay menu (as shown at 1392 in FIG. 9a) is appropriate whenever a subscriber may return to a program or channel without additional charges. Since many of the program selections are authorized for viewing on a two-day, weekly, or monthly basis, the exiting ordered program overlay 1392 is useful in a number of situations.

This overlay menu 1392 follows a similar format as other overlay menus 1390 having a darker colored lower sash and lighter colored second sash with text information. The sashes are overlayed on the program video currently being watched by the subscriber.

Additionally, an exiting ordered program overlay menu 1392 may be provided for one-time viewing program selections to which a viewer cannot return. These exiting ordered program overlay menus 1392 would thank the viewer for ordering the particular program or channel and entice the viewer to order a similar program from the same network. For example, an exiting program overlay menu 1392 for a live sports event such as boxing, would thank the viewer and remind him that the network carries regularly scheduled boxing events on a weekly basis.

Figure 23:
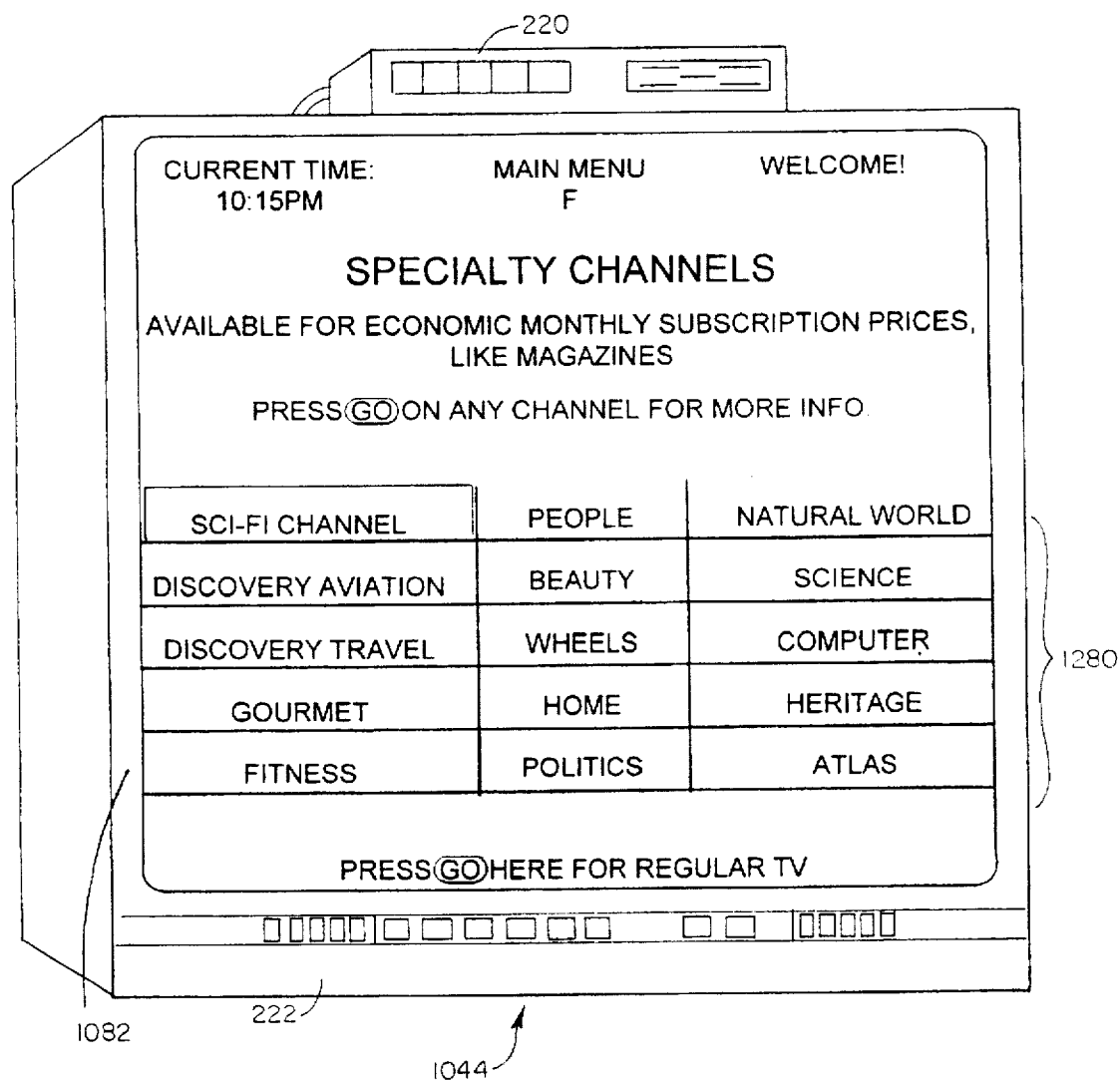
FIGS. 23 and 24 depict a specialty channel major menu and a related submenu.
Figure 24:

FIGS. 23 and 24 relate to the ordering of specialty channels through the menu driven system. FIG. 23 is a major menu 1044 that lists fifteen specialty channels 1280 that are available for subscription and viewing. In this particular major menu 1044, the lower half of the screen 1282, which is utilized to provide the various programming choices, is divided into three vertical sections allowing room for fifteen choices. This major menu category 1044 is different from the others in that individual programs are not ordered but instead channels are subscribed to on a monthly or yearly basis. To use this submenu, a subscriber need only select and press "go" on the channel of his choice.

After the subscriber selects a channel, as shown in FIG. 22c, a channel description submenu 1054 replaces the major menu on the subscriber's television screen. This description submenu 1054 has windows that are similar to other description submenus used throughout the menu driven system. In the description submenus 1054, the upper right-hand corner is used to display the subscription cost for the channel and the upper left-hand corner is used to display the method in which the subscription price will be billed to the subscriber. In this specific scenario, the current time has little bearing on the subscriber's decision to order the displayed channel and therefore is not shown on the television screen.

Another submenu 1056 (FIG. 22d), similar to confirmation menus discussed earlier, confirms the subscriber's order and thanks the subscriber for ordering the specialty channel. If the subscriber is already paying for the selected channel, instead of confirming the order, the subscriber is provided with the divided menu 1056 of FIG. 22d, informing the subscriber of a current subscription to the Science Fiction channel. In the screen of FIG. 22d, the subscriber is allowed to join the channel in progress. After an ample period of time for the subscriber to read the screen submenu, the submenu 1056 is removed from the television screen and the subscriber has a complete view of the programming in progress.

Figure 25:
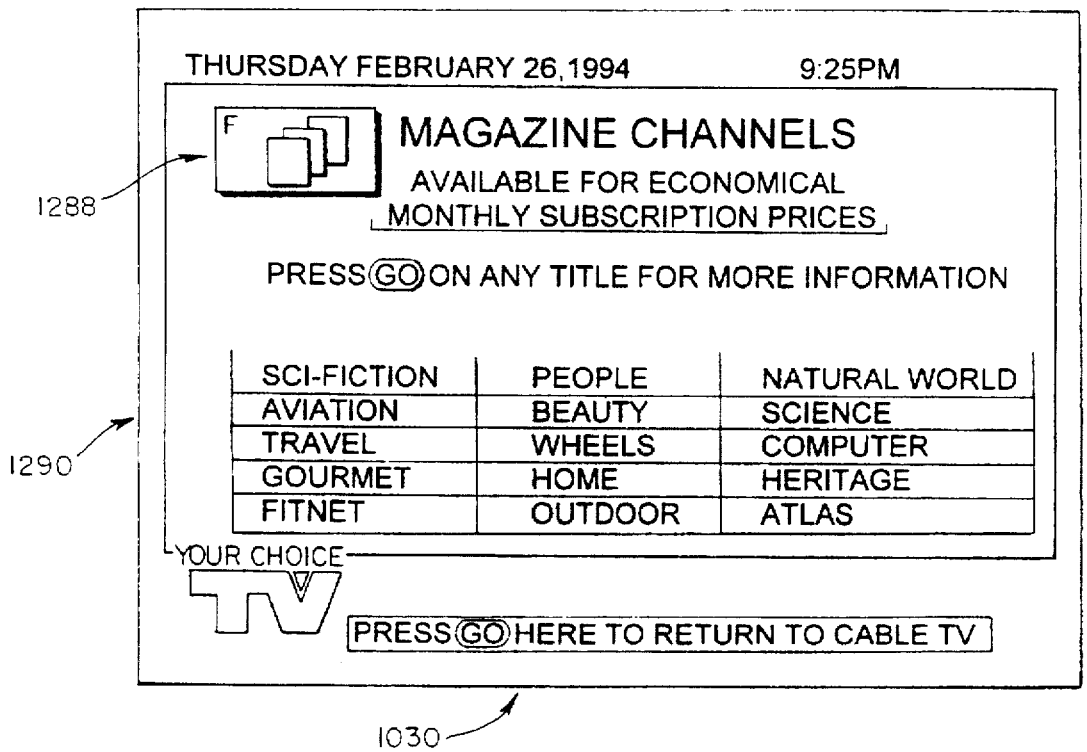
FIG. 25 is a drawing of a magazine channel major menu.

FIG. 25 shows a major menu for magazine channels 1030. This major menu falls under the letter F, Major Menu, and has an icon 1288 showing three magazines. The magazine channel major menu has a menu display block 1290 with 15 options, three columns, each with five selection options. Magazine channels are specialty channels targeted to a particular audience. In the preferred embodiment, each of the magazine channels has a monthly subscription. FIG. 25 shows the science fiction magazine highlighted.

Upon selection of the science fiction magazine, a channel description submenu similar to a program description menu (shown in FIG. 26) is displayed. This type of submenu has a network logo in the upper left hand part of the screen generated from the logo graphics file 820 (FIG. 27a). The name of the channel is prominently displayed across the top. In the preferred embodiment, the text for a channel or network name is stored in long-term text storage. The text description of the channel on the right part of the screen may also be stored in long-term text storage. A video window and a video description window is provided.

If the subscriber orders a science-fiction channel, the subscriber will receive a confirmation menu 1056 somewhat similar to the menu shown in FIG. 22d. This is a representative confirmation menu for subscribing to any network channel. A lower sash of approximately equal width to an upper sash of the background menu is displayed in a color preferably different than that of the upper sash. Within the confirmation sash, a network logo and a standard text description thanking the subscriber will be placed on the screen. At any time during this menu screen, the subscriber may cancel his subscription to the channel by pressing cancel on his remote 900.

In the preferred embodiment of the confirmation submenu, the area of the screen below the two sashes is filled with video from the channel being subscribed instead of text.

A reentry to an ordered subscription may be accomplished through another submenu 1055. Typically, a light colored second sash may be provided at the top of the screen with the network logo and text informing the subscriber that he has already ordered this particular channel. The reentry submenus 1055 generally allow a subscriber to immediately join programming in process. The current program on the channel chosen is shown in most of the remaining portion of the screen. Typically, a special title sash is included as an overlay in the lower portion of the screen. This sash identifies the current program being shown on the channel with a text description. The set top terminal 220 may derive this text description from either the STTCIS, the VBI, or other digital signals.

Figure 26:
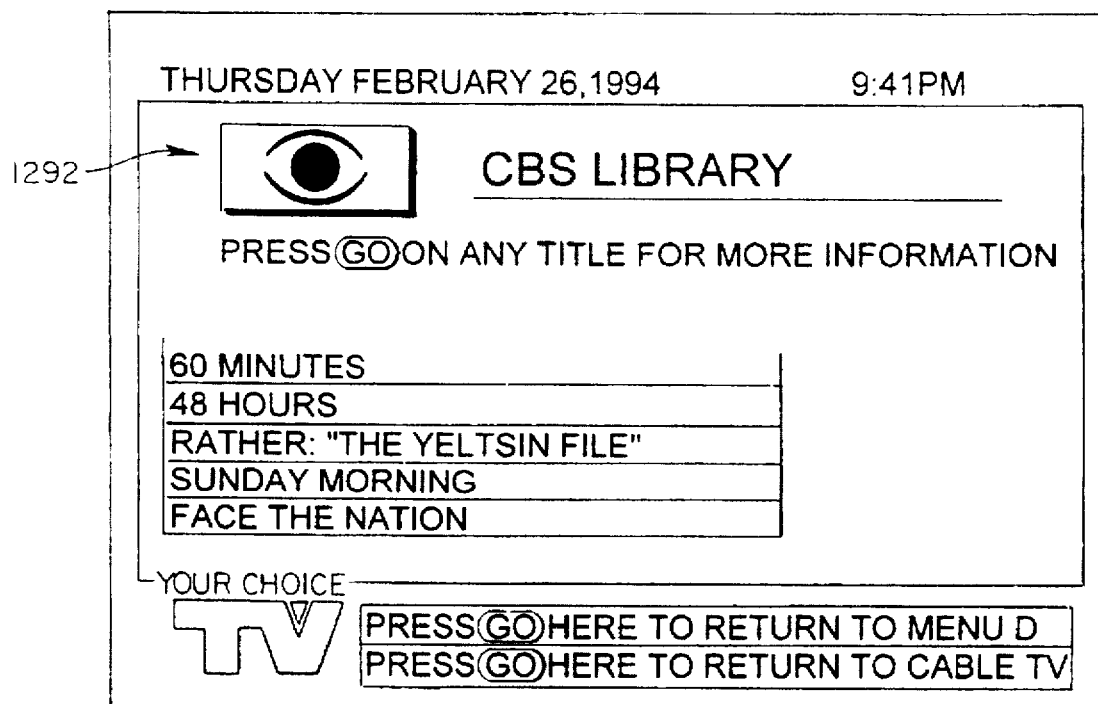
FIG. 26 is a drawing of a documentary/news subcategory menu.

Referring to FIG. 26, another similar series of menus may be displayed in selecting the documentary news program from the CBS library, called 60 Minutes. Although this is a regularly scheduled weekly program, it may be viewed by subscribers to the present invention at nonscheduled times. A major menu 1028 for documentary and news programs, as shown in FIG. 22a, is initially displayed.

FIG. 26 shows a subcategory submenu 1050 for Documentary and News displaying five options. This subcategory menu 1050 shows specific programs which are available. The cursor highlight overlay is at the top of the screen in its default position. From this cursor position, the subscriber may order the program 60 Minutes.

Another program description submenu 1292 displays the network logo, program title, program description, video window, video description window, and the next program start time. In the preferred embodiment, the next program start time is displayed beneath the current time. The program title and program description text may be stored in the intermediary text storage. In the preferred embodiment, the video description window would display running time and price of program. If the subscriber orders the program from the program description menu, he is sequenced to a confirmation menu 1056, shown in FIG. 22d), which, as usual, thanks the subscriber for ordering the program. In alternate embodiments, the confirmation text is a standard text being generated from long-term text storage. Confirmation submenus may be designed to show the user more video and less menu graphics and text.

11. Creation of Menus a. Menu Storage

In the preferred embodiment, the basic building blocks or templates of the on-screen menu displays will be stored in graphics memory consisting of nonvolatile RAM, ROM, EPROM, or preferably, EEPROM, shown as 620 in FIG. 27a. Referring back to FIG. 5a, with the information from this graphics memory 620, the microprocessor 602, graphics decompressor 622, text generator (if necessary), and video combiner 624 will build a menu screen. The memory files of the graphics memory or EEPROM 620 are preferably categorized into three categories, background graphics 800, logo graphics 820, and menu and display graphics 850.

The background graphics file 800 stores menu backgrounds such as: universal main menu backgrounds 804, universal submenu backgrounds 808, promo backgrounds 812 and custom menu formats 816. The logo graphics file 820 stores any necessary logos such as: Your Choice TV logos 824, Network logo files 828, cable system logo files 832, studio logo files 836, and graphic elements file 840. A menu display and cursor graphics file 850 stores menu display blocks 854 and cursor highlight overlays 858, as well as any other miscellaneous files needed to build the menus.

Using this method of storing menus, the menus can be changed by reprogramming the graphics memory 620 of the set top terminal 220. Picture files are sent using the program control information signal. These picture files contain the graphic information stored in the graphics memory. To revise the entire design of displayed menus, the network controller 214 or operations center 202 instructs the EEPROM 620 to be erased and reprogrammed with new menu templates (new picture files). To change one menu format or logo, the network controller 214 or operations center 202 instructs just the one location in memory to be erased and rewritten (one picture file). Obviously, this menu reprogramming can be done locally at the set top terminal 220. Reprogramming is described in detail in co-pending patent application, Ser. No. 08/160,281, entitled, REPROGRAMMABLE TERMINAL FOR SUGGESTING PROGRAMS OFFERED ON A TELEVISION PROGRAM DELIVERY SYSTEM, filed Dec. 2, 1993, by the same assignee and incorporated herein by reference.

With continued reference to FIG. 27a each identified memory subfile is further divided into various memory blocks. For example, the background graphics file 800 contains the universal main menu backgrounds 804 which include memory units UM1 860, UM2 862 and UM3 863. Similarly, the logo graphics file 820 and menu display and curser graphics file 850 further contain within subfile individual memory blocks (for example, studio logo file 836 has memory block SL1 864; menu display blocks 854 has memory menu display block MD1 861).

FIG. 27b shows the hierarchical storage of text transmitted from the cable headend 208 as STTSCIS. Although text may be continuously transmitted with the video signals to set top terminals 220, text may also be transmitted intermittently. In such a case, the text is stored in the set top terminal 220. Preferably, the text is transmitted and stored in a compressed format using known techniques. Additionally, the text is preferably stored in graphic memory 620 within set top terminal 220.

Depending upon the use of the text, it will be stored in one of three portions of memory. Information sent with the text will either direct the text to a particular portion of memory, or include information as to the priority of text. The microprocessor 602 may then direct the text to the appropriate memory location for storage.

If the text is to be used frequently and over a long period of time, a long term storage 875 will be used. If the text will be used for a shorter period of time (for example, a month), the text will be directed to an intermediate storage area 877. If the text is to be used almost immediately, or for a short period of time (for example, within a few days) the text is directed to a short term storage area 879. The microprocessor 602 locates the appropriate text required for a particular menu (see generally Table 1) and retrieves it from the appropriate portion of memory 620. The text is output from the graphics memory 620 to the text generator 623. Text generated from the text generator 623 is thereafter directed to text/graphics video combiner 624.

FIG. 27c shows the steps performed by the microprocessor 602 for creating a menu based upon a series of overlay screens. These instructions are stored in memory within the set top terminal 220 in a screens data file. The screens data file instructs the microprocessor on the location of each graphics file on the screen. An example screens data file is shown in Table 1. As shown in Table 1, the screens data file specifies menu data positioning in terms of, for example, x and y pixel positions, height and width, color codes and fonts. Alternatively, instructions or routines may be transmitted from the operations center 202 to be stored in memory within the individual set top terminals 220.

TABLE 1

| ~The following data lines are for the main menu | | | | | | | | | | | | |
|---|---|---|---|---|---|---|---|---|---|---|---|---|
| ~ | | Screen Type | | | | Template File | | Description | | | | |
| SCREEN | | '@MAIN | | | | 'main menu.pcx | | 'Main Menu | | | | |
| ~ | Justify | X | Y | Ht | Wd | FColor | BColor | Font | | | | |
| STR POS | 'Left | '165 | '85 | '30 | '300 | '27 | '55 | FUTUR14.GFT | | | | |
| STRING 'MAIN MENU | | | | | | | | | | | | |
| ~ | Justify | X | | Y | | | Hght | | Wdt | | | |
| PCX POS | 'LEFT | '190 | | '75 | | | '200 | | '200 | | | |
| PCX example.pcs | | | | | | | | | | | | |
| ~ | Justify | X | Y | Ht | Wd | FColor | BColor | Font | X | Y | Ht | Wd |
| ITEM POS | 'Left | '120 | '100 | '20 | '400 | '15 | '25 | FUTUR12.GFT | '110 | '90 | '30 | '420 |
| ITEM '@YCTV' YOUR CHOICE TV | | | | | | | | | | | | |
| ~ | Justify | X | Y | Ht | Wd | FColor | BColor | Font | X | Y | Ht | Wd |
| ITEM POS | 'Left | '120 | '200 | '20 | '400 | '15 | '25 | FUTUR12.GFT | '110 | '190 | '30 | '420 |
| ITEM '@PPV'PAY-PER-VIEW HIT MOVIES | | | | | | | | | | | | |

Initially, as shown at block 878, the microprocessor 602 instructs the tuner 603 to select a channel. The channel is decompressed, and error corrected and decrypted, if necessary. If the video is to be reduced in size, so as to be placed within a video window 1556 (described herein later), or is a split screen video window which must be enlarged, the video is scaled to the appropriate size. Additionally, the video may be required to be redirected to a portion of the television screen. This is done by creating a series of offsets for each pixel location of the video.

Graphics must also be used to create a menu in most instances. As is shown in block 882, the microprocessor 602 must fetch a background file, fetch a logo file and fetch a menu display and cursor (file in most instances). Each of these files must be decompressed 883. Following decompression, the file is combined 886.

Similarly, the microprocessor 602 fetches text (as shown in block 884). Depending upon the memory location of the text, the microprocessor 602 will fetch the text from long-term, intermediate-term, or short-term storage, 875, 877, 879, respectively, as described above. (Alternatively, text may be stored in the screens data file.) Based upon this memory retrieval, the text is generated and combined 886. At the combine step 886, the video (if any) is combined with as many screens of decompressed graphics as necessary, along with any text. The image or portions of each image are stored until all overlays are received. Thereafter, the entire image is sent, under the direction of another routine, to be displayed on the television screen (as represented by display block 888).

b. Menu Graphics

Figure 28A:
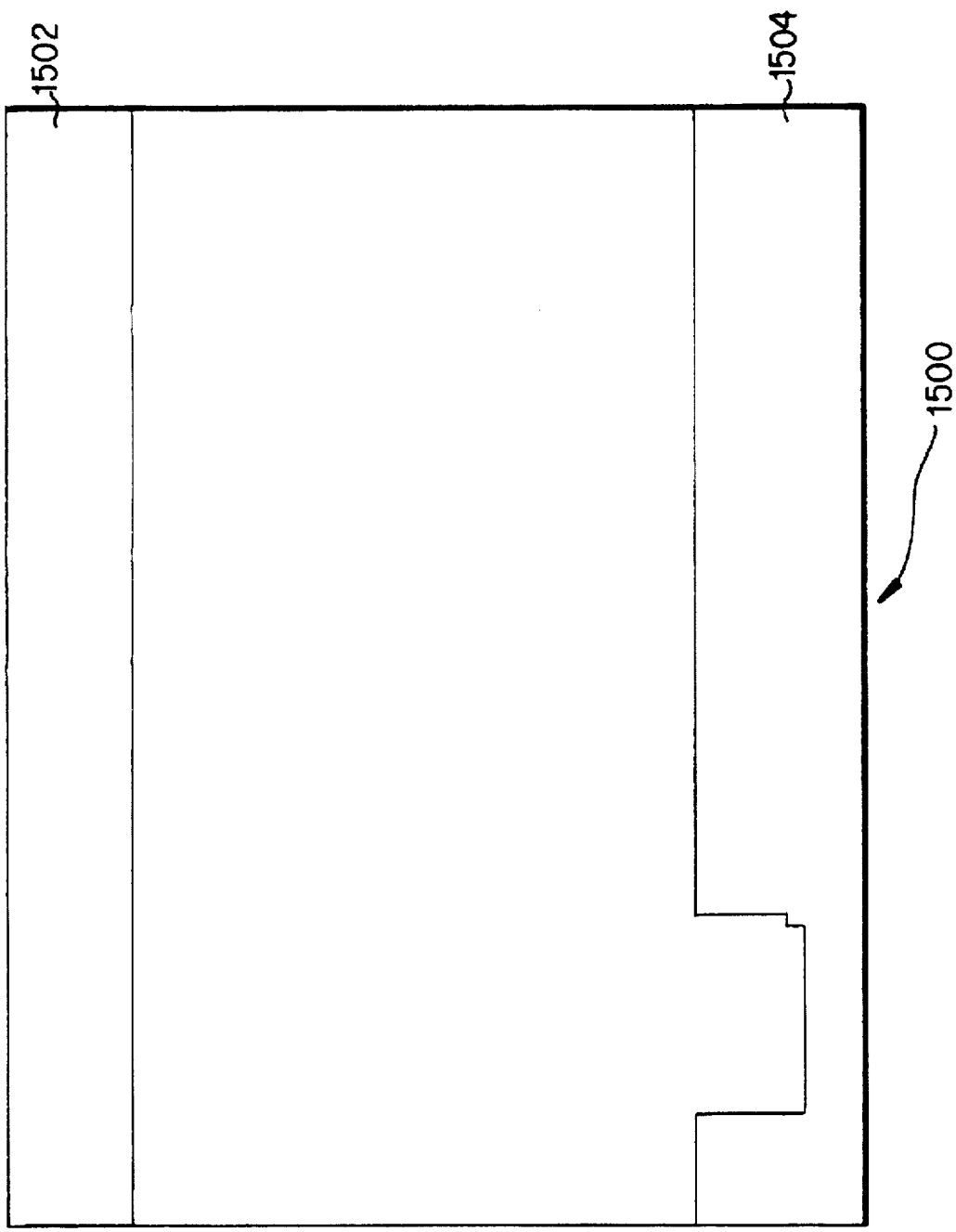
FIGS. 28a–g and 29a–g show how menus are generated by the set top terminal.
Figure 28B:
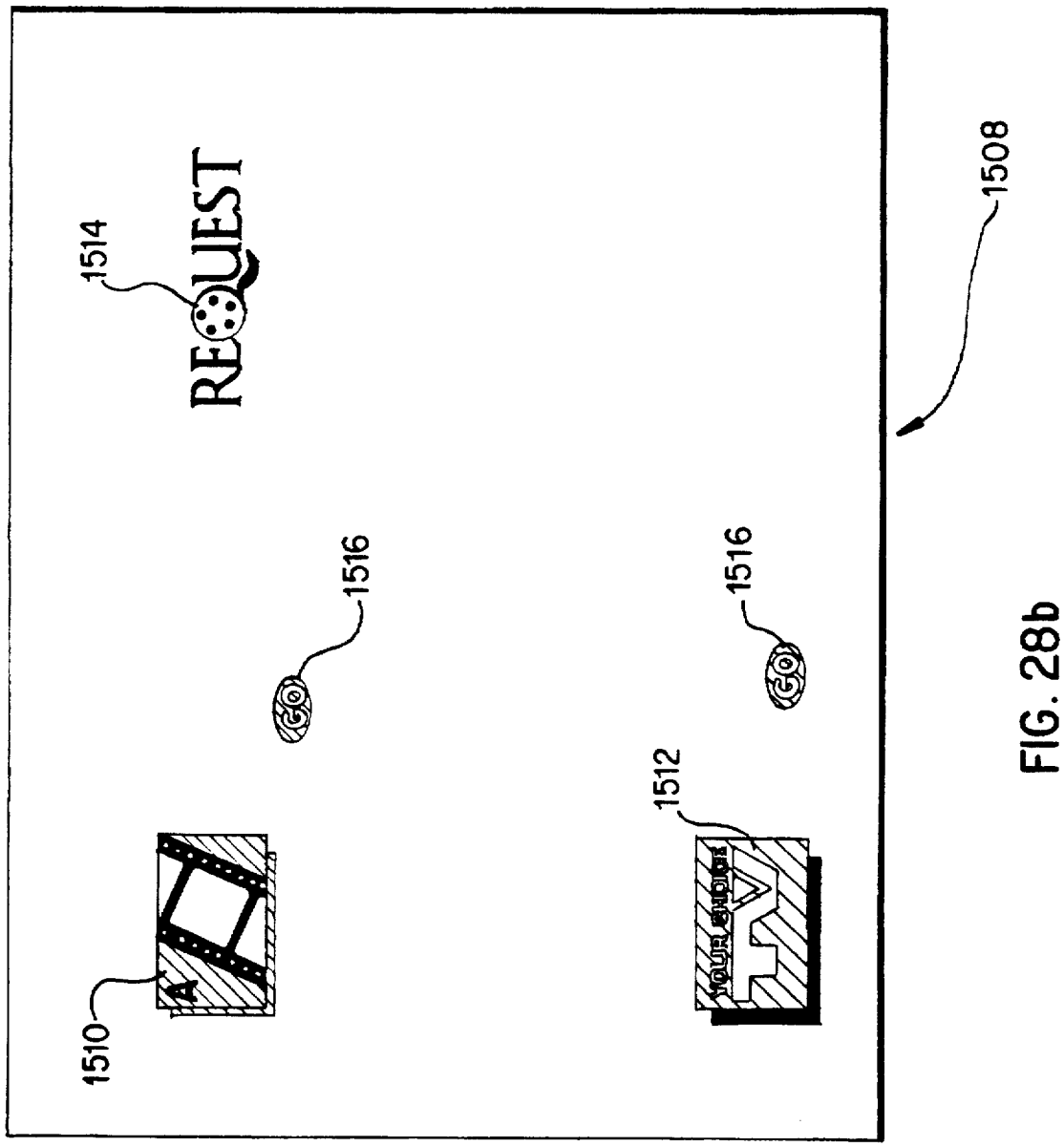

FIGS. 28a through 28g and FIGS. 29a through 29g, demonstrate how menus are generated by the set top terminal 220. FIGS. 28a through 28g display the building of a major menu screen for the category hit movies. FIG. 28a shows the background graphics for the hit movie major menu. The background graphics 1500 comprise an upper sash 1502 across the top of the screen and a lower sash 1504 across the bottom of the screen. The background graphics are generated from the background graphics file 800 in the memory files of the graphics memory (preferably EEPROM) 620. In particular, the hit movie major menu background graphics are located in the universal main menu backgrounds subfile 804 of the background graphics file 800. This universal major menu background graphic 1500 is consistently used in nearly all the major menus. FIG. 28b shows the logo graphics for the hit movie major menu. The logo graphics 1508 for this major menu consist of an icon window 1510, a cable company logo 1512 in the lower left-hand portion of the screen, a channel company logo 1514 in the upper right-hand part of the screen and two "go" buttons 1516. The icon graphics 1510 are consistently shown in each of the major menus. The cable company logo 1512 is consistently shown in the lower left-hand part of the screen in nearly every major menu. These logo graphics 1508 are created from the logo graphics file 820 (FIG. 29a) in the EEPROM 620. In particular, the cable company logo 1512 in the lower left-hand corner of the screen is located in The Your Choice TV logos 824 part of the logo graphics file. The network logo 1514 in the upper right-hand corner of the screen is generated from the network logo file 828 of the logo graphics file 820. The "go" buttons 1516 are generated from the graphic elements file 840 of the logo graphics file 820.

Figure 28C:
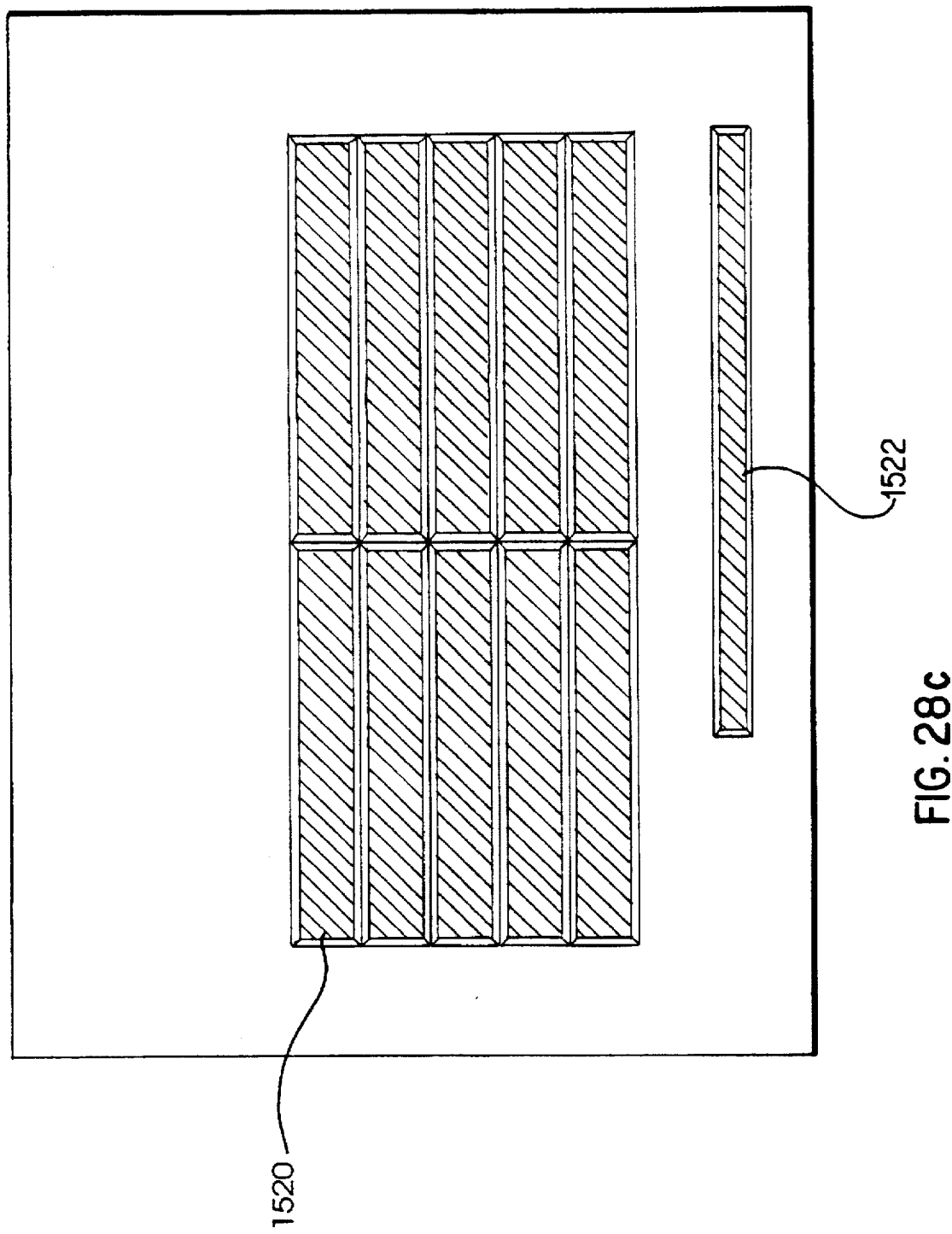

FIG. 28c shows the addition of menu displays 1520 to the hit movie major menu. In particular, FIG. 28c shows a ten block main menu display 1520 and a strip menu 1522 in the lower part of the screen. The ten display blocks 1520 of FIG. 28c are generated from the menu display block's subfile 854 of the menu display and cursor graphics file 850 (shown in FIG. 27a. The strip menu 1522 located on the lower part of the screen is also generated from the menu display block's subfile 854.

Figure 28D:
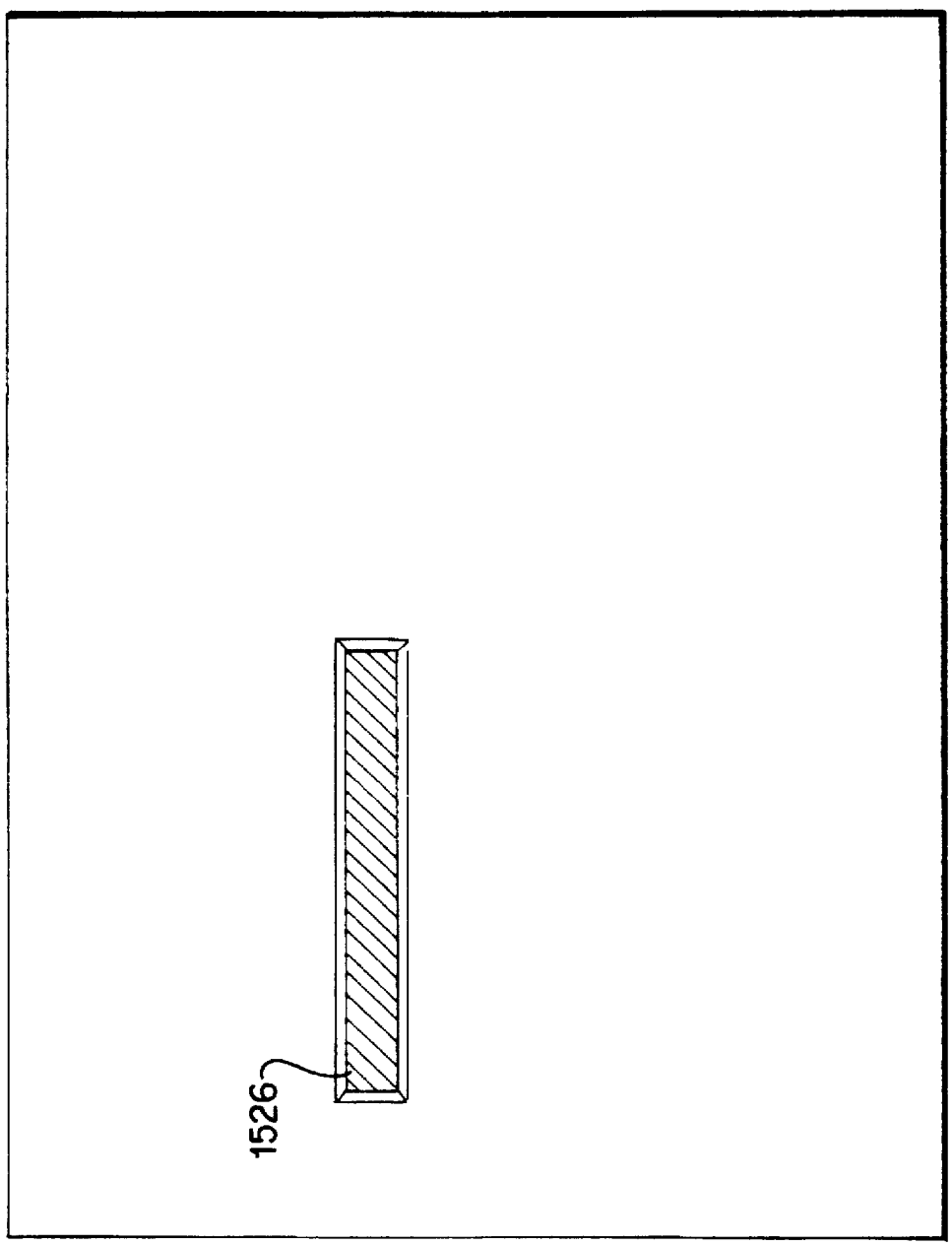

FIG. 28d shows the addition of a cursor highlight overlay 1526 to the hit movie major menu. The cursor highlight overlay 1526 is generated from the cursor highlight overlay's submenu 858 of the menu display and cursor graphics file 850 shown in FIG. 27a. In the preferred embodiment, the cursor highlight overlay 1526 is shown by default to be in the upper left-hand menu display block of each major menu. This cursor highlight overlay 1526 can be moved on the screen by the subscriber.

Figure 28E:
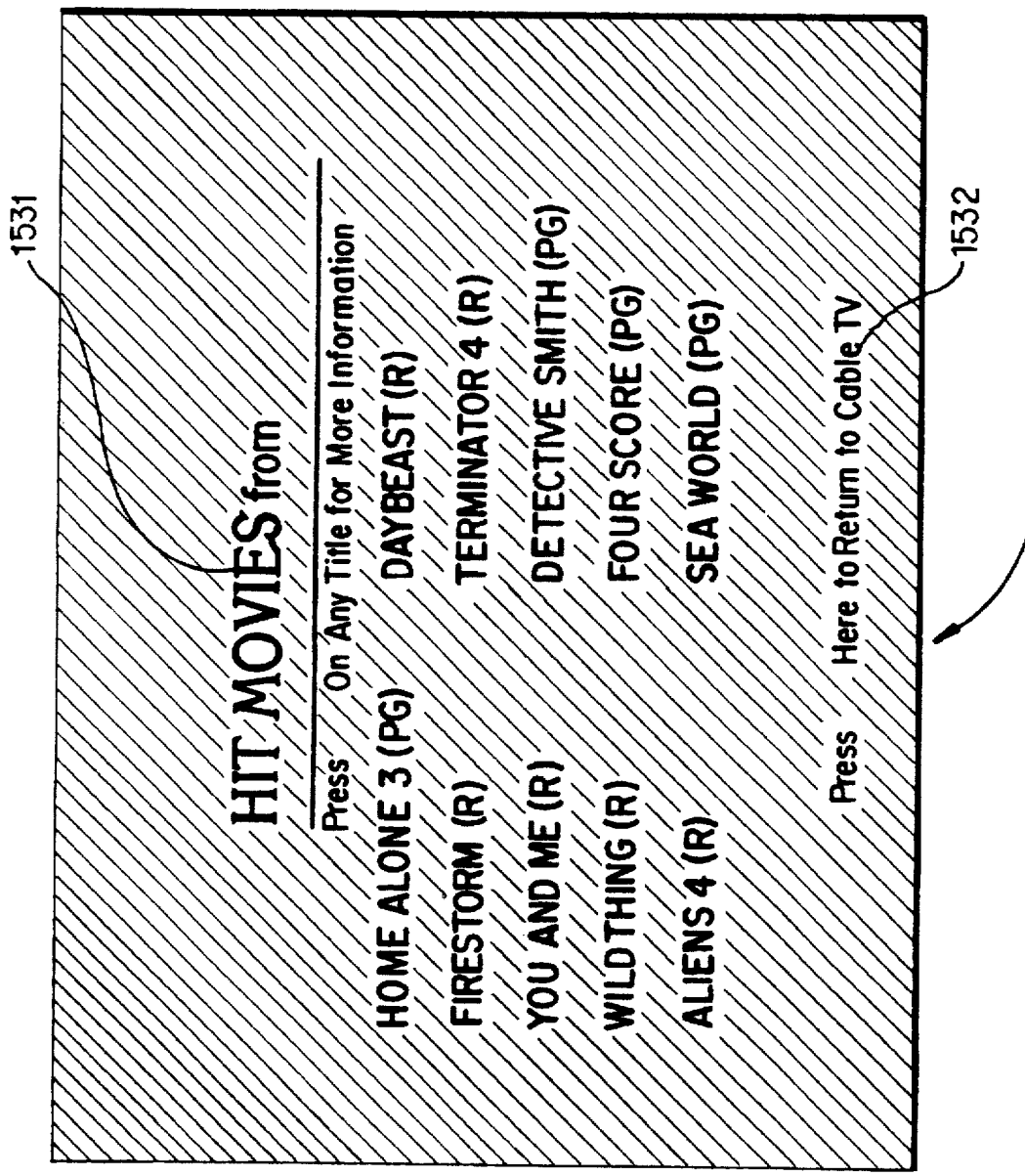

FIG. 28e shows the text 1530 generated for the hit movies major menu. In the preferred embodiment, the text 1530 is generated separately by a text generator in the set top terminal unit 220. The text "HIT MOVIES from" 1531 consistently appears on each hit movies' major menu. This text may be stored in long term storage. Other text such as that which appears at the lower center part of the screen "PRESS HERE TO RETURN TO CABLE TV" 1532 also appears many times throughout the menu sequence. Text which changes on a regular basis, such as the movie titles (or other program selections), will be transmitted to the set top terminal 220. In this manner, the cable headend 208 may change the program selections available on any major menu 1020 by modifying the program control information signal sent by the operations center 202 and transmitting the change via the STTCIS.

In alternative embodiments, portions of the text, particularly those portions which remain constant, may be incorporated into the screens data file or the graphics files and stored in either the background graphics file 800 or the logo graphics file 820.

Figure 28F:
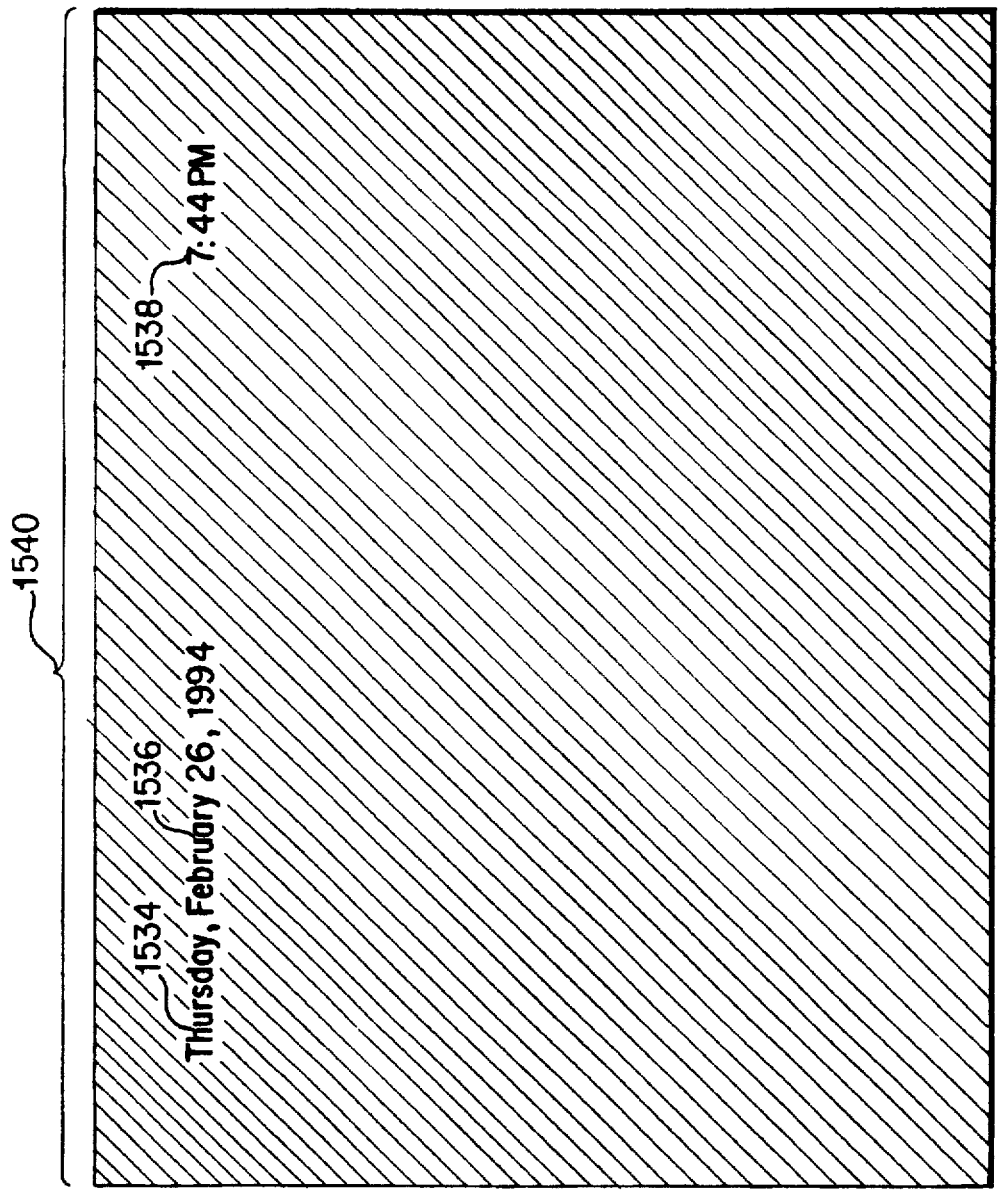

FIG. 28f shows the addition of day 1534, date 1536 and time 1538 information 1540 to the hit movies major menu. This information may be obtained in a variety of ways. The day, date, and time information 1540 may be sent from the operations center 202, the cable headend (signal processor or network controller 214), the uplink site 204, or generated by the set top terminal unit 220 internally. Each manner of generating the day, date, and time information 1540 has advantages and disadvantages which may change given the particular embodiment and costs. In a preferred embodiment, the day, date, and time 1540 are generated at a central location such as the operations center and are adjusted for regional changes in time at the cable headend 208.

Figure 28G:
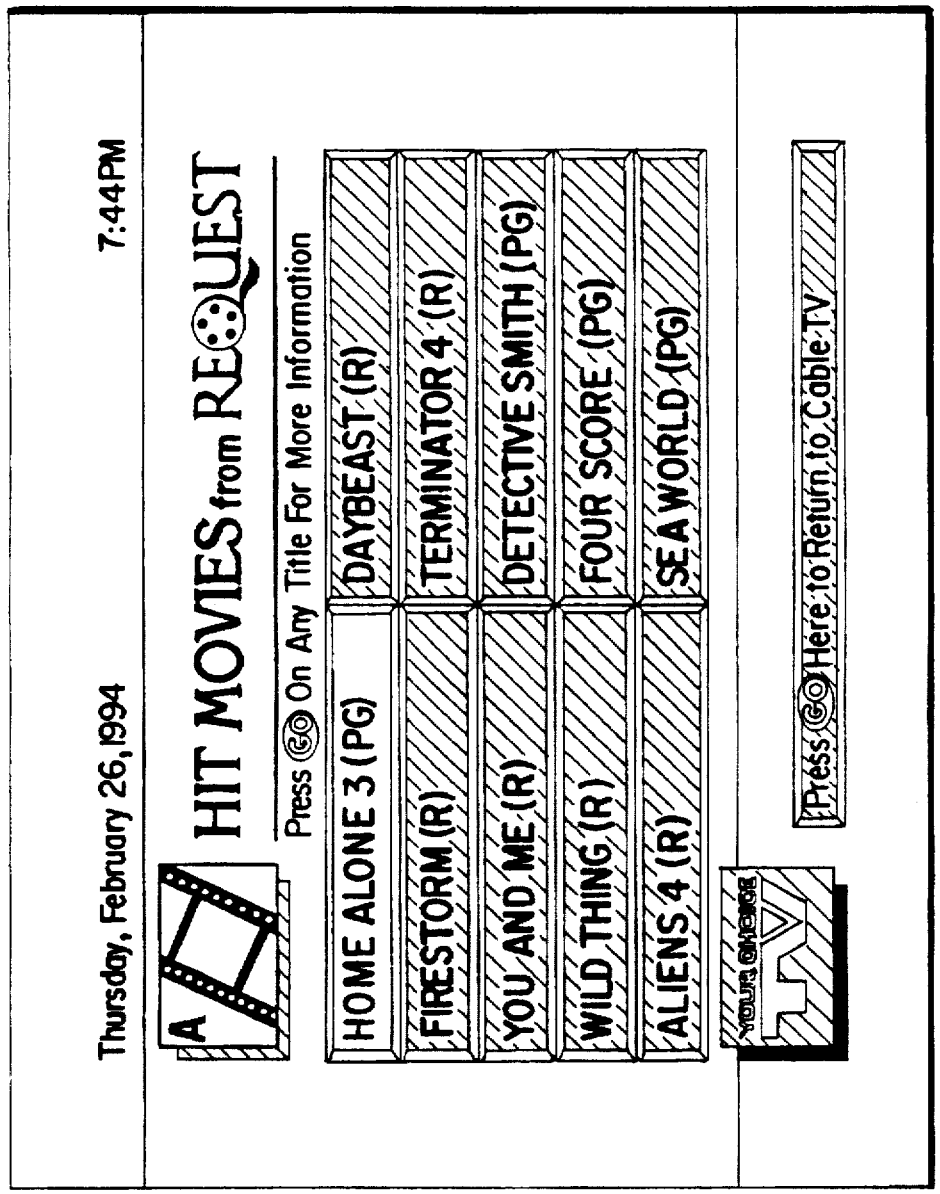

FIG. 28g shows the results of the information in FIGS. 28a to 28f being integrated in the video combiner 624 and then displayed on the television screen 222. The subscriber in viewing the hit movie major menu 1040 is unaware of the fact that the menu comprises several distinct parts.

Figure 29A:
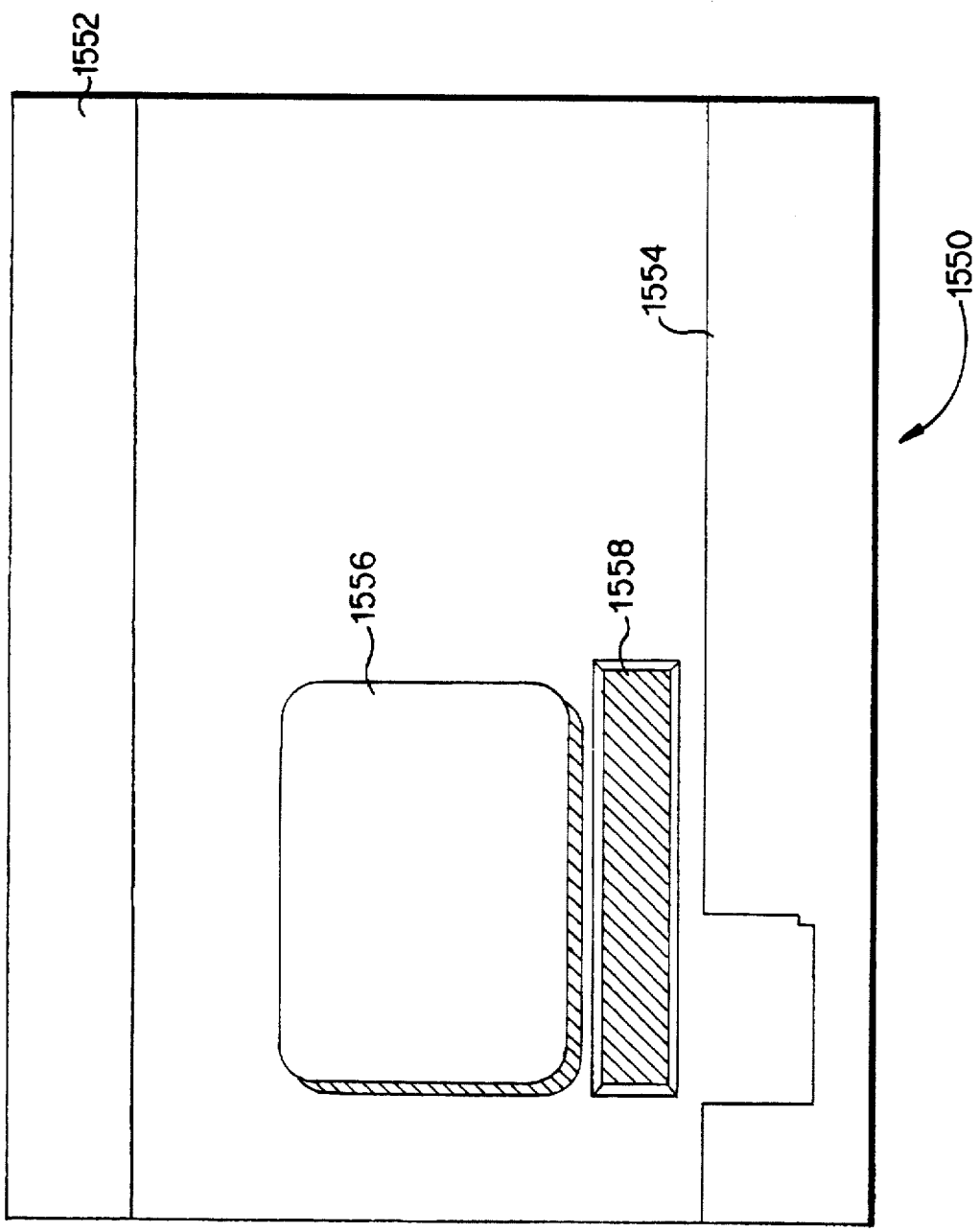

FIGS. 29a through 29g show the creation and display of a program description submenu for a hit movie. Similar to the major menu, the submenu is created in parts and combined before being sent to the television screen. FIG. 29a shows the background graphics 1550 for the program description submenu. In the preferred embodiment, the upper sash 1552 and lower sash 1554 of the background graphics 1550 are stored together in one location on the EEPROM 620. The video window 1556 and half-strip window 1558 are also co-located in storage on the EEPROM 620. The half-strip window 1558 beneath the video window serves 1556 as a means for describing the videos shown in the video window 1556. Both sets of graphic information 1550, the sashes 1552, 1554 and video window 1556 with description 1558, are located in the universal submenu backgrounds subfile 808 of the background graphics file 800. Both sets of backgrounds appear in many menus and are used many times during a sequence of menus.

Figure 29B:
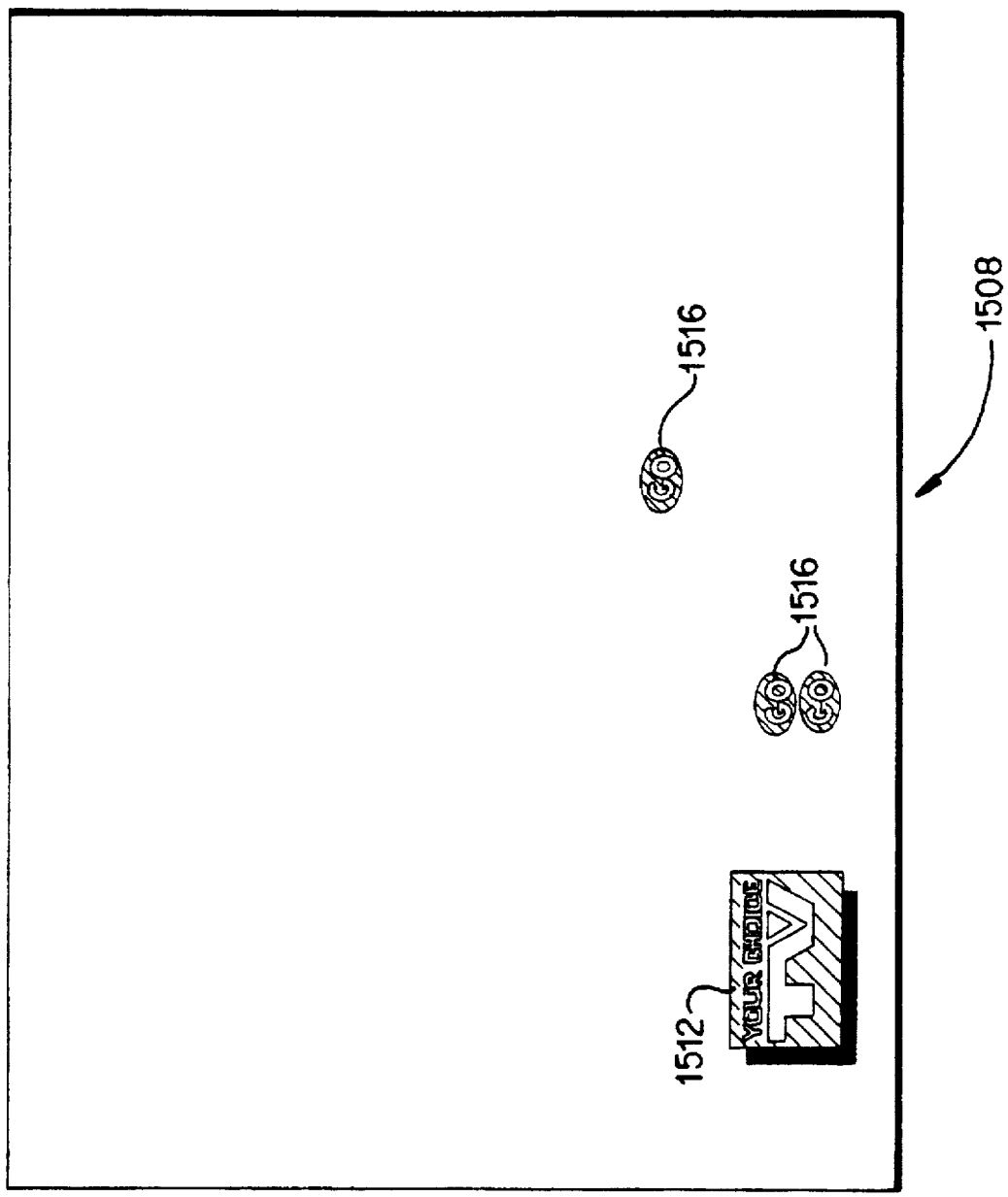

FIG. 29b shows the additional logo graphics information 1508 needed to create the program description submenu. In the preferred embodiment and with reference back to FIGS. 27a and 27b, the "go" logo 1516 can be stored once in memory 620 and directed to the correct portion of the screen in which it is needed for a particular menu. Similar to FIG. 28b, the information needed to create the "your choice" logo 1512 and "go" buttons 1516 is stored in the logo graphics file 820.

Figure 29C:
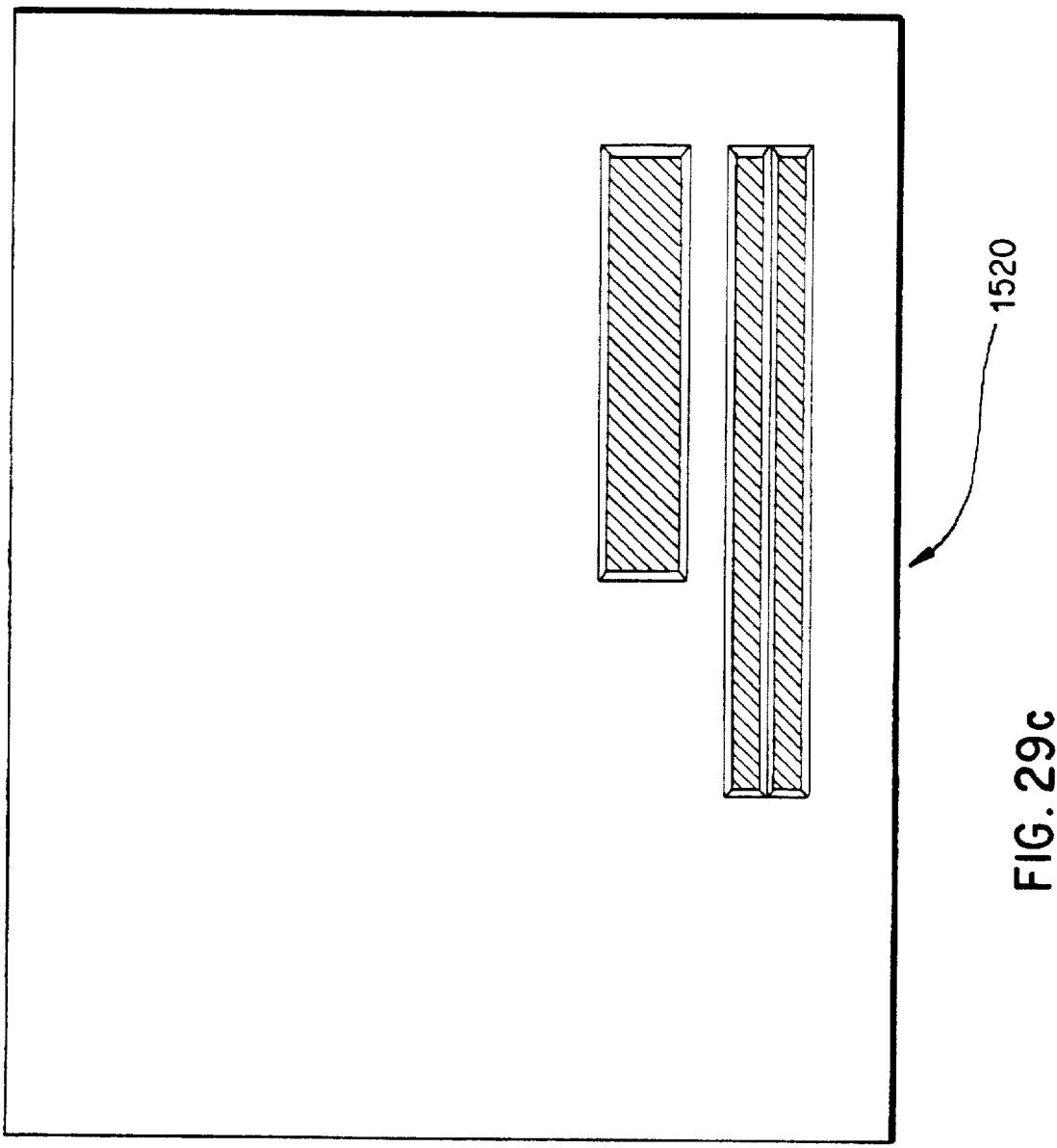

FIG. 29c shows the addition of menu display information 1520 for the program description submenu. Similar to FIG. 28e, the information needed for FIG. 29c menu display blocks is stored in the menu display blocks' subfile 854 of the menu display and cursor graphics 850. In this particular submenu, there are three menu display blocks of rectangular shape.

Figure 29D:
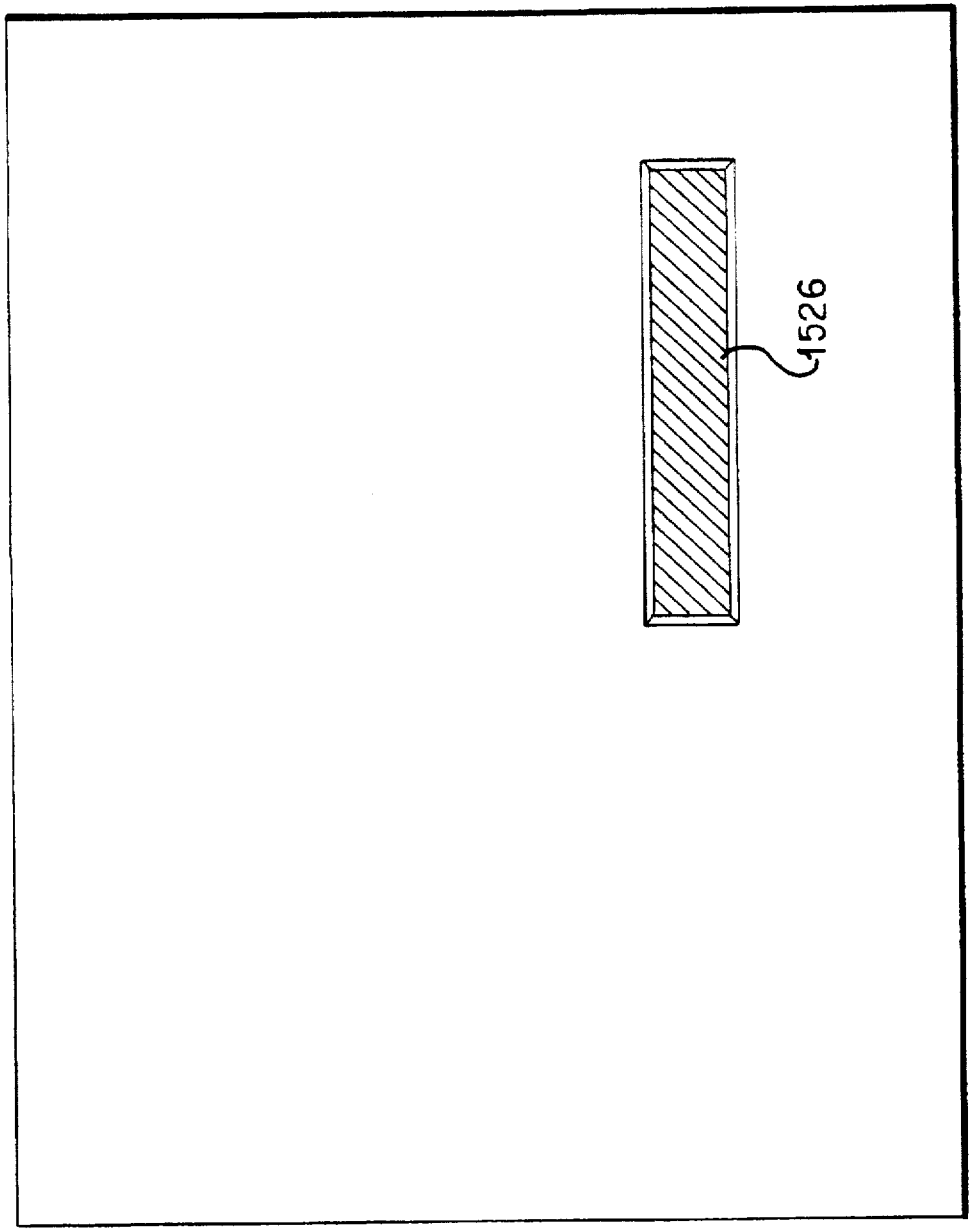

FIG. 29d shows the addition of cursor highlight overlay graphics 1526 for the program description graphics. This information is obtained from the cursor highlight overlay submenu, one of the overlay graphics. For most major menus 1020 and submenus 1050, only one cursor highlight overlay 1526 will appear on the screen at a given time. More cursor highlight overlays 1526 will appear on a screen when the subscriber is presented with more than one question. The number of cursor highlight overlays 1526 will generally correspond with the number of questions being presented to the subscriber on the menu. The cursor highlight overlay 1526 is generally assigned a default position on each menu screen and is moved by the subscriber using the remote control 900.

Figure 29E:
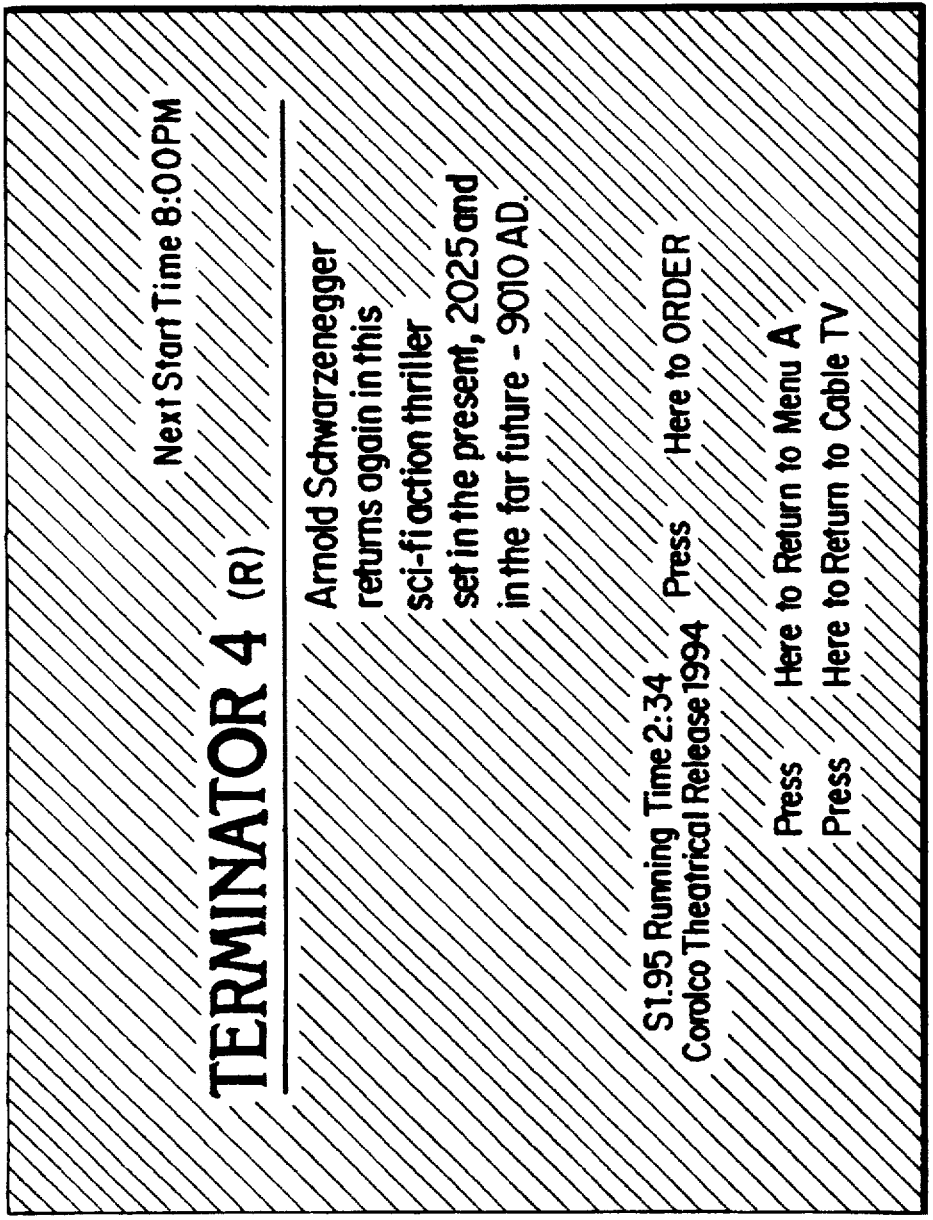

FIG. 29e shows the text generation 1530 necessary for the program description submenu for a hit movie. As in FIG. 28e, some of the text for the program description submenu is consistently on each program description submenu, such as "PRESS HERE TO RETURN TO CABLE TV." This textual information may be stored locally and processed through the text generator 621 before being sent to the video combiner 624.

c. Use Of Promotional Video

Figure 29F:
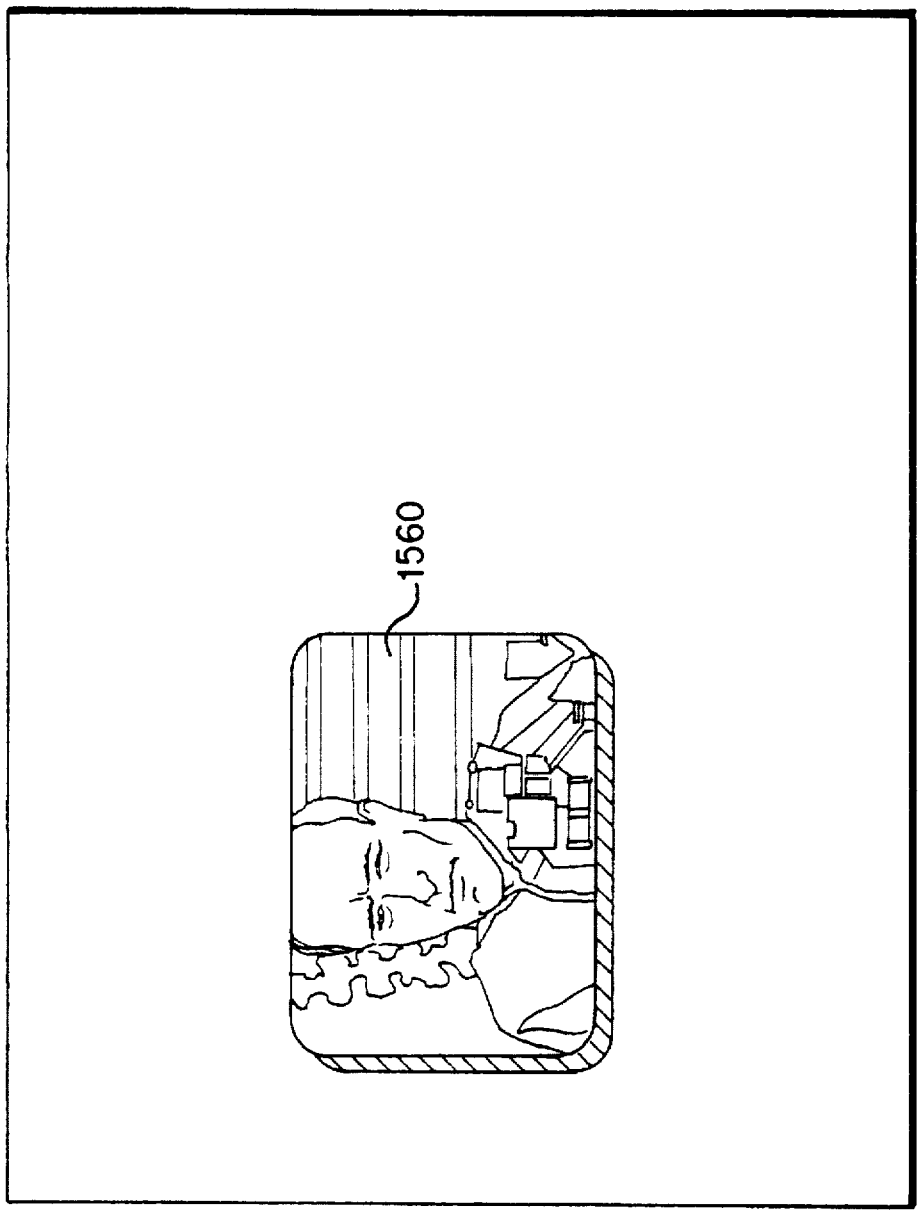

FIG. 29f shows the addition of video 1560 to the video window 1556. In an alternative embodiment, the video shown in the program description submenu is a still picture. The still picture may be stored in a compressed format (such as JPEG) at the set top terminal 220. These video stills 1560 that are used on program description submenus as well as other menus, may be transmitted by the operations center 202 through the program control information signal from time to time.

In the preferred embodiment, the video window 1556 shows a moving video picture. For the hit movies category, the moving video picture may be obtained directly from a current feed of the described movie. For example, the movie video shown may be taken directly off of a channel which is currently showing the movie Terminator. The set top terminal 220 would decompress the channel with the movie Terminator and then manipulate the video signal to place it in the video window 1556. This manipulation of the video signal includes scaling down the size of the video screen and redirecting the video to a portion of the menu screen which is within the video window of the menu. Another method of getting the moving video (Terminator video chip) to the video window portion of the submenu, is to obtain the video from a split screen channel described later.

Figure 29G:
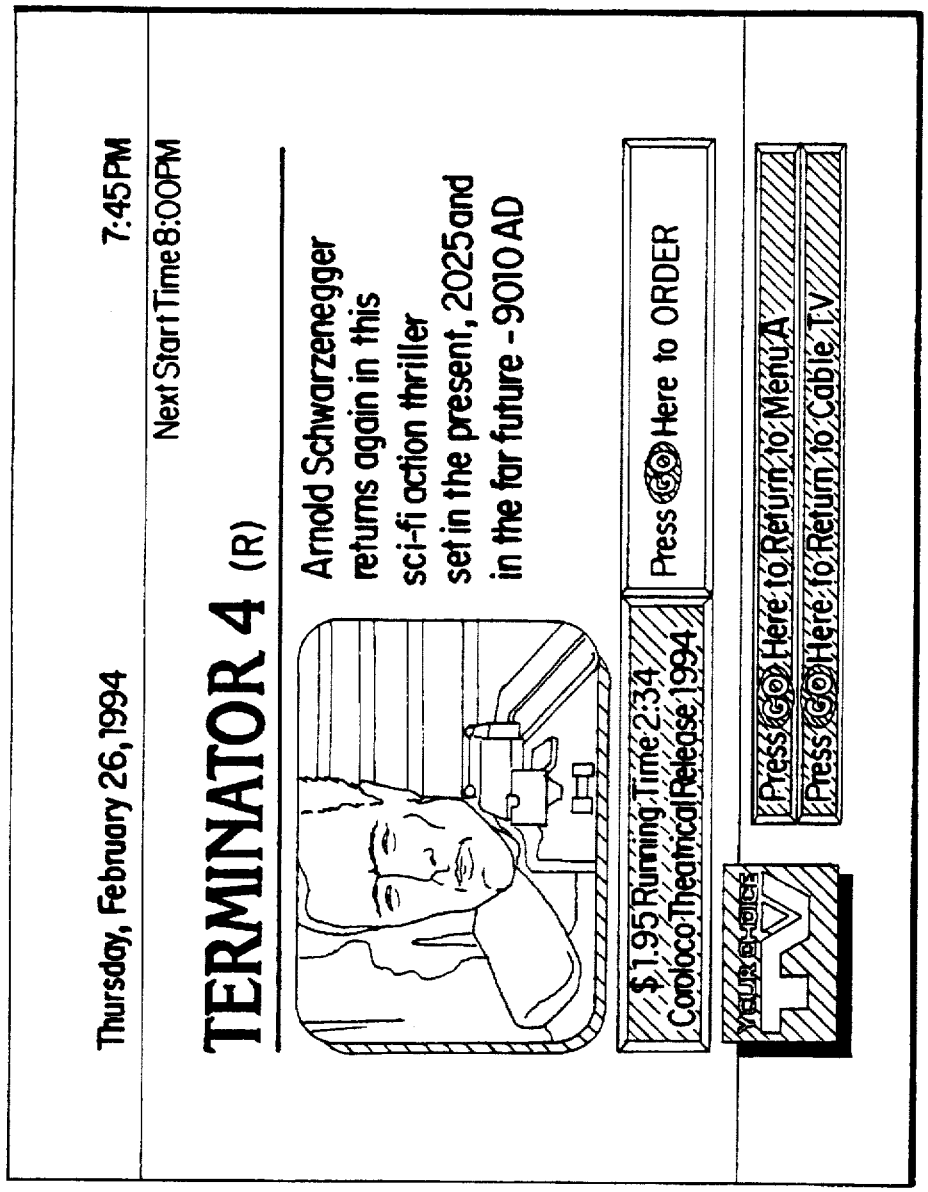

FIG. 29g shows the final product resulting from the combining of FIGS. 29a through 29f. The video combiner 624 integrates each of these portions of information into a single menu screen 1058.

With reference also to FIGS. 5a and 27b, the video combiner 624 which displays the menus on the television screen obtains information primarily from three locations, the graphics generator 622, the text generator 621, and the video decompressor 618 (with other video manipulation equipment, if necessary). The graphics generator 622 primarily obtains information from the graphic memory unit 620 but may receive information in the STTCIS. The text generator 621 primarily receives its information from a separate memory for text. However, in certain embodiments the text information may be stored in the graphics memory 620 or may be taken directly off the STTCIS. The video signal which is sent to the video combiner 624 may come directly from one or more video decompressors or ancillary video manipulation equipment.

Figure 30:
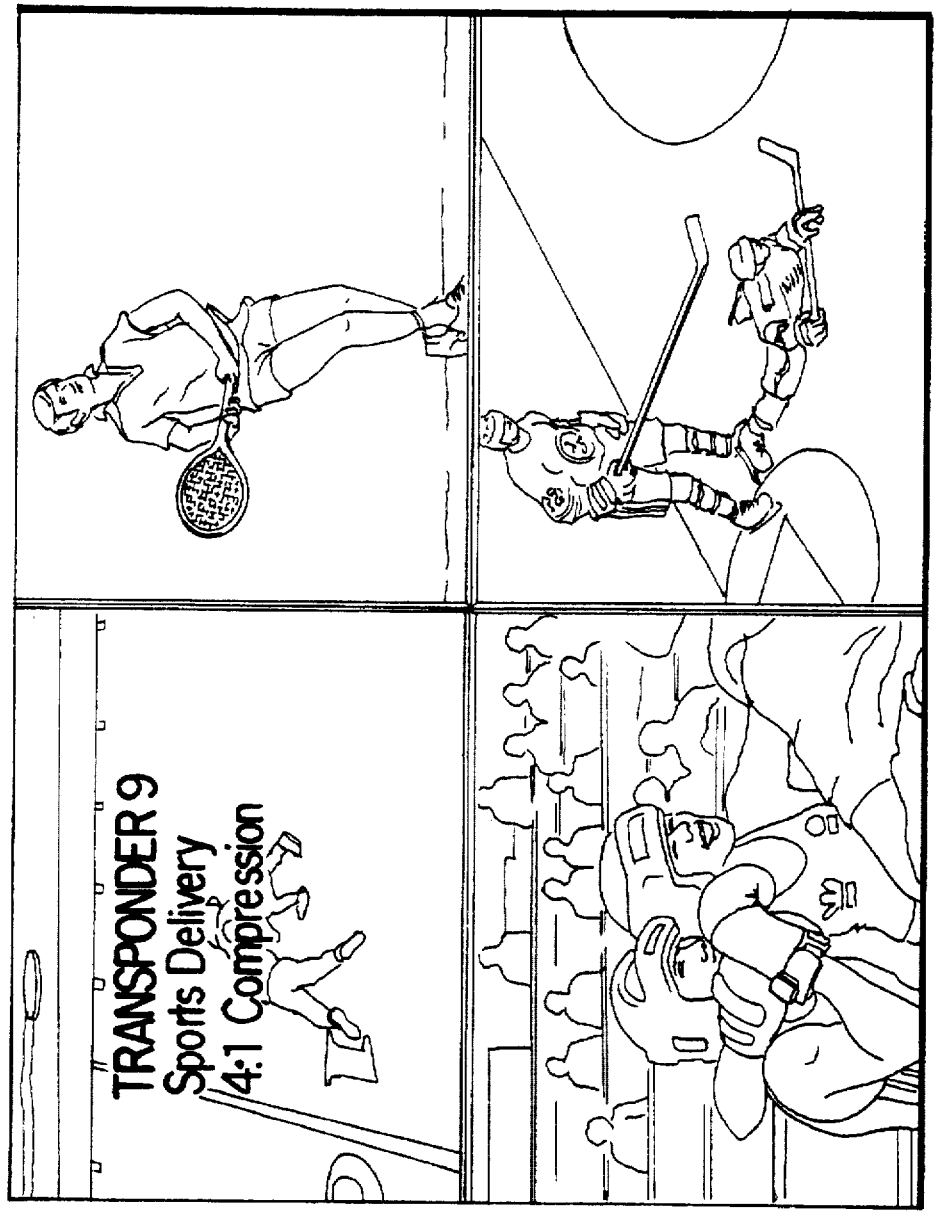
FIG. 30 depicts a split-screen technique for use with the present invention.

One of the methods for video clips or promotional video to be sent to the set top terminal 220 is through the use of split screen video techniques. Using a split screen technique, any number of different video clips may be sent (e.g., 2, 4, 6, or 8 video clips) on a single channel. FIG. 30 shows the throughput of a single channel using a split screen video technique to divide the channel into four parts. In this manner, four different video clips may be simultaneously sent on a single channel. Program description submenus can acquire one of the video clips shown on the split channel at any given time. Generally, this requires the set top terminal 220 to decompress the entire channel, acquire one-fourth of the video information, scale the video (if necessary), and redirect the video (if necessary). Using this split screen technique 1602, numerous video clips may be sent over a limited number of channels. For example, forty eight different video clips may be sent simultaneously on a single channel using split screen video techniques. In this embodiment, the video signal may need to be scaled upwardly to enlarge the picture for viewing in a video window or on a full screen. Redirecting by pixel offset may be used to place the video in the video window.

The terminal uses known scaling and positioning techniques similar to those currently used in consumer electronics to produce picture-in-picture. Additional circuitry may be required in the set top terminal 220 to perform adequate scaling and repositioning.

In an alternative embodiment, which avoids the need for redirecting video into the portion of the screen which houses the video window 1556, masking and menu graphics not needed. This masking technique allows the split screen are used to cover the portions of the channel video that are video to remain in the same portion of the screen that it is transmitted by the operations center. The masking then is adjusted to cover the undesired portions of the screen. These masks would be stored in the background graphics file 800 similarly to other background files for menus. The advantage of the system is the cost savings in not needing to redirect video. The disadvantage of the system is that the video window on a description submenu, for example, would not remain in the same location from menu to menu. This inconsistency in video window location detracts from the aesthetically pleasing aspects of the menu layouts.

If the masking technique is used in conjunction with the split screen video shown in FIG. 30, each submenu has approximately one-quarter screen of video and three-quarter screen of graphic and text information. For example, a submenu or promo menu for a basketball game would mask all but the upper right-hand corner of the screen. Following masking, other background graphics 1550, logo graphics 1508, menu display 1520, cursor graphics 1526, and text information 1530 would be overlayed over the three-quarter mask as described earlier. In a similar manner, a submenu or promo menu for a hockey game would also have a three-quarter mask. This three-quarter mask would mask all but the lower right-hand corner of the screen. Again, the remaining menu graphics, logos and textual information would overlay the three-quarter mask. As can be appreciated from this example, four different three-quarter masks are stored in the background graphics file 800 for use in the four possible video window positions.

The split screen video technique may also be used for promoting television programming. Since a great number of short video clips may be sent continuously, full or partial screen promotionals (or informationals) may be provided to the subscriber. With this large quantity of promotional video, subscribers may be given the opportunity to "graze" through new movie or television programming selections. The subscriber would simply graze from promotional video to promotional video until finding (and ordering) the desired television program.

The terms and descriptions used herein are set forth by way of illustration only and are not meant as limitations. Those skilled in the art will recognize that numerous variations are possible within the spirit and scope of the invention as defined in the following claims.

What is claimed is:

1. A set top terminal with microprocessor instructions for prompting generation of menus for use with a program delivery system with menu selection of programs, using a program signal containing programs and a program control information signal containing program identification data and menu identification data identifying the menu location for each program identification data, the set top terminal comprising:

means for receiving the program signal containing the programs and the program control information signal containing the program identification data and the menu identification data;

demultiplexer means for demultiplexing the received program signal into individual programs and the program control information signal into the program identification data and the menu identification data;

instruction memory means for holding the microprocessor instructions for prompting generation of menus;

a microprocessor, connected to the instruction memory, for executing the microprocessor instructions for prompting generation of menus;

menu memory means, connected to the demultiplexer and the microprocessor, for storing information used to generate menus, wherein the program identification data and the menu identification data are stored, and wherein the menu identification data relates the program identification data to one or more specific menus;

means, connected to the microprocessor, for generating a menu from the stored information in the menu memory, including the program identification data and menu identification data, when prompted by the microprocessor; and means for commanding the microprocessor to prompt the menu generator means to generate a menu for display.

2. The set top terminal of claim 1 wherein the means for commanding comprises a remote control for remotely commanding the microprocessor.

3. The set top terminal of claim 1 wherein the individual programs demultiplexed from the program signal are in compressed form, the set top terminal further comprising:

a video decompressor for decompressing the individual programs.

4. The set top terminal of claim 1 wherein the individual programs are encrypted, the set top terminal further comprising:

a decryptor to decrypt one or more of the individual programs from the program signal to produce one or more decrypted programs; and a tuner for tuning to at least one of the decrypted programs for display.

5. The set top terminal of claim 1 wherein the program control information signal is in digitally compressed form, the set top terminal further comprising:

a decompressor for decompressing the program control information signal.

6. A set top terminal for use with a television, with menu selection of television programs from a set of menus, using a program control information signal containing program identities and menu locations within the set of menus for the program identities comprising:

a receiver, wherein the program control information signal is received;

a menu memory, connected to the receiver, for storing the program identities and menu locations within the set of menus for the program identities;

means, connected to the menu memory, for generating menus from the set of menus, including a program identity subset menu containing program identifies, wherein the means for generating uses the program identities and the menu locations for the program identities stored in the menu memory;

processor means, connected to the generating means for sequencing between menus within the set of menus to generate one menu at a time wherein at least one of the generated menus is from the program identity subset of menus; and means, in communication with the processor means, for selecting a program by choosing a program identity from a generated menu.

7. The set top terminal of claim 6 wherein the displayed menu has a cursor overlay and wherein the means for selecting a program comprises a remote control device with directional buttons for moving the cursor overlay to assist in selecting a television program identity from the displayed menu.

8. The set top terminal of claim 6 wherein the program control information also includes time of day information and wherein the means for generating the set of menus further comprises means for generating the current time of day information on each menu.

9. The set top terminal of claim 16, further comprising:

a sequence memory, which stores information concerning the sequencing of menus within the set of menus; and wherein the processor means is connected to the sequence memory, and uses the stored information on sequencing to control the sequencing between menus within the set of menus.

10. The set top terminal of claim 9, wherein the stored information concerning the sequencing of menus are executable processor instructions on menu sequencing, and wherein the processor means uses the stored processor instructions on menu sequencing.

11. The set top terminal of claim 6, wherein the generating means further comprises a means to generate a cursor overlay controlled by a cursor signal, wherein the selecting means comprises a remote control device with directional buttons for creating and transmitting a cursor signal; the set top terminal further comprising:

a remote control interface, connected to the generating means, which receives the transmitted cursor signal.

12. The set top terminal of claim 6, wherein the means for generating the set of menus includes a means for providing at least one introductory menu, a home menu, and subset of major menus relating to program categories.

13. The set top terminal of claim 6, wherein a composite signal contains the program control information signal and a program signal, wherein the program signal is encrypted, and wherein the receiver further comprises:

an extractor, wherein the program control information signal is extracted from the composite signal; and a decryptor.

14. The set top terminal of claim 6, wherein a composite signal contains the program control information signal and a program signal, wherein the composite signal is compressed, and wherein the receiver further comprises:

a decompressor; and an extractor, wherein the program control information signal is extracted from the composite signal.

15. The set top terminal of claim 6, wherein a composite signal contains the program control information signal and a program signal, wherein the program signal is compressed and encrypted, and wherein the receiver further comprises:

a program signal decryptor;

a decompressor, connected to the program signal decryptor; and an extractor, wherein the compressed program control information signal is extracted from the composite signal.

16. The set top terminal of claim 6, wherein the menus in the set of menus are grouped in a hierarchial configuration which descends from at least one introductory menu to a home menu to a major menu subset and to the program identification menu subset, wherein the selecting means is a remote control which generates a remote signal and comprises a plurality of menu select buttons, each menu select button corresponding to a major menu, and wherein the processor means sequences to a major menu in response to a single activation of the corresponding menu select button, the set top terminal further comprising:

a remote control interface, connected to the processor means, which receives the transmitted remote signal from the remote control.

17. The set top terminal of claim 6, wherein the program control information signal contains polling request information and event identification information corresponding to each program identity, the set top terminal further comprising:

a means for identifying event identification information for one or more selected programs;

a means for storing the identified event identification information;

a means, connected to the receiving means, for determining the presence of a polling request from the polling request information;

a transmitter, connected to the means for storing and the means for determining, wherein the stored event identification information is transmitted upon the occurrence of a polling request.

18. The set top terminal of claim 6, wherein the receiver comprises:

a telephone port.

19. The set top terminal of claim 6, wherein the receiver is a digital receiver.

20. A set top terminal with executable instructions for use with a program delivery system with menu selection of programs from a plurality of menus, using a combined signal including compressed video and a program control information signal with program identities, the menus including an introductory menu, a home menu, major menus, and submenus, comprising:

means for receiving the combined signal including the compressed video and the program control information signal for processing;

a demultiplexer means for demultiplexing the received signal into compressed video and into the program control information signal;

an instruction memory which stores executable instructions;

means, operably connected to the demultiplexer and instruction memory, for generating menus including an introductory menu, a home menu, at least one major menu, and at least one submenu using the program identities of the program control information signal wherein the submenus include program identities, and wherein the generating means builds the menus;

means, connected to the generating means, for sequencing between menus, including sequencing between the introductory menu, home menu, major menus, and submenus using the executable instructions;

means for selecting a program identity from a submenu; and a video decompressor means coupled to the demultiplexer for decompressing the compressed video wherein the decompressed video corresponds to the program identity selected from the submenu.

21. The set top terminal of claim 20 wherein the means for generating menus comprises a video combiner for combining video with generated submenus.

22. The set top terminal of claim 20 wherein the means for generating menus further comprises means for generating during program menus including hidden menus and overlay menus and wherein the means for sequencing between menus includes means for sequencing between during program menus and submenus.

23. The set top terminal of claim 20 wherein the means for selecting a program identity from a submenu comprises a user interface with a plurality of buttons.

24. The set top terminal of claim 23 wherein the user interface further comprises a means for affecting the sequencing between menus.

25. An apparatus with executable instructions for use with a program delivery system with menu selection of programs from a plurality of menus, using a program control information signal containing program identities, a cursor movement button and a go button, the apparatus comprising:

means for receiving the program control information signal;

an instruction memory for storing executable instructions;

means, connected to the instruction memory and receiving means, for generating menus including an introductory menu, a home menu, at least one major menu, and at least one submenu containing program identities, using the stored executable instructions and the program identities contained in the program control information signal, wherein the generating means creates a movable cursor overlay for overlaying the program identities on the submenu, and wherein the generating means builds the menus;

means, connected to the generating means, for selecting a program comprising:
 a user interface means including a cursor movement button and a go button;
 means, electronically connected to the user interface means, for sequencing between menus, including sequencing between the home menu, major menu, and submenu; and
 means for selecting a program from a submenu by moving the cursor overlay with the cursor movement button to overlay a program identity and depressing the go button.

26. The set top of claim 25 wherein the sequencing means further comprises:

means for sequencing between menus using the go button.

27. A method for generating menu displays with a set top terminal and television display for use with a program delivery system with a text signal and menu selection of programs from a plurality of menus, wherein portions of the graphics and text for the menus are stored in files including background graphics files, logo graphics files, menu display and cursor graphics files, comprising the steps of:

generating menu graphics for display comprising the steps of:
 fetching background graphic files and generating background graphics;
 fetching logo graphics files and generating logo graphics; and
 fetching menu display and cursor graphic files and generating the menu display and cursor graphics;

generating menu text for display comprising:
 fetching text files and generating menu text;
 receiving text from the program delivery system text signal and generating menu text;

combining the generated menu graphics and the generated menu text; and displaying the combined graphics and text as a menu.

28. The method of claim 27 wherein the program delivery system text signal is a component of a program control information signal, wherein the step of receiving text from the program delivery system text signal comprises:

receiving program control information signal; and extracting the text including text for program names from the program control information signal.

29. A method for generating menu displays for a television with a set top terminal for use with a program delivery system with menu selection of programs from a plurality of individual menus, using executable instructions and compressed files stored in memory including background, logo, menu display and cursor graphic files, as well as long, intermediate and short term compressed text files, comprising the steps of:

executing the stored executable instructions to initiate the generation of a menu for display;

generating menu graphics for display comprising the steps of:
 fetching background graphic files and decompressing background graphics files;
 fetching logo graphics files and decompressing logo graphics files; and
 fetching menu display and cursor graphic files and decompressing the menu display and cursor graphics files;

generating menu text for display comprising:
 fetching and decompressing the long, intermediate, and short term text files;

combining the generated menu graphics files and the generated menu text files; and displaying the combined menu graphics and menu text files as a menu on the television.

30. The menu generation method of claim 29, wherein the program delivery system delivers video channels, the combining step further comprising step of:

combining video from the program delivery system with the generated menu graphics and the generated menu text comprising the steps of:
 selecting a video channel;
 decompressing the video channel into video;
 scaling the video to change its size; and
 redirecting the video to change its projected location on the television.

31. The menu generation method of claim 29 wherein still video is stored in memory, further comprising the step of:

still video picture generation for menu display comprising the steps of:

fetching a still video picture stored in memory; and decompressing the still video picture; and wherein the combining step further comprises means for combining the decompressed still video.

32. A method of set top terminal menu generation and sequencing for selecting television programs to display on a television, where the set top terminal receives a packaged program signal the method comprising the steps of:

determining that a packaged program signal is being received by the set top terminal;

generating and displaying an introductory menu;

awaiting subscriber key entry;

determining whether to display a packaged program or generate and display a menu from a set of menus based on a subscriber key entry;

generating and displaying one or more menus from the set of menus including the steps of:
building at least one home menu;
building at least one menu from a major menu subset; and
building at least one menu from a program list subset, including the step of listing the program identities;

displaying on the television a selected program, wherein the selected program is determined by subscriber key entries made during a sequence of generated menus.

33. The method of claim 32 wherein the step of generating and displaying further comprises the steps of:
fetching the universal background graphics file for the menu;
decompressing the fetched universal background file to create the menu background;
fetching the logos graphics file for the menu;
decompressing the fetched logos graphics file to create logos; and
combining the menu background and logos.

34. The method of claim 32 wherein the step of generating and displaying the menus including a major menu comprises:
fetching the universal background graphics file for an upper sash;
fetching the universal background graphics file for a lower sash;
decompressing the fetched universal background files to create the major menu background;
fetching the network logo graphics file for the major menu;
fetching other logo graphics files for the major menu;
decompressing the fetched logos graphics files to create the major menu logos;
combining the major menu background and major menu logos;
fetching the cursor highlight graphics file;
decompressing the cursor highlights graphics file to create the cursor highlights; and
combining the cursor highlights with the major menu background and the major menu logos.

35. The method of claim 32 wherein the step of generating and displaying the menus including a major menu further comprises the steps of:
fetching a major menu icon graphics file from memory; and
decompressing the major menu icon graphics file to create a major menu icon.

36. The method of claim 32 further comprising the steps of:
producing an overlay menu and one or more icons for display with the overlay menu during the display of a television program; and
executing software at the microprocessor for one or more hidden menus, wherein the software is executed during display of the television program.

37. The method of claim 32, wherein the step of generating and displaying further includes the steps of:
building at least one menu from a program description subset of menus;
building a program order menu; and
building a program confirmation menu.

38. The method of claim 32, wherein the major menu subset of menus relates to a plurality of program categories and associated subcategories, and wherein the step of generating and displaying further includes the step of:
building a menu from a program subcategory subset of menus.

39. The method of claim 32, wherein the step of displaying includes the step of:
overlaying a menu on the displayed program so that the selected program and the overlay menu are displayed simultaneously.

40. The method of claim 39, wherein the selected program contains video and the step of overlaying includes the steps of:
scaling the selected program video to change its size;
positioning the scaled program video;
placing an overlay menu adjacent to the scaled and positioned program video.

41. The method of claim 32 wherein the step of displaying includes the steps of:
executing software to determine whether a subscriber key entry relates to displaying a hidden menu;
generating and displaying a hidden menu in response to a subscriber key entry relating to displaying a hidden menu, as determined by the step of executing software.

42. The method of claim 32, wherein the subscriber's selected program costs a fee if viewed for more than a predetermined time period and wherein the step of displaying further includes the step of:
running a timer for the predetermined time period;
generating an escape menu containing the timer value;
overlaying the escape menu on the display of the selected program until the timer has expired or the subscriber exits the selected program.

43. The method of claim 42, where the subscriber has exited the selected program after the predetermined time period, the step of displaying further including the steps of:
generating and displaying a warning menu relating to the fact that the subscriber has been charged for the selected program;
monitoring subscriber key entries for a certain key entry indicating that the subscriber desires to rejoin the selected program;
rejoining the subscriber's selected program in response to said certain key entry.

44. The method of claim 32, where the subscriber has been charged for the selected program and has exited the selected program prior to the program's conclusion, further including the steps of:
monitoring subscriber key entries to detect an entry corresponding to selection of the exited program;

identifying one or more start times when the subscriber may rejoin the exited program;

generating and displaying a rejoin menu containing reentry menu selections for rejoining the exited program, the reentry menu selections including one or more of the identified start times;

allowing the subscriber to rejoin the exited program in response to a subscriber selection of a reentry menu selection.

45. The method of claim 32, wherein there is a time interval between the subscriber's selection and the beginning of the selected program, further comprising the steps of:

running a countdown timer for the time interval;

generating and displaying a countdown menu, the countdown menu containing the value of the timer.

46. The method of claim 45, further comprising the step of:

displaying the selected program upon expiration of the countdown timer.

47. The method of claim 32, wherein the program control information is compressed, the programs are compressed and encrypted, the step of extracting comprises the step of decompressing the program control information, and the step of displaying comprises the steps of:

decrypting the selected program; and decompressing the decrypted program.

48. A method of sequencing menus on a television screen for selecting television programs in a program delivery system with set top terminal menu generation, where the set top terminal receives packaged television programs including program control information, the menus generated by the set top terminal including an introductory menu, a home menu, a major menu, a submenu, and an overlay menu, comprising the steps of:

determining if a packaged program signal is being received by the set top terminal;

generating and displaying an introductory menu;

awaiting subscriber key entry;

determining whether to decompress a packaged video signal or display a menu;

generating and displaying the menus including at least one home menu, major menu, submenu for a subcategory, program list submenu, program description submenu, or confirmation submenu to confirm the packaged program selected, wherein the generated menus are built;

decompressing the selected packaged program video;

decompressing the selected packaged program audio;

generating the overlay menu;

combining the decompressed video and the overlay menu in a combiner;

displaying the combined video and the overlay menu.

* * * * *

UNITED STATES PATENT AND TRADEMARK OFFICE
CERTIFICATE OF CORRECTION

PATENT NO. : 5,734,853

DATED : March 31, 1998

INVENTOR(S) : John S. HENDRICKS, et al.

Page 1 of 2

It is certified that error appears in the above-indentified patent and that said Letters Patent is hereby corrected as shown below:

It is certified that errors appear in the above-identified patent and that said Letters Patent are hereby corrected as shown below: On the Title page, item [54] and col. 1, line 1:

In the title: delete "Cable"

Column 7, lines 40-41: replace "As shown in FIG. 1 and 2," with ---As shown in FIG. 3,--

Column 10, line 64, replace "FIG. 3 program" with --FIG. 3, program--

Column 11, line 13: replace "shows" with --shown--

Column 13, line 46: replace "menus," with --menus."--

Column 16, line 36: replace "Sesame Street™ and Barney™" with --Sesame Street™ and Barney™--

Column 16, line 38: replace "Terminator IV™" with --Terminator IV™--

Column 33, line 20: replace "fries" with --files--

Column 35, lines 38, 41, and 53: replace "Terminator Four" with --Terminator Four--

Column 36, lines 31-32, 33, 43, and 49: replace "Terminator Four" with --Terminator Four--

Column 36, line 60: replace "af" with --of--

Column 38, lines 59-60, 62, and 65: replace "War Birds" with --War Birds--

Column 39, lines 8, 12, and 23: replace "War Birds" with --War Birds--

Column 40, line 1: replace "comer" with --corner--

Column 41, line 1 and 10: replace "60 Minutes" with --60 Minutes--

Column 41, line 21: replace "FIG. 22d), which" with --FIG. 22d, which--

Column 44, line 31: replace "FIG. 29a" with --FIG. 27a--

Column 46, lines 35, 37, and 42, replace "Terminator" with --Terminator--

Column 47, lines 26-28: replace "masking and menu graphics not needed. This masking technique allows the split screen are used to cover the portions of the channel video that are video to remain in the same portion of the screen that it is transmitted by the operations center." with --masking and menu graphics are used to cover the portions of the channel video that are not needed. This masking technique allows the split screen video to remain in the same portion of the screen that it is transmitted by the operations center.--

Claim 6 at Column 49, Line 8: replace "identifies" with --identities--

Claim 9 at Column 49, line 31: replace "The set top terminal of claim 16," with --The set top terminal of claim 6,--

UNITED STATES PATENT AND TRADEMARK OFFICE
CERTIFICATE OF CORRECTION

PATENT NO.   : 5,734,853
DATED        : March 31, 1998
INVENTOR(S)  : John S. HENDRICKS, et al.

It is certified that error appears in the above-indentified patent and that said Letters Patent is hereby corrected as shown below:

Claim 28 at Column 52, line 23:   insert --a--after "receiving"

Signed and Sealed this

Seventh Day of July, 1998

*Attest:*

*Attesting Officer*

BRUCE LEHMAN

*Commissioner of Patents and Trademarks*